(12) United States Patent
Bierdel et al.

(10) Patent No.: US 8,915,642 B2
(45) Date of Patent: Dec. 23, 2014

(54) METHOD FOR CONSTRUCTING CO-ROTATING CONTIGUOUS BODIES AND COMPUTER PROGRAM PRODUCT FOR CARRYING OUT SAID METHOD AND SCREW ELEMENTS PRODUCED ACCORDINGLY

(75) Inventors: Michael Bierdel, Leverkusen (DE); Thomas König, Leverkusen (DE); Ulrich Liesenfelder, Bergisch Gladbach (DE)

(73) Assignee: Bayer Intellectual Property GmbH, Monheim (DE)

( * ) Notice: Subject to any disclaimer, the term of this patent is extended or adjusted under 35 U.S.C. 154(b) by 1036 days.

(21) Appl. No.: 12/996,158

(22) PCT Filed: May 19, 2009

(86) PCT No.: PCT/EP2009/003549
§ 371 (c)(1),
(2), (4) Date: Dec. 3, 2010

(87) PCT Pub. No.: WO2009/152910
PCT Pub. Date: Dec. 23, 2009

(65) Prior Publication Data
US 2011/0110183 A1    May 12, 2011

(30) Foreign Application Priority Data
Jun. 20, 2008   (DE) .......................... 10 2008 029 304

(51) Int. Cl.
| | | |
|---|---|---|
| B29B 7/48 | (2006.01) | |
| B29C 47/40 | (2006.01) | |
| B29C 47/08 | (2006.01) | |
| B29C 47/62 | (2006.01) | |
| B29C 47/60 | (2006.01) | |
| B29C 47/00 | (2006.01) | |
| B29C 47/38 | (2006.01) | |

(52) U.S. Cl.
CPC .............. *B29C 47/40* (2013.01); *B29C 47/0854* (2013.01); *B29C 47/0861* (2013.01); *B29C 47/402* (2013.01); *B29C 47/0881* (2013.01); *B29B 7/483* (2013.01); *B29C 47/0844* (2013.01); *B29C 47/627* (2013.01); *B29C 47/6056* (2013.01); *B29C 47/0009* (2013.01); *B29C 47/0825* (2013.01); *B29C 47/38* (2013.01); *B29C 47/60* (2013.01)
USPC .......................................................... 366/82

(58) Field of Classification Search
CPC ............ B29C 47/6043; B29C 47/6062; B29C 47/6056
USPC ............... 366/82, 85, 301; 425/204, 208, 209
See application file for complete search history.

(56) References Cited

U.S. PATENT DOCUMENTS

| | | |
|---|---|---|
| 3,195,868 A | 7/1965 | Loomans et al. |
| 3,900,187 A | 8/1975 | Loomans |

(Continued)

FOREIGN PATENT DOCUMENTS

| | | |
|---|---|---|
| EP | 1093905 A2 | 4/2001 |
| WO | 0209919 A2 | 2/2002 |
| WO | 2004 009326 A1 | 1/2004 |

OTHER PUBLICATIONS

International Search Report dated Oct. 26, 2009.

(Continued)

*Primary Examiner* — Charles Cooley
*Assistant Examiner* — Marc C Howell
(74) *Attorney, Agent, or Firm* — Norris McLaughlin & Marcus, P.A.

(57) ABSTRACT

The present invention relates to a method of generating tightly intermeshing, self-cleaning, co-rotating screw profiles, the use of the screw profiles in screw and transition elements, novel screw profiles which have been generated by the method and a computer program product for executing the method in a computer system.

15 Claims, 59 Drawing Sheets

(56) References Cited

U.S. PATENT DOCUMENTS

| | | | |
|---|---|---|---|
| 4,063,717 A | 12/1977 | Booy | |
| 5,573,332 A * | 11/1996 | Weihrich et al. | 366/85 |
| 6,447,156 B2 * | 9/2002 | Maris | 366/82 |
| 2005/0041521 A1 * | 2/2005 | Herter | 366/82 |
| 2005/0063246 A1 * | 3/2005 | Ponzielli | 366/85 |
| 2005/0084559 A1 * | 4/2005 | Blach | 425/208 |

OTHER PUBLICATIONS

Klemens Kohlgruber, et al., Co-Rotating Twin-Screw Extruders: Fundamentals, Technology, and Applications, Hanser Gardner Publications, Chapter 5.2, 92-94 (2007).

Klemens Kohlgruber, et al., Co-Rotating Twin-Screw Extruders: Fundamentals, Technology, and Applications, Hanser Gardner Publications, Chapter 5.8, pp. 103-104 (2007).

Klemens Kohlgruber, et al., Co-Rotating Twin-Screw Extruders: Fundamentals, Technology, and Applications, Hanser Gardner Publications, Chapter 12, 215-235 (2007).

Ishikawa T. et al., "Numberical Simulation and Experimental Verification of Non0sothermal Flow in Counter-Rotating Nonintermeshing Continuous Mixers" Polymer Engineering & Science, Wiley, Hoboken, NJ, US Bd. 40, Nr. 2, 1. Feb. 2000, pp. 365-375, XP000926884, ISSN 0032-3888.

Boony "Geometry of fully wiped twin-screw equipment", Polymer Engineering and Science 18 (1978) 12, S. 973-984.

* cited by examiner

1) R = 0.6300  Mx = 0.0000
   α = 0.9168  My = 0.0000
2) R = 0.0000  Mx = 0.3833
   α = 0.6540  My = 0.5000
2') R = 1.0000  Mx = 0.3833
   α = 0.6540  My = -0.5000
1') R = 0.3700  Mx = 0.0000
   α = 0.9168  My = 0.0000

1) R = 0.0000  Mx = 0.5800
   α = 0.5236  My = 0.0000
2) R = 1.0000  Mx = -0.2860
   α = 1.0472  My = -0.5000
2') R = 0.0000  Mx = -0.2860
   α = 1.0472  My = 0.5000
1') R = 1.0000  Mx = 0.5800
   α = 0.5236  My = -0.0000

1) R = 0.0000  Mx = 0.6300
   α = 0.5236  My = 0.0000
2) R = 1.0000  Mx = -0.2360
   α = 1.0472  My = -0.5000
2') R = 0.0000  Mx = -0.2360
   α = 1.0472  My = 0.5000
1') R = 1.0000  Mx = 0.6300
   α = 0.5236  My = -0.0000

1) R = 0.0000  Mx = 0.6300
   α = 0.4189  My = 0.0000
2) R = 0.8428  Mx = -0.1399
   α = 1.1519  My = -0.3428
2') R = 0.1572  Mx = -0.1399
   α = 1.1519  My = 0.3428
1') R = 1.0000  Mx = 0.6300
   α = 0.4189  My = -0.0000

RA = 0.6300

1) R = 0.0000  Mx = 0.6300
   α = 0.3142  My = 0.0000
2) R = 0.7236  Mx = -0.0582
   α = 1.2566  My = -0.2236
2') R = 0.2764  Mx = -0.0582
   α = 1.2566  My = 0.2236
1') R = 1.0000  Mx = 0.6300
   α = 0.3142  My = -0.0000

RA = 0.6300

1) R = 0.0000  Mx = 0.6300
   α = 0.2094  My = 0.0000
2) R = 0.6312  Mx = 0.0126
   α = 1.3614  My = -0.1312
2') R = 0.3688  Mx = 0.0126
   α = 1.3614  My = 0.1312
1') R = 1.0000  Mx = 0.6300
   α = 0.2094  My = -0.0000

RA = 0.6300

1) R = 0.0000  Mx = 0.6300
   α = 0.1047  My = 0.0000
2) R = 0.5584  Mx = 0.0747
   α = 1.4661  My = -0.0584
2') R = 0.4416  Mx = 0.0747
   α = 1.4661  My = 0.0584
1') R = 1.0000  Mx = 0.6300
   α = 0.1047  My = -0.0000

RA = 0.6300

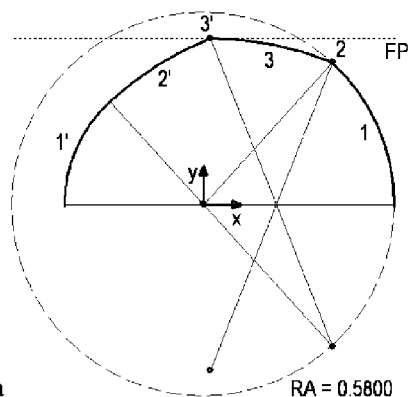
Figure 9a    RA = 0.5800
1) R = 0.5800  Mx = 0.0000
   α = 0.8315  My = 0.0000
2) R = 0.0000  Mx = 0.3908
   α = 0.3591  My = 0.4286
3) R = 1.0000  Mx = 0.0197
   α = 0.3802  My = -0.5000
3') R = 0.0000  Mx = 0.0197
   α = 0.3802  My = 0.5000
2') R = 1.0000  Mx = 0.3908
   α = 0.3591  My = -0.4286
1') R = 0.4200  Mx = 0.0000
   α = 0.8315  My = 0.0000
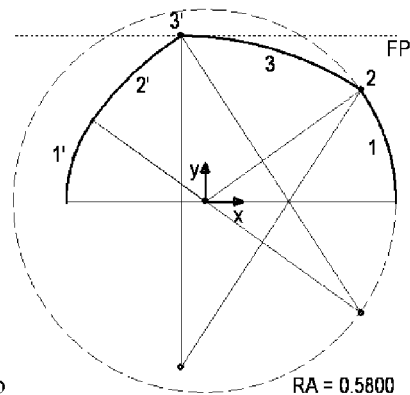
Figure 9b    RA = 0.5800
1) R = 0.5800  Mx = 0.0000
   α = 0.6236  My = 0.0000
2) R = 0.0000  Mx = 0.4708
   α = 0.3713  My = 0.3387
3) R = 1.0000  Mx = -0.0738
   α = 0.5759  My = -0.5000
3') R = 0.0000  Mx = -0.0738
   α = 0.5759  My = 0.5000
2') R = 1.0000  Mx = 0.4708
   α = 0.3713  My = -0.3387
1') R = 0.4200  Mx = 0.0000
   α = 0.6236  My = 0.0000
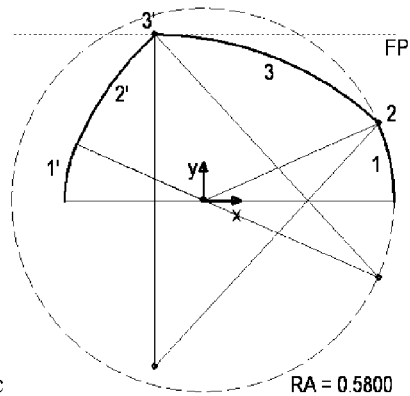
Figure 9c    RA = 0.5800
1) R = 0.5800  Mx = 0.0000
   α = 0.4157  My = 0.0000
2) R = 0.0000  Mx = 0.5306
   α = 0.4088  My = 0.2342
3) R = 1.0000  Mx = -0.1483
   α = 0.7462  My = -0.5000
3') R = 0.0000  Mx = -0.1483
   α = 0.7462  My = 0.5000
2') R = 1.0000  Mx = 0.5306
   α = 0.4088  My = -0.2342
1') R = 0.4200  Mx = 0.0000
   α = 0.4157  My = 0.0000
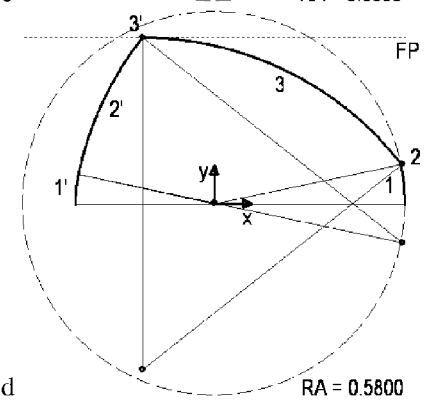
Figure 9d    RA = 0.5800
1) R = 0.5800  Mx = 0.0000
   α = 0.2079  My = 0.0000
2) R = 0.0000  Mx = 0.5675
   α = 0.4605  My = 0.1197
3) R = 1.0000  Mx = -0.2173
   α = 0.9024  My = -0.5000
3') R = 0.0000  Mx = -0.2173
   α = 0.9024  My = 0.5000
2') R = 1.0000  Mx = 0.5675
   α = 0.4605  My = -0.1197
1') R = 0.4200  Mx = 0.0000
   α = 0.2079  My = 0.0000

1) R = 0.5800  Mx = 0.0000
   α = 0.8315  My = 0.0000
2) R = 0.1250  Mx = 0.3066
   α = 0.3852  My = 0.3362
3) R = 0.7500  Mx = 0.0898
   α = 0.3542  My = −0.2500
3') R = 0.2500  Mx = 0.0898
   α = 0.3542  My = 0.2500
2') R = 0.8750  Mx = 0.3066
   α = 0.3852  My = −0.3362
1') R = 0.4200  Mx = 0.0000
   α = 0.8315  My = 0.0000

1) R = 0.5800  Mx = 0.0000
   α = 0.6236  My = 0.0000
2) R = 0.1250  Mx = 0.3694
   α = 0.3468  My = 0.2657
3) R = 0.7500  Mx = 0.0163
   α = 0.6004  My = −0.2500
3') R = 0.2500  Mx = 0.0163
   α = 0.6004  My = 0.2500
2') R = 0.8750  Mx = 0.3694
   α = 0.3468  My = −0.2657
1') R = 0.4200  Mx = 0.0000
   α = 0.6236  My = 0.0000

1) R = 0.5800  Mx = 0.0000
   α = 0.4157  My = 0.0000
2) R = 0.1250  Mx = 0.4162
   α = 0.3513  My = 0.1838
3) R = 0.7500  Mx = −0.0337
   α = 0.8037  My = −0.2500
3') R = 0.2500  Mx = −0.0337
   α = 0.8037  My = 0.2500
2') R = 0.8750  Mx = 0.4162
   α = 0.3513  My = −0.1838
1') R = 0.4200  Mx = 0.0000
   α = 0.4157  My = 0.0000

1) R = 0.5800  Mx = 0.0000
   α = 0.2079  My = 0.0000
2) R = 0.1250  Mx = 0.4452
   α = 0.3748  My = 0.0939
3) R = 0.7500  Mx = −0.0767
   α = 0.9881  My = −0.2500
3') R = 0.2500  Mx = −0.0767
   α = 0.9881  My = 0.2500
2') R = 0.8750  Mx = 0.4452
   α = 0.3748  My = −0.0939
1') R = 0.4200  Mx = 0.0000
   α = 0.2079  My = 0.0000

1) R = 0.5800  Mx = 0.0000
   α = 0.8315  My = 0.0000
2) R = 0.2500  Mx = 0.2223
   α = 0.6111  My = 0.2438
3) R = 1.0000  Mx = 0.1265
   α = 0.1282  My = -0.5000
3') R = 0.0000  Mx = 0.1265
   α = 0.1282  My = 0.5000
2') R = 0.7500  Mx = 0.2223
   α = 0.6111  My = -0.2438
1') R = 0.4200  Mx = 0.0000
   α = 0.8315  My = 0.0000

RA = 0.5800

1) R = 0.5800  Mx = 0.0000
   α = 0.6236  My = 0.0000
2) R = 0.2500  Mx = 0.2679
   α = 0.5538  My = 0.1927
3) R = 1.0000  Mx = -0.0196
   α = 0.3934  My = -0.5000
3') R = 0.0000  Mx = -0.0196
   α = 0.3934  My = 0.5000
2') R = 0.7500  Mx = 0.2679
   α = 0.5538  My = -0.1927
1') R = 0.4200  Mx = 0.0000
   α = 0.6236  My = 0.0000

RA = 0.5800

1) R = 0.5800  Mx = 0.0000
   α = 0.4157  My = 0.0000
2) R = 0.2500  Mx = 0.3019
   α = 0.5896  My = 0.1333
3) R = 1.0000  Mx = -0.0999
   α = 0.5654  My = -0.5000
3') R = 0.0000  Mx = -0.0999
   α = 0.5654  My = 0.5000
2') R = 0.7500  Mx = 0.3019
   α = 0.5896  My = -0.1333
1') R = 0.4200  Mx = 0.0000
   α = 0.4157  My = 0.0000

RA = 0.5800

1) R = 0.5800  Mx = 0.0000
   α = 0.2079  My = 0.0000
2) R = 0.2500  Mx = 0.3229
   α = 0.6516  My = 0.0681
3) R = 1.0000  Mx = -0.1668
   α = 0.7114  My = -0.5000
3') R = 0.0000  Mx = -0.1668
   α = 0.7114  My = 0.5000
2') R = 0.7500  Mx = 0.3229
   α = 0.6516  My = -0.0681
1') R = 0.4200  Mx = 0.0000
   α = 0.2079  My = 0.0000

RA = 0.5800

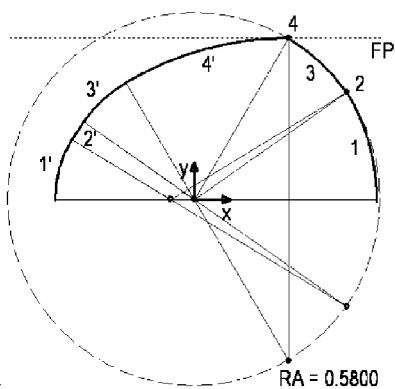

Figure 16a

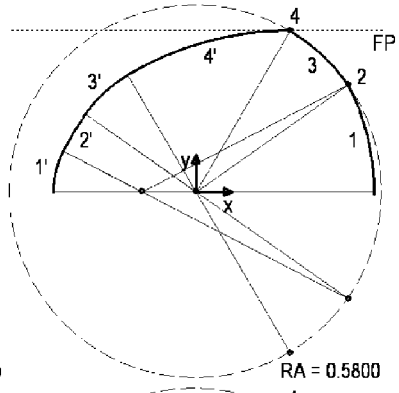

Figure 16b

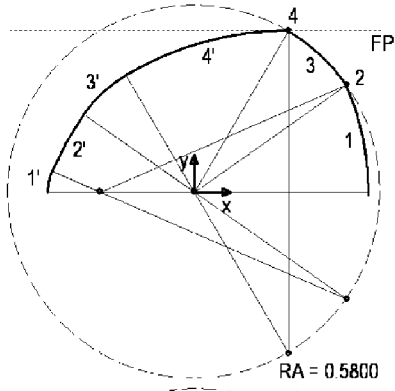

Figure 16c

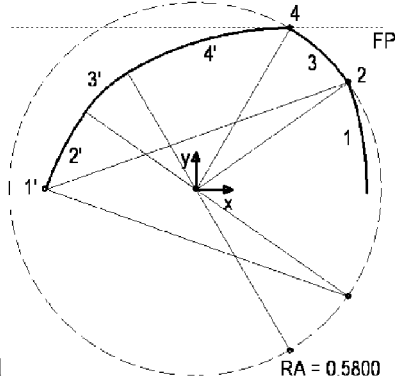

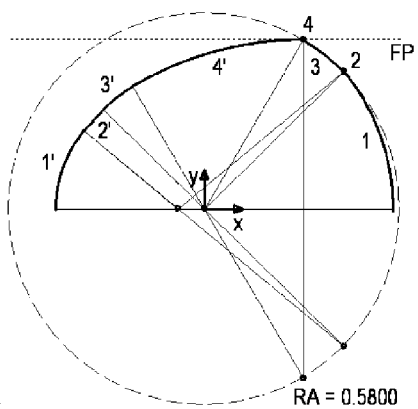

Figure 17a

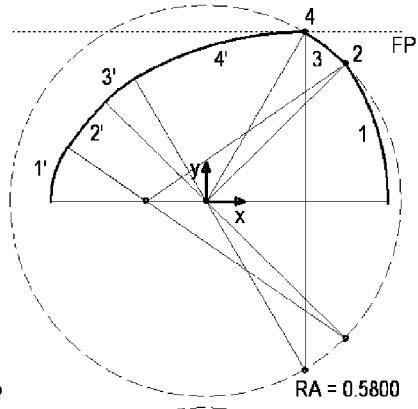

Figure 17b

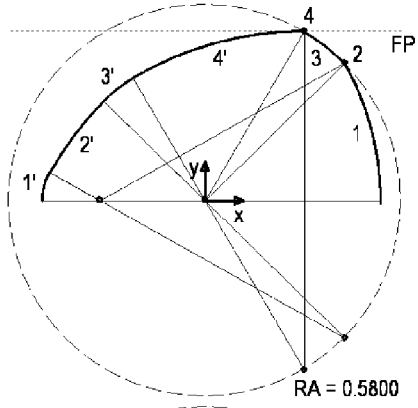

Figure 17c

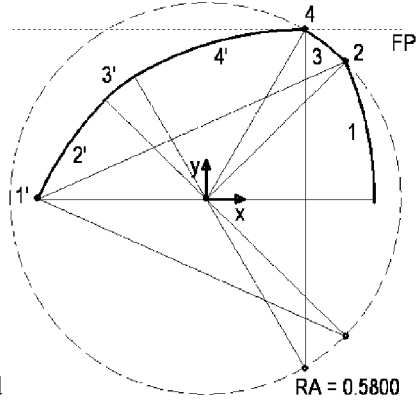

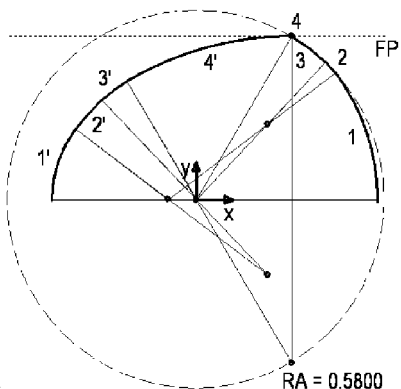

Figure 18a

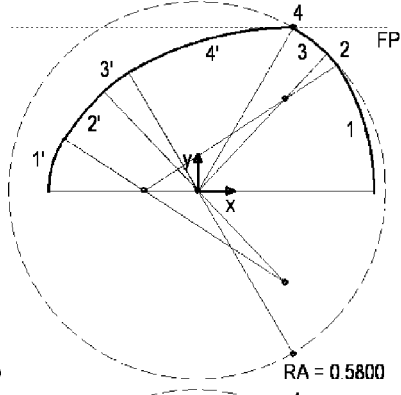

Figure 18b

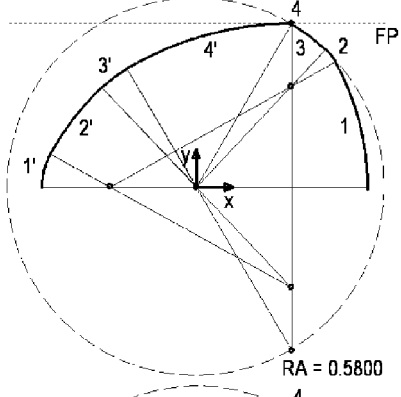

Figure 18c

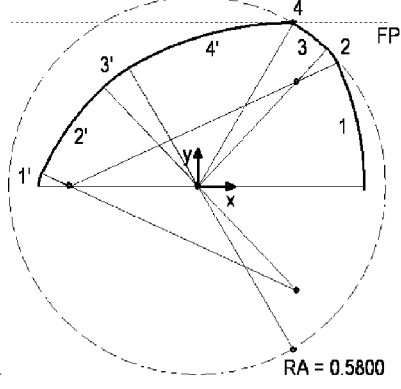

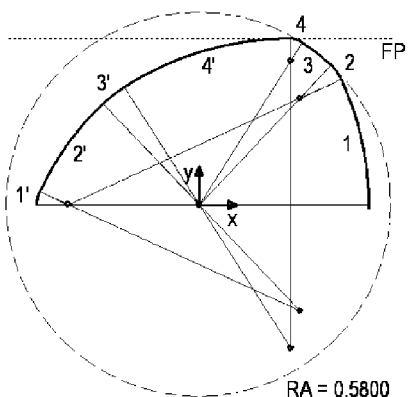

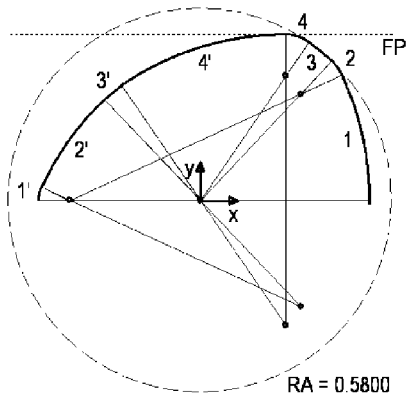

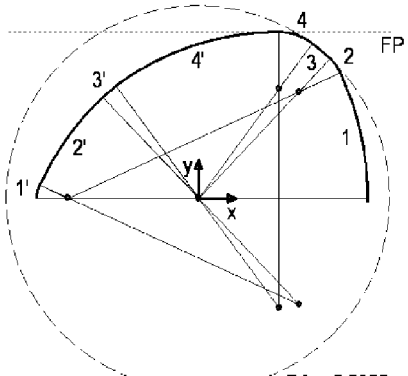

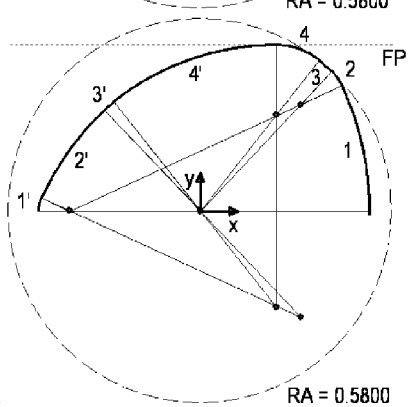

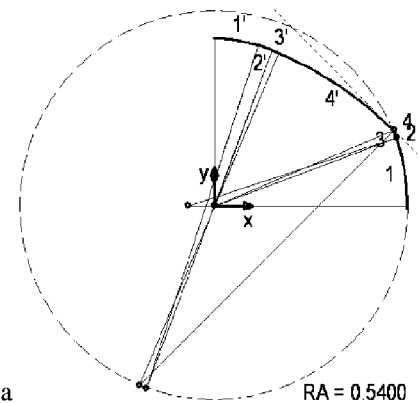

Figure 42a

| | | |
|---|---|---|
| 1) | R = 0.6080 | Mx = -0.0720 |
| | α = 0.3149 | My = 0.0000 |
| 2) | R = 0.0000 | Mx = 0.5061 |
| | α = 0.0413 | My = 0.1883 |
| 3) | R = 0.5400 | Mx = 0.0000 |
| | α = 0.0419 | My = 0.0000 |
| 4) | R = 0.0000 | Mx = 0.4978 |
| | α = 0.3873 | My = 0.2093 |
| 4') | R = 1.0000 | Mx = -0.2093 |
| | α = 0.3873 | My = -0.4978 |
| 3') | R = 0.4600 | Mx = 0.0000 |
| | α = 0.0419 | My = 0.0000 |
| 2') | R = 1.0000 | Mx = -0.1883 |
| | α = 0.0413 | My = -0.5061 |
| 1') | R = 0.3920 | Mx = 0.0000 |
| | α = 0.3149 | My = 0.0720 |

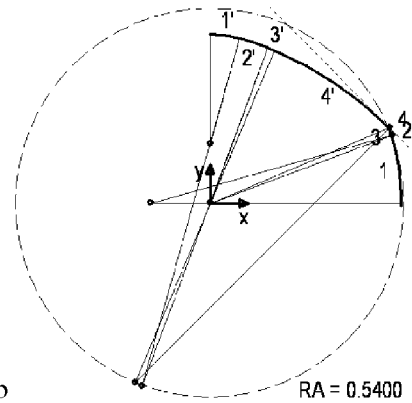

Figure 42b

| | | |
|---|---|---|
| 1) | R = 0.6976 | Mx = -0.1656 |
| | α = 0.2734 | My = 0.0000 |
| 2) | R = 0.0000 | Mx = 0.5061 |
| | α = 0.0829 | My = 0.1883 |
| 3) | R = 0.5400 | Mx = 0.0000 |
| | α = 0.0419 | My = 0.0000 |
| 4) | R = 0.0000 | Mx = 0.4978 |
| | α = 0.3873 | My = 0.2093 |
| 4') | R = 1.0000 | Mx = -0.2093 |
| | α = 0.3873 | My = -0.4978 |
| 3') | R = 0.4600 | Mx = 0.0000 |
| | α = 0.0419 | My = 0.0000 |
| 2') | R = 1.0000 | Mx = -0.1883 |
| | α = 0.0829 | My = -0.5061 |
| 1') | R = 0.3024 | Mx = 0.0000 |
| | α = 0.2734 | My = 0.1656 |

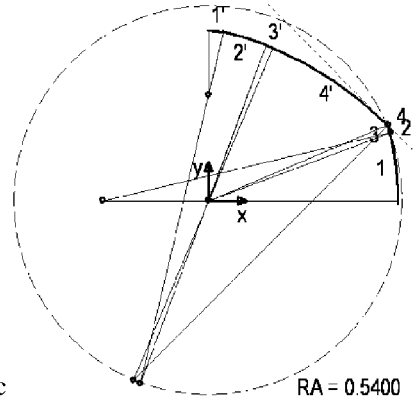

Figure 42c

| | | |
|---|---|---|
| 1) | R = 0.8206 | Mx = -0.2926 |
| | α = 0.2316 | My = 0.0000 |
| 2) | R = 0.0000 | Mx = 0.5061 |
| | α = 0.1247 | My = 0.1883 |
| 3) | R = 0.5400 | Mx = 0.0000 |
| | α = 0.0419 | My = 0.0000 |
| 4) | R = 0.0000 | Mx = 0.4978 |
| | α = 0.3873 | My = 0.2093 |
| 4') | R = 1.0000 | Mx = -0.2093 |
| | α = 0.3873 | My = -0.4978 |
| 3') | R = 0.4600 | Mx = 0.0000 |
| | α = 0.0419 | My = 0.0000 |
| 2') | R = 1.0000 | Mx = -0.1883 |
| | α = 0.1247 | My = -0.5061 |
| 1') | R = 0.1794 | Mx = 0.0000 |
| | α = 0.2316 | My = 0.2926 |

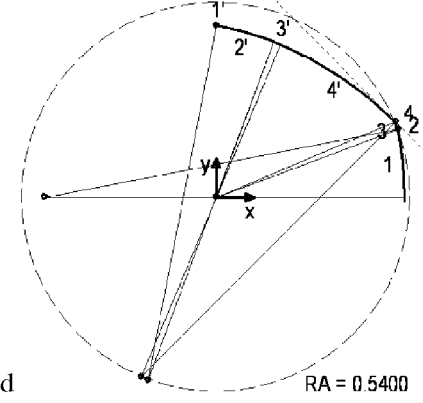

Figure 42d

| | | |
|---|---|---|
| 1) | R = 0.9995 | Mx = -0.4755 |
| | α = 0.1895 | My = 0.0000 |
| 2) | R = 0.0000 | Mx = 0.5061 |
| | α = 0.1667 | My = 0.1883 |
| 3) | R = 0.5400 | Mx = 0.0000 |
| | α = 0.0419 | My = 0.0000 |
| 4) | R = 0.0000 | Mx = 0.4978 |
| | α = 0.3873 | My = 0.2093 |
| 4') | R = 1.0000 | Mx = -0.2093 |
| | α = 0.3873 | My = -0.4978 |
| 3') | R = 0.4600 | Mx = 0.0000 |
| | α = 0.0419 | My = 0.0000 |
| 2') | R = 1.0000 | Mx = -0.1883 |
| | α = 0.1667 | My = -0.5061 |
| 1') | R = 0.0005 | Mx = 0.0000 |
| | α = 0.1895 | My = 0.4755 |

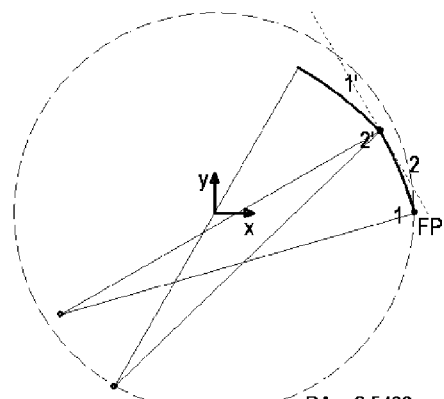
1) R = 0.0000  Mx = 0.5433
   α = 0.2803  My = 0.0000
2) R = 1.0000  Mx = -0.4176
   α = 0.2433  My = -0.2766
2') R = 0.0000  Mx = 0.4484
    α = 0.2433  My = 0.2234
1') R = 1.0000  Mx = -0.2717
    α = 0.2803  My = -0.4705
Figure 49a          RA = 0.5433
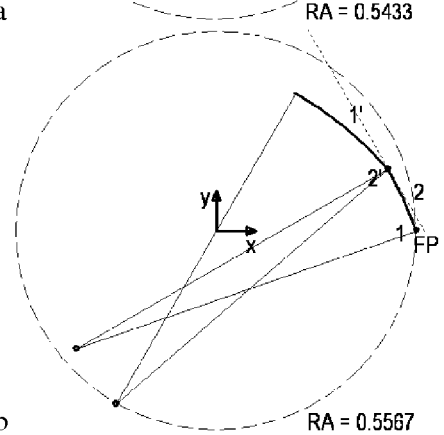
1) R = 0.0000  Mx = 0.5567
   α = 0.3340  My = 0.0000
2) R = 1.0000  Mx = -0.3881
   α = 0.1896  My = -0.3278
2') R = 0.0000  Mx = 0.4779
    α = 0.1896  My = 0.1722
1') R = 1.0000  Mx = -0.2783
    α = 0.3340  My = -0.4821
Figure 49b          RA = 0.5567

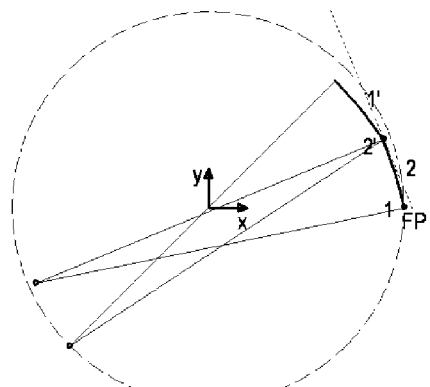
1) R = 0.0000  Mx = 0.5217
   α = 0.2024  My = 0.0000
2) R = 1.0000  Mx = -0.4579
   α = 0.1903  My = -0.2010
2') R = 0.0000  Mx = 0.4659
   α = 0.1903  My = 0.1816
1') R = 1.0000  Mx = -0.3689
   α = 0.2024  My = -0.3689
Figure 56a      RA = 0.5217
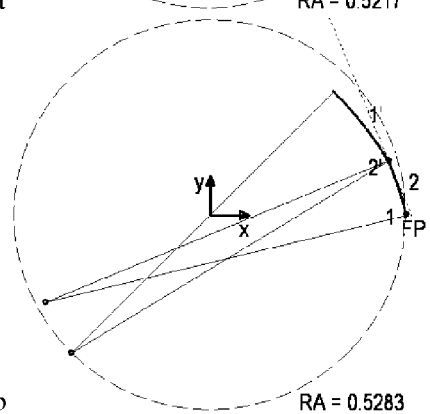
1) R = 0.0000  Mx = 0.5283
   α = 0.2384  My = 0.0000
2) R = 1.0000  Mx = -0.4434
   α = 0.1543  My = -0.2361
2') R = 0.0000  Mx = 0.4805
   α = 0.1543  My = 0.1466
1') R = 1.0000  Mx = -0.3736
   α = 0.2384  My = -0.3736
Figure 56b      RA = 0.5283

METHOD FOR CONSTRUCTING CO-ROTATING CONTIGUOUS BODIES AND COMPUTER PROGRAM PRODUCT FOR CARRYING OUT SAID METHOD AND SCREW ELEMENTS PRODUCED ACCORDINGLY

This is an application filed under 35 USC §371 of PCT/EP2009/003549, claiming priority to DE 10 2008 029 304.0 filed on Jun. 20, 2008.

BACKGROUND OF THE INVENTION (1) Field of the Invention

The present invention relates to a method of generating tightly intermeshing, self-cleaning, co-rotating screw profiles, a computer program product for carrying out the method in a computer system, novel screw profiles generated by the method and the use of the screw profiles obtained in screw and transition elements.

(2) Description of Related Art

Those skilled in the art are familiar with co-rotating twin- and multiscrew extruders from the patent and technical literature. The following publication can be mentioned as an example: K. Kohlgrüber: "*Der gleichläufige Doppelschneckenextruder*", ("The co-rotating twin-screw extruder"), Publishers: Hanser Verlag, 2007. This publication explains in detail the design, function and operation of twin- and multi-screw extruders. An entire chapter (pages 227-248) is devoted to the subject of screw elements and their mode of action. A detailed explanation is provided of the design and the function of conveying, kneading and mixing elements. In order to provide a transition between screw elements with different numbers of flights (or screw channels), washers are frequently used as spacers. In special cases, so-called transition elements are used which provide a continuous transition between two screw profiles with different numbers of flights, a self-cleaning pair of screw profiles being present at each transition point. When mentioned and described in the following, the terms screw elements and screw profiles are also understood to include transition elements and their profiles. The profiles of the transition elements are also referred to as transition profiles.

As is well-known to those skilled in the art and as is explained, for example, on pages 96 to 98 of *Kohlgrüber*, the known self-cleaning Erdmenger screw profile is clearly defined by the following three parameters: the number of flights z the outer screw radius ra and the centre distance a. The number of flights z is an integer greater than or equal to 1. An additional important parameter of screw profiles is their inner radius ri. Another important parameter of screw profiles is their flight depth h. (For the sake of clarity, in the description all abbreviations, symbols and indices used are written in italics and in the figures all abbreviations, symbols and indices used are written in normal script.)

As is well-known to those skilled in the art and as is explained, for example, on pages 96 to 98 of Kohlgrüber, the known self-cleaning Erdmenger screw profile consists of arcs of circles. The size of an arc is defined by its central angle and its radius. In the following, the "central angle of an arc" is abbreviated to the "angle of an arc". The position of an arc is defined by the position of its central point and that of its starting or end point. The position of the starting point and the end point of an arc is, however, not predefined, since an arc can begin or end either in a clockwise or an anti-clockwise direction. The starting and end points are therefore interchangeable.

The methods so far known for producing tightly intermeshing, self-cleaning, co-rotating screw profiles have the disadvantage that they are mathematically complicated and always associated with specific screw profiles, such as, for example, the Erdmenger screw profile. Known processes for producing Erdmenger screw profiles are described for example in Kohlgrüber or in the publication by Booy: "*Geometry of fully wiped twin-screw equipment*", Polymer Engineering and Science 18 (1978) 12, pages 973-984. In the aforementioned publications screw profiles are generated by making use of the kinematic peculiarity that the same sense rotation (=co-rotation) of two screws about their stationary axes is kinematically identical to the "movement without rotation" of one screw about another, in this case stationary, screw. This phenomenon can be used for the stepwise generation of screw profiles. The first screw (the "generated" screw) remains stationary using such a method and the second screw (the "generating" screw) is moved translationally around the first screw on an arc. It is then possible to predefine part of the profile in the second screw and examine which profile is thereby generated in the first screw. The generated screw is "carved" by the generating screw. Kohlgrüber does not, however, describe how the predefined part of the second screw is actually to be generated. Booy describes a possible method of generating the starting profile section from which the remaining profile is generated. This method is, however, mathematically very complicated and above all not universally applicable, i.e. it is not possible to generate any desired type of profile for screw and transition elements using this method.

Based on the prior art, the problem therefore arises of providing a method for generating screw profiles in which screw profiles can be generated without any predefined existing profiles and/or profile sections. The problem also arises of providing a method of generating any desired profiles for tightly intermeshing screw and transition elements. The problem also arises of providing a simple method of generating profiles for tightly intermeshing screw and transition elements. This method must be capable of being carried out by the mere use of a pair of compasses and an angle ruler without the need for complicated computations.

BRIEF SUMMARY OF THE INVENTION

Surprisingly it has been found that the above problem can be solved by a method in which the profiles of screw elements can be formed completely of arcs which merge tangentially into each other, it being possible for an arc also to have a radius of zero.

The present invention therefore relates to a method of generating planar, tightly intermeshing, self-cleaning, co-rotating screw profiles with a selectable centre distance a between the rotating axes of a generating and a generated screw profile, characterized in that the generating screw profile consists of n arcs and the generated screw profile consists of n' arcs.

The method according to the invention is not limited to screw elements with a modular design of the type commonly used today with a screw consisting of screw elements and central shafts, but can also be used for screws designed in one piece. Screw elements therefore also refer to screws designed as integrated wholes.

The method according to the invention provides its user with certain degrees of freedom, which are characterized in that specific parameters can be freely selected. Certain requirements do, however, have to be fulfilled for obtaining valid screw profiles. Thus certain parameters have to have a specific value or have to lie within a certain range of values.

Valid screw profiles are understood to be screw profiles which have the required properties, i.e. which are planar, tightly intermeshing, self-cleaning and rotate in the same direction. Such screw profiles can be used for producing screw and transition elements in multiscrew extruders.

The method V0 according to the invention is characterized in that the generating screw profile and the generated screw profile lie in the same plane, the axis of rotation of the generating screw profile and the axis of rotation of the generated screw profile each lie vertically on said plane of the screw profiles, the point of intersection between the rotational axis of the generating screw profile and said plane being referred to as the point of rotation of the generating screw profile and the point of intersection between the rotational axis of the generated screw profile and said plane being referred to as the point of rotation of the generated screw profile, the number of arcs n of the generating screw profile is selected such that n is an integer greater or equal to 1, the outer radius ra of the generating screw profile is selected such that ra is greater than 0 (ra>0) and smaller than or equal to the distance between the axes (the centre distance) (ra≤a), the inner radius ri of the generating screw profile is selected such that ri is greater than or equal to 0 (ri≥0) and smaller than or equal to ra (ri≤ra), the arcs of the generating screw profile are arranged clockwise or anti-clockwise about the rotational axis of the generating screw profile in such a manner according to the following configuration rules that:

all of the arcs of the generating screw profile merge into each other tangentially such that a closed, convex screw profile is obtained, wherein an arc whose radius is 0 is treated as an arc whose radius is eps, which is a very small positive real number which tends towards 0 (eps<<1, eps→0), each of the arcs of the generating screw profile is located within and/or on the boundaries of an annulus which has an outer radius ra and an inner radius ri and whose centre point lies on the point of rotation of the generating screw profile, at least one of the arcs of the generating screw profile touches the outer radius ra of the generating screw profile, at least one of the arcs of the generating screw profile touches the inner radius ri of the generating screw profile, the size of a first arc of the generating screw profile which is defined by an angle $\alpha\_1$ and a radius $r\_1$ is selected such that angle $\alpha\_1$ is, in terms of radian measurement, greater than or equal to 0 and smaller than or equal to $2\pi$, wherein $\pi$ is understood to be pi ($\pi \approx 3.14159$), and radius $r\_1$ is greater than or equal to 0 and smaller than or equal to the centre distance a, and the position of this first arc of the generating screw profile, which is obtained by positioning two different points of this first arc, is defined according to the above configuration rules, wherein the first point of this first arc to be positioned is preferably the starting point of this first arc and wherein the second point of this first arc to be positioned is preferably the centre point of this first arc, the sizes of additional n−2 arcs of the generating screw profile, which are defined by angles $\alpha\_2, \ldots, \alpha\_(n-1)$ and radii $r\_2, \ldots, r\_(n-1)$ are selected such that angles $\alpha\_2, \ldots, \alpha\_(n-1)$ are, in terms of radian measurement, greater than or equal to 0 and smaller than or equal to $2\pi$ and radii $r\_2, \ldots, r\_(n-1)$ are greater than or equal to 0 and smaller than or equal to the centre distance a and the positions of these additional n−2 arcs of the generating screw profile are defined according to the above configuration rules, the size of the last arc of the generating screw profile, which is defined by angle $\alpha\_n$ and radius $r\_n$, is such that the sum of the n angles of the n arcs of the generating screw profile is, in terms of radian measurement, $2\pi$, wherein angle $\alpha\_n$ is, in terms of radian measurement, greater than or equal to 0 and smaller than or equal to $2\pi$, and radius $r\_n$ completes the generating screw profile, wherein radius $r\_n$ is greater than or equal to 0 and smaller than or equal to the centre distance a and the position of this last arc of the generating screw profile is defined according to the above configuration rules, the n' arcs of the generated screw profile are based on the n arcs of the generating screw profile such that the number of arcs n' of the generated screw profile is identical to the number of arcs n of the generating screw profile, wherein n' is an integer, the outer radius ra' of the generated screw profile is equal to the centre distance minus the inner radius ri of the generating screw profile (ra'=a−ri), the inner radius ri' of the generated screw profile is equal to the centre distance minus the outer radius ra of the generating screw profile (ri'=a−ra), angle $\alpha\_i'$ of the i'nth arc of the generated screw profile is the same as angle $\alpha\_i$ of the inth arc of the generating screw profile, wherein i is an index which represents all integers in the range from 1 to the number of arcs n and i' is an index which represents all integers in the range from 1 to the number of arcs n'($\alpha\_1' = \alpha\_1, \ldots, \alpha\_n' = \alpha\_n$), the sum of radius $r\_i'$ of the i'nth arc of the generated screw profile and radius $r\_i$ of the inth arc of the generating screw profile is equal to the centre distance a, wherein i is an index which represents all integers in the range from 1 to the number of arcs n and i' is an index which represents all integers in the range from 1 to the number of arcs n'($r\_1' + r\_1 = a, \ldots, r\_n' + r\_n = a$), the distance between the centre point of the i'nth arc of the generated screw profile and the centre point of the inth arc of the generating screw profile is the same as the centre distance a and the distance between the centre point of the i'nth arc of the generated screw profile and the point of rotation of the generated screw profile is the same as the distance between the centre point of the inth arc of the generating screw profile and the point of rotation of the generating screw profile, and the connecting line between the centre point of the i'nth arc of the generated screw profile and the centre point of the inth arc of the generating screw profile is a line parallel to the connecting line between the point of rotation of the generated screw profile and the point of rotation of the generating screw profile, wherein i is an index which represents all integers in the range from 1 to the number of arcs n and i' is an index which represents all integers in the range from 1 to the number of arcs n', the starting point of the i'nth arc of the generated screw profile lies in an opposite direction, in relation to the centre point of the i'nth arc of the generated screw profile, to that of the starting point of the inth arc of the generating screw profile, in relation to the centre point of the inth arc of the generating screw profile, wherein i is an index which represents all integers in the range from 1 to the number of arcs n and i' is an index which represents all integers in the range from 1 to the number of arcs n'.

The method V0 according to the invention for generating planar, tightly intermeshing, self-cleaning, co-rotating screw profiles produces the following features in the generated screw profile:
- the generated screw profile is closed,
- the generated screw profile is convex,
- each of the arcs of the generated screw profile merges tangentially into the next arc of the generated screw profile, wherein an arc with a radius of 0 is treated as an arc with a radius of eps, which is a very small positive real number which tends towards 0 (eps<<1, eps→0),
- each of the arcs of the generated screw profile is located within and/or on the boundaries of an annulus which has an outer radius ra' and an inner radius ri' and whose centre point is located on the point of rotation of the generated screw profile,
- at least one of the arcs of the generated screw profile touches the outer radius ra' of the generated screw profile,
- at least one of the arcs of the generated screw profile touches the inner radius ri' of the generated screw profile.

A further result of the method V0 of generating planar, tightly intermeshing, self-cleaning, co-rotating screw profiles is that only if the inner radius ri of the generating screw profile equals the centre distance a minus the outer radius ra of the generating screw profile (ri=a−ra) the outer radius ra' of the generated screw profile is equal to the outer radius ra of the generating screw profile and the inner radius ri' of the generated screw profile is equal to the inner radius ri of the generating screw profile.

If the generating screw profile has an arc with a radius $r\_i=0$, the screw profile has, at the point of this arc, a bend whose size is characterized by an angle $\alpha\_i$. If the generated screw profile has an arc with a radius $r\_i'=0$, the screw profile has, at the point of this arc, a bend whose size is characterized by an angle $\alpha\_i'$.

The method V0 of generating planar, tightly intermeshing, co-rotating screw profiles is also characterized in that it can be carried out merely by using an angle ruler and a pair of compasses. Thus the tangential transition between the inth and the (i+1)nth arc of the generating screw profile is constructed by forming a circle with a radius $r\_(i+1)$ around the end point of the inth arc and that point of intersection between this circle and a straight line through the centre point and the end point of the inth arc which is located nearer the point of rotation of the generating screw profile is the centre point of the (i+1)nth arc. In practice, instead of an angle ruler and a pair of compasses, a computer program is used for constructing these screw profiles.

The method V0 according to the invention can be used for generating screw profiles which are independent from a number of flights z.

The generated screw profile can be different from the generating screw profile. As is readily understandable to anyone of ordinary skill in the art, this method V0 is particularly suitable for generating transition elements between screw elements having different numbers of flights. Based on a screw profile with z flights it is possible to change the generating and the generated screw profile gradually in such a manner that finally a screw profile with a number of flights z' which is not equal to z is obtained. It is possible to reduce or increase the number of arcs during this transition.

Typical screw profiles used in practice are characterized in that the generating and the generated screw profiles are identical for an odd number of flights and, for an even number of flights, the generated screw profile is identically superimposable on the generating screw profile after the generating or generated screw profile has rotated through an angle π/z. Such screw profiles known according to the prior art and having z flights are characterized in that they have precisely z planes of symmetry which are vertical to the plane of the generating screw profile and pass through the axis of rotation of the generating screw profile. The same applies to the generated screw profile. The screw profiles each consist of 2z sections which have a section angle of π/z based on the respective point of rotation of the corresponding screw profile and can be made to coincide with each other by rotation or mirroring about their planes of symmetry. Such screw profiles are referred to as symmetrical. In a special embodiment of the method according to the invention for generating planar, tightly intermeshing, self-cleaning, co-rotating screw profiles—hereinafter referred to as VA1—a flight number z applies, which subdivides the screw profiles into 2z sections. Using the special embodiment VA1 of the method according to the invention it is however possible to generate not only symmetrical screw profiles in which the 2z sections can be made to coincide with each other by rotation and/or mirroring about their planes of symmetry but also asymmetrical screw profiles.

This special embodiment VA1 of the method according to the invention is characterized in that:
- the number of flights z is selected such that z is an integer greater than or equal to 1,
- the number of arcs n of the generating screw profile is selected such that it is an integer multiple p of 4z,
- the generating screw profile is subdivided into 2z sections, which are characterized in that
  - each section is bounded by two straight lines which form an angle to each other, in terms of radian measurement, of π/z and which intersect each other at the point of rotation of the generating screw profile, wherein these two straight lines are referred to as section boundaries, wherein π is pi (π≈3.14159),
  - each of these 2z sections is subdivided into a first and a second part,
  - the first part of a section is composed of p arcs which are numbered in ascending or descending order,
  - the angles $\alpha\_1, \ldots, \alpha\_p$ belonging to the p arcs are selected such that the sum of these angles is π/(2z), wherein angles $\alpha\_1, \ldots, \alpha\_p$ are, in terms of radian measurement, greater than or equal to 0 and smaller than or equal to π/(2z),
  - the second part of a section is composed of p' arcs, which are numbered in reverse order to the arcs of the first part of a section, wherein p' is an integer which is the same as p,
  - angles $\alpha\_p', \ldots, \alpha\_1'$ of the p' arcs are defined such that the angle $\alpha\_j'$ of the j'th arc of the second part of a section is the same as the angle $\alpha\_j$ of the jth arc of the first part of a section, wherein j is an index which represents all integers in the range from 1 to the number of arcs p and j' is an index which represents all integers in the range from 1 to the number of arcs p' ($\alpha\_1'=\alpha\_1, \ldots, \alpha\_p'=\alpha\_p$),
  - the sum of the radius $r\_j'$ of the j'th arc of the second part of a section and the radius $r\_j$ of the jth arc of the first part of a section is equal to the centre distance a, wherein j is an index which represents all integers in the range from 1 to the number of arcs p and j' is an index which represents all integers in the range from 1 to the number of arcs p'(r_1'+r_1=a, ..., r_p'+r_p=a), the centre point and the starting point of the arc with which the screw profile begins in the first part of a section are positioned on one of the section boundaries of this section, the selected section boundary depending on whether the arcs are arranged in a clockwise or an anticlockwise direction, the end point of the arc with which the screw profile ends in the first part of a section touches a straight line FP at one point, the straight line FP being vertical to the angle bisector of the two boundary limits of this section and at such a distance from the point of rotation of the generating screw profile in the direction of this section which is equal to half the centre distance, the angle bisector passing, in the same way as the section boundaries, through the point of rotation of the generating screw profile.

The method VA1 of generating planar, tightly intermeshing, self-cleaning, co-rotating screw profiles with z flights produces a generated screw profile in which each of the sections of the generated screw profile is designed such that the radii of the arcs of the generated screw profile are, in reverse order, the same as the radii of the arcs of the generating screw profile.

Screw profiles which are generated according to the above method VA1 consist of 2z sections which can be different from each other. If the sections are different from each other, asymmetrical screw profiles are obtained.

In the case of axially symmetrical screw profiles all 2z sections can be identically superimposed by being rotated and/or by being mirrored about the section boundaries. The section boundaries are then located on the lines of intersection between the planes of symmetry of the respective profile and the plane in which the profile lies. A special embodiment VA2 of the method according to the invention exists for generating planar, axially symmetrical, tightly intermeshing, self-cleaning, co-rotating screw profiles with z flights. This special embodiment VA2 of the method according to the invention is characterized in that only a first section of the generating screw profile is predefined and the remaining sections are generated by successive mirroring about the section boundaries.

Using the method according to the invention it is also possible to generate screw profiles which are dot-symmetrical about the point of rotation (VA3). In this case the profile of one section is predefined, whereas the section on the opposite side of the profile is obtained by dot mirroring of the predefined section about the point of rotation. In this manner dot-symmetrical screw profiles can be generated section by section, although the abovementioned configuration rules must be followed in order to obtain a closed, convex profile.

All the abovementioned methods are characterized in that they can be carried out merely by using an angle ruler and a pair of compasses. Thus the tangential transition between the jth and the (j+1)th arc of the first part of a section of the generating screw profile is constructed by forming a circle with a radius r_(j+1) around the end point of the jth arc and that point of intersection of this circle with a straight line through the centre point and the end point of the jth arc which is located nearer the point of rotation of the generating screw profile is the centre point of the (j+1)th arc. In addition, where the arcs are numbered in ascending order, the pth arc of the first part of a section of the generating screw profile is constructed in such a manner that a tangent is placed on the (p−1)th arc at the end point of the (p−1)th arc, the point of intersection of the tangent with the straight line FP being the centre point of a circle whose radius is equal to the length of the distance between the end point of the (p−1)th arc and the point of intersection of the tangent with the straight line FP, and the point of intersection of the circle with the straight line FP, which is located in the direction of the selected clock direction, is the required point of contact between the end point of the pth arc and the straight line FP. In practice, instead of an angle ruler and a pair of compasses, a computer program is used for constructing the screw profiles.

As is readily understandable to a person of ordinary skill in the art from the information provided, the methods described are particularly suitable for generating transition elements between screw elements with an identical number of flights. Based on a screw profile with z flights it is possible to obtain a different z-flight screw profile, by gradually changing the screw profile in the transition. It is permissible to decrease or increase the number of arcs during the transition.

In practice a screw profile is appropriately placed in a coordinate system in order to be able to define it distinctly and in an appropriate form for further use by specifying the coordinates of characteristic parameters. It is recommendable to use dimensionless parameters (written in capital letters in the following, e.g. RA, A, RI etc.) in order to simplify the process of applying the method to different extruder sizes. The centre distance a is a useful reference value for geometrical dimensions such as, for example, lengths or radii, since this value cannot be changed in an extruder. The dimensionless centre distance is $A=a/a=1$. The dimensionless outer screw radius of a screw profile is $RA=ra/a$. The dimensionless inner radius of a screw profile is $RI=ri/a$. The dimensionless flight depth of a screw profile is $H=h/a=RA-RI$.

It is appropriate to position the point of rotation of a generating screw profile at the origin of a Cartesian coordinate system ($x=0$, $y=0$) and to position the point of rotation of the generated screw profile at point $x=A=1$, $y=0$.

One concrete embodiment VK1 of the method according to the invention is obtained by using dimensionless parameters and a Cartesian coordinate system where the point of rotation of the generating screw profile lies at the origin ($x=0$, $y=0$) and the point of rotation of the generated screw profile lies at the coordinate point $x=A=1$, $y=0$. This concrete embodiment VK1 is characterized as follows:

the generating screw profile is formed from 1, 2, ..., (i−1), i, (i+1), ..., (n−1), n arcs which are arranged in a clockwise or anticlockwise manner, wherein n is an integer greater than or equal to 1 and i is an integer which is greater than or equal to 1 and smaller than or equal to n, the outer radius RA is selected to be greater than 0 (RA>0) and smaller than or equal to the centre distance (RA≤1), the inner radius RI is selected to be greater than or equal to 0 (RI≥0) and smaller than or equal to RA (RI≤RA), the sum of the angles α_1, ..., α_n of arcs 1, ..., n of the generating screw profile is 2π, wherein π is pi (π≈3.14159), the radii R_1, ..., R_n of arcs 1, ..., n of the generating screw profile are greater than or equal to 0 and smaller than or equal to 1, the starting and centre points of a first arc of the generating screw profile are positioned on the x-axis, the starting point being positioned in the region from x=RI to x=RA and the x-coordinate of the centre point being smaller than or equal to the x-coordinate of the starting point, where i<n, the end point of the inth arc of the generating screw profile is at the same time the starting point of the (i+1)nth arc of the generating screw profile, where i=n, the end point of the inth arc of the generating screw profile is at the same time the starting point of the first arc of the generating screw profile, each arc of the generating screw profile merges tangentially into the next arc, wherein an arc with R_i=0 is treated in the same way as an arc with R_i=eps, wherein eps is a very small positive real number which tends towards 0 (eps<<1, eps→0), at no point of the generating screw profile is the distance from the point of rotation greater than the outer radius RA, at least one point of the generating screw profile the distance from the point of rotation is equal to the outer radius RA, at no point of the generating profile is the distance from the point of rotation smaller than the inner radius RI, at least one point of the generating screw profile the distance from the point of rotation is equal to the inner radius RI, the generating screw profile is convex, the generated screw profile consists of 1', 2', ..., (i−1)', i', (i+1)', ..., (n−1)', n' arcs which are arranged in the same clock direction as the arcs of the generating screw profile, wherein the number of arcs n' of the generated screw profile is equal to the number of arcs n of the generating screw profile and wherein i' is an integer which is greater than or equal to 1 and smaller than or equal to n', the angle α_i' of the i'nth arc of the generated screw profile is the same as the angle α_i of the inth arc of the generating screw profile, the sum of the radius R_i' of the i'nth arc of the generated screw profile and the radius R_i of the inth arc of the generating screw profile is 1, the starting point of the first arc of the generated screw profile is at the same time the starting point of the first arc of the generating screw profile and the centre point of the first arc of the generated screw profile is located on the x-axis, the x-coordinate of the centre point being greater than or equal to the x-coordinate of the starting point, where i'<n', the end point of the i'nth arc of the generated screw profile is at the same time the starting point of the (i+1)'nth arc of the generated screw profile, where i'=n', the end point of the i'nth arc of the generated screw profile is at the same time the starting point of the 1'nth arc of the generated screw profile, each of the arcs of the generated screw profile merges tangentially into the next arc, wherein an arc with R_i'=0 is treated in the same way as an arc with R_i'=eps, wherein eps is a very small positive real number which tends towards 0 (eps<<1, eps→0) and the generated screw profile is convex.

Some screw profiles generated using this concrete embodiment VK1 have a special feature: They contain adjacent profile-generating arcs which have the same radius and the same centre point and which can be united to form an arc with a larger angle (see for example FIGS. 62a and 62b and the corresponding description of these figures).

One concrete embodiment VK2 of the method according to the invention for screw profiles with z flights is characterized in that the flight number z is selected such that z is an integer greater than or equal to 1, the number of arcs n of the generating screw profile is selected such that it is an integer multiple p of 4z, the generating screw profile, preferably beginning with the first arc of the generating screw profile, is divided into 2z parts which are characterized in that each of these 2z parts of the generating screw profile is composed of 1, ..., j, ..., p, p', ..., j', ..., 1' arcs, wherein p' is an integer which is the same as p, and wherein j and j' are to be understood to be integers which are greater than or equal to 1 and smaller than or equal to p or p', the angles β_1, ..., β_p of arcs 1, ..., p of the first part of the generating screw profile are selected such that their sum is equal to π/(2z), wherein π is pi (π≈3.14159), the angle β_j' of the j'th arc of the first part of the generating screw profile is the same as the angle β_j of the jth arc of the first part of the generating screw profile (β_1'=β_1, ..., β_p'=β_p), the radii R_1, ..., R_p of arcs 1, ..., p of the first part of the generating screw profile are selected such that they are greater than or equal to 0 and smaller than or equal to 1, the sum of the radius R_j' of the j'th arc of the first part of the generating screw profile and the radius R_j of the jth arc of the first part of the generating screw profile is 1 (R_1'+R_1=1, ..., R_p'+R_p=1), the starting and centre points of the first arc of the first part of the generating screw profile are positioned on the x-axis, the starting point being positioned in the region from x=RI to x=RA and the x-coordinate of the centre point being smaller than or equal to x-coordinate of the starting point, the arcs are arranged in a counter-clockwise direction, the end point of the pth arc of the first part of the generating screw profile touches a straight line FP at one point, wherein the straight line FP is at a distance from the point of rotation which corresponds to half the centre distance and has a slope which is 0 where z=1 and −1/tan(π/(2z)) where z>1, in the case of axially symmetrical screw profiles, the remaining parts of the generating screw profile are characterized in that the angles of the arcs of the first part of the generating screw profile are reproduced in the same order when forming the angles of the arcs of the remaining parts of the generating screw profile, the radii of the arcs of the first part of the generating screw profile are reproduced in reverse order when forming the radii of the arcs of the second part of the generating screw profile, the radii of the arcs of the first and the second part of the generating screw profile are reproduced in the same order when forming the radii of the arcs of the remaining parts of the generating screw profile, in the case of dot-symmetrical screw profiles, the remaining parts of the generating screw profile are characterized in that a second part is generated opposite the first part by dot mirroring about the point of rotation, the remaining parts of the generating screw profile are generated analogously to the method used for the first part of the generating screw profile and their opposing parts are generated by dot mirroring about the point of rotation, in the case of asymmetrical screw profiles, the remaining parts of the generating screw profile are generated independently of each other and analogously to the method used for the first part of the generating screw profile.

Some screw profiles generated using this concrete embodiment VK2 have a special feature: They contain adjacent profile-generating arcs which have the same radius and the same centre point and which can be united to form an arc with a larger angle (see for example FIGS. 62a and 62b and the corresponding description of these figures).

The present invention also relates to profiles for screw and transition elements which have been produced by means of the method according to the invention. Surprisingly, completely new types of profiles for screw and transition elements have been obtained by the method according to the invention. Profiles according to the invention for screw and transition elements are specified in more detail in the examples.

The screw profiles which are obtained by the method according to the invention for generating tightly intermeshing, self-cleaning, co-rotating screw profiles can be used in screw and transition elements. In particular, such screw profiles can be used in conveying, kneading and mixing elements. The present invention thus also relates to conveying, kneading and mixing elements with a profile according to the invention or a profile which has been generated by the method according to the invention, as well as to methods for their production.

As is known (see, for example pages 227-248 of Kohlgrüber), a conveying element is characterized in that the screw profile continuously rotates and progresses in an axial direction in a screw-like fashion. The conveying element can be right- or left-handed. The pitch of the conveying element, i.e. the axial length required for the complete rotation of the screw profile, is preferably in the range from 0.1 to 10 times the centre distance and the axial length of a conveying element is preferably in the range from 0.1 to 10 times the centre distance.

As is known (see, for example pages 227-248 of Kohlgrüber), a kneading element is characterized in that the screw profile progresses stepwise in an axial direction in the form of kneading discs. The kneading discs can be arranged in a right-handed, left-handed or neutral fashion. The axial length of the kneading discs is preferably in the range from 0.05 to 10 times the centre distance. The axial distance between two adjacent kneading discs is preferably in the range from 0.002 to 0.1 times the centre distance.

As is known (see, for example, pages 227-248 of Kohlgrüber), mixing elements are formed by designing conveying elements with openings in the screw tips. The mixing elements can be right-handed or left-handed. Their pitch is preferably in the range from 0.1 to 10 times the centre distance and the axial length of the elements is preferably in the range from 0.1 to 10 times the centre distance. The openings are preferably designed in the form of a u- or v-shaped groove and they are preferably arranged either in a back-conveying manner or parallel to the axis.

Transition elements can be right- or left-handed. Their pitch is preferably in the range from 0.1 to 10 times the centre distance and their axial length is preferably in the range from 0.1 to 10 times the centre distance.

The present invention also relates to a co-rotating multi-screw extruder with at least one screw element whose profile has been generated by the method according to the invention, wherein the multiscrew extruder has two or more screws.

The present invention also relates to a computer program product for carrying out the method for generating tightly intermeshing, self-cleaning, co-rotating screw profiles in a computer system.

The execution of the method according to the invention in a computer system is advantageous since the coordinates and the dimensions of the profiles are in such a form that they can be processed further by a computer. In particular, flow simulation processes are simple to carry out in a computer. The profile generated by the method according to the invention is developed further in an axial direction in order to generate a three-dimensional computer model of a screw or transition element. A model of a conveying element is for example generated in such a manner that the profile is rotated in a screw-like fashion in an axial direction. A model of a kneading element is for example generated by continuing to develop the profile in an axial direction section by section, the sections being staggered in relation to each other, thus resulting in staggered discs. A so-called computational grid is used for modelling a screw or transition element in a computer. Such a grid consisting of polyhedrons, such as for example tetrahedrons or hexahedrons, is applied to the volume between the inner surface of the barrel and the surfaces of a screw or transition element. The computational grid, the physical properties of the viscous fluid and the operating conditions of the screw machine in which the screw elements and the viscous fluid are used are entered into a flow simulation program and the flow conditions are calculated. Then the computed flow fields are analyzed for determining, inter alia, the quality of the screw profile with regard to its characteristic properties such as, for example, the mixing behaviour or the power consumption in relation to the physical properties and the operating conditions used.

The computer program product according to the invention is characterized in that the method according to the invention is stored in the form of program codes on a data carrier. The data carrier is computer-readable to enable the method according to the invention to be carried out using a computer when the computer program product is executed in a computer. A suitable data carrier is, for example, a disc, an optical data carrier such as for example a CD, DVD, or Blu-ray disc, a hard disc, a flash memory or a memory stick, etc. Preferably the computer program product, if executed in a computer, has a graphical user interface (GUI) which provides users with a simple means of entering the freely selectable parameters for generating screw profiles with the aid of input devices such as, for example a mouse and/or a keyboard. In addition, the computer program product preferably has a graphical output, by means of which the computed screw profiles can be visualized in a graphical output device, such as for example a screen and/or printer. Preferably the computer program product allows computed screw profiles to be exported, i.e. in the form of storable data sets, which include the geometrical dimensions of the computed screws, or, for further types of use, to be stored on a data carrier or to be transferred to a connected device. In particular, the computer program product is designed in such a manner that, when executed in a computer, it can compute not only screw profiles but also screw and transition elements generated from the screw profiles and can deliver the computed geometries in a format that can be used by a machine for producing screw and transition elements, for example by a milling machine for producing actual screw elements. Such formats are known to those of ordinary skill in the art.

The present invention allows the generation of screw profiles, screw elements and transition elements ab initio. In contrast to the prior art, the method according to the invention is not based on existing screw profiles but allows the generation of any desired profiles by selecting the values for characteristic parameters such as for example the centre distance and the number of arcs for developing the required screw profiles and generating the screw profiles step by step by observing simple rules. The method according to the invention is simple to use and can also even be carried out using a pair of compasses and an angle ruler, without the need for complicated calculations. The method according to the invention is universally applicable, i.e. it is for example not restricted to a concrete number of flights, but it is even possible by varying the values concerned to generate profiles which merge from one flight number into another. In addition, the invention allows the generation of symmetrical and asymmetrical screw profiles, screw elements and transition elements. It is also possible to generate screw profiles in which the generating and the generated profile are different, i.e. are not identically superimposable on each other.

The invention is explained in more detail below with reference to the figures, without however being limited thereto. All of the figures were generated with the aid of a computer program.

It is recommendable to use dimensionless parameters in order to simplify the application of the method to varying extruder sizes. A useful reference value for geometrical dimensions, such as for example lengths or radii, is the centre distance a, since this value cannot be changed in an extruder. The dimensionless centre distance A is a/a=1. The dimensionless outer screw radius RA of a screw profile is ra/a. The dimensionless inner radius RI of a screw profile is ri/a. The dimensionless flight depth H of a screw profile is h/a=RA-RI.

In the figures all of the geometrical values are used in their dimensionless form. All of the angles are stated in terms of radian measurement.

The method of generating planar, tightly intermeshing, self-cleaning, co-rotating screw profiles is explained in more detail in relation to FIG. 61, without the method being however limited to this figure.

FIGS. 61a to 61f show the transition from a pair of two-flight screw profiles to a pair of one-flight screw profiles. All of these figures have the same structure, which is described in detail in the following. The generating screw profile is depicted by the screw profile on the left. The generated screw profile is depicted by the screw profile on the right. Both screw profiles consist of 16 arcs. The arcs of the generating and the generated screw profile are characterized by thick, unbroken lines labelled with the respective numbers of the arcs. Due to the plurality of arcs and the generation of the figures by means of a computer program it is possible for the numbers of individual arcs to overlap each other and therefore to be difficult to read—see, for example, arcs 3', 4' and arcs 5', 6' and 7' in FIG. 61a. Despite the somewhat poor readability of individual numbers, the structure of the profiles is nevertheless clear from the figures in combination with the present description.

The centre points of the arcs are depicted by small circles. The centre points of the arcs are connected by thin unbroken lines both to the starting point and to the end point of the corresponding arc. The outer screw radius is almost identical in size both for the generating and the generated screw profile. In the region of the screw barrel, the outer screw radius is characterized by a thin, broken line, and, in the intermeshing zone, by a thin dotted line.

FIG. 61a shows a pair of two-flight screw profiles at the start of the transition section. The generating and the generated screw profile are symmetrical to each other. Arcs 1 and 9 of the generating screw profile touch the outer screw radius over their entire length. Arcs 4, 5 and 12 and 13 of the generating screw profile touch the inner radius over their entire length. Arcs 4', 5' and 12' and 13' of the generated screw profile touch the outer screw radius over their entire length. Arcs 1' and 9' of the generated screw profile touch the inner radius over their entire length.

FIG. 61f shows a pair of one-flight screw profiles at the end of the transition section. The generating and the generated screw profile are symmetrical to each other. Arcs 1 and 12 of the generating screw profile touch the outer screw radius over their entire length. Arcs 4 and 9 of the generating screw profile touch the inner radius over their entire length. Arcs 4' and 9' of the generated screw profile touch the outer screw radius over their entire length. Arcs 1' and 12' of the generated screw profile touch the inner radius over their entire length.

FIG. 61b shows a pair of transition profiles in which the transition from the two-flight screw profiles to the one-flight screw profiles has been completed to an extent of 20%. FIG. 61c shows a pair of transition profiles in which the transition has been completed to an extent of 40%. FIG. 61d shows a pair of transition profiles in which the transition has been completed to an extent of 60%. FIG. 61e shows a pair of transition profiles in which the transition has been completed to an extent of 80%.

The transition takes place in such a manner that in all cases arc 1 of the generating screw profile touches the dimensionless outer screw radius RA over its entire length, as a result of which the corresponding arc 1' of the generated screw profile touches the dimensionless inner radius RI' over its entire length. The transition takes place in such a manner that in all cases arc 4' of the generated screw profile touches the dimensionless outer screw radius RA', as a result of which the corresponding arc 4 of the generating screw profile touches the dimensionless inner radius RI. Since in all cases one arc of the generating and one arc of the generated screw profile rests on or touches the outer screw radius the wiping of the inner barrel surface is guaranteed during the entire transition. In addition, it is clear from FIGS. 61b to 61e that the generating and the generated screw profiles are asymmetrical. A pair of transition elements consists in all cases of a first transition element which is based on the generating transition profiles and a second transition element which is based on the generated transition profiles.

FIG. 61 shows transition profiles in which the dimensionless outer screw radius of the generating screw profile and the dimensionless outer screw radius of the generated screw profile are in the range from RA=RA'=0.6146 to RA=RA'=0.6288. The method according to the invention for generating planar, tightly intermeshing, self-cleaning, co-rotating screw profiles is not limited to this range of the dimensionless outer screw radius. Using the method according to the invention, screw profiles with a dimensionless outer screw radius of the generating screw profile of between RA greater than 0 and RA smaller than or equal to 1, and preferably in the range from RA=0.52 to RA=0.707, can be generated. Using the method according to the invention, screw profiles with a dimensionless outer screw radius of the generated screw profile between RA' greater than 0 and RA' smaller than or equal to 1, and preferably in the range from RA'=0.52 to RA'=0.707, can be generated.

The method according to the invention for generating planar, tightly intermeshing, self-cleaning and co-rotating screw profiles is explained in the following using the example of the pair of screw profiles in FIG. 61d.

According to the invention, the generating and generated screw profiles are located in one plane. For the sake of simplicity this plane is placed in the xy plane of a Cartesian coordinate system. Also for the sake of simplicity the point of rotation of the generating screw profile is placed at the origin of the Cartesian coordinate system (x=0, y=0). The dimensionless centre distance between the two points of rotation of the generating and the generated screw profile is A=1. For the sake of simplicity the point of rotation of the generated screw profile is placed at coordinate x=A=1, y=0.

According to the invention the number of arcs n of the generating screw profile is selected such that n is greater than or equal to 1. In the present example the number of arcs is selected to be n=16. According to the invention, the dimensionless outer screw radius RA of the generating screw profile is selected such that it is greater than 0 and smaller than or equal to the dimensionless centre distance A. In the present example the dimensionless outer screw radius of the generating screw profile is selected to be RA=0.6203. According to the invention, the dimensionless inner radius RI of the generating screw profile is selected such that it is greater than or equal to 0 and smaller than or equal to the dimensionless outer screw radius RA. In the present example the dimensionless inner radius of the generating screw profile is selected to be RI=0.3798.

The arcs of the generating screw profile can be arranged in a clockwise or anticlockwise direction around the axis of rotation of the generating screw profile. In the present example the arcs are arranged anti-clockwise around the axis of rotation of the generating screw profile.

According to the invention, angle $\alpha\_1$ of arc 1 of the generating screw profile is selected such that it is, in terms of radian measurement, greater than or equal to 0 and smaller than or equal to $2\pi$. In the present example the angle of arc 1 is selected to be $\alpha\_1=0.2744$. According to the invention, the dimensionless radius R_1 of arc 1 of the generating screw profile is selected such that it is greater than or equal to 0 and smaller than or equal to the dimensionless centre distance A. In the present example the dimensionless radius of arc 1 is selected to R_1=RA=0.6203. According to the invention, the position of arc 1 of the generating screw profile is selected such that arc 1 is located within and/or on the boundaries of an annulus having a dimensionless outer radius RA and a dimensionless inner radius RI, whose centre point is located on the point of rotation of the generating screw profile. The position of arc 1 is preferably predefined by the positions of the starting point and the centre point of arc 1. In the present example the starting point of arc 1 is placed at coordinate x=RA=0.6203, y=0.0000 and the centre point of arc 1 at coordinate Mx_1=0.0000, My_1=0.0000. Thus, arc 1 is located on the outer screw radius RA and the configuration rule that at least one arc touches the outer screw radius RA is fulfilled.

According to the invention, the angles $\alpha\_2, \ldots, \alpha\_(n-1)$ of n−2 additional arcs, i.e. 14 additional arcs of the generating screw profile are selected such that they are, in terms of radian measurement, greater than or equal to 0 and smaller than or equal to $2\pi$. In the present example, the angles of these 14 additional arcs are selected to be $\alpha\_2=0.6330$, $\alpha\_3=0.6330$, $\alpha\_4=0.2208$, $\alpha\_5=0.1864$, $\alpha\_6=0.4003$, $\alpha\_7=0.4003$, $\alpha\_8=0.3934$, $\alpha\_9=0.2744$, $\alpha\_10=0.6330$, $\alpha\_11=0.6330$, $\alpha\_12=0.2208$, $\alpha\_13=0.1864$, $\alpha\_14=0.4143$ and $\alpha\_15=0.4143$. According to the invention, the dimensionless radii R_2, . . . , R_(n−1) of these 14 additional arcs of the generating screw profile are selected such that they are greater than or equal to 0 and smaller than or equal to the dimensionless centre distance A. In the present example the dimensionless radii of these additional 14 arcs are selected to be R_2=0.0000, R_3=1.0000, R_4=0.3797, R_5=0.7485, R_6=0.4726, R_7=0.4726, R_8=0.1977, R_9=0.4827, R_10=0.6000, R_11=0.4000, R_12=0.5173, R_13=0.1485, R_14=0.8887 and R_15=0.8887. According to the configuration rules the arcs are arranged in such a manner that they merge tangentially into each other in such a manner that a closed, convex screw profile is obtained, wherein an arc whose dimensionless radius is 0 is treated in the same way as an arc whose dimensionless radius is eps, which is a very small positive real number which tends towards 0 (eps<<1, eps→0). Based on this configuration rule the end point of an arc is at the same time the starting point of the next arc. The required tangential transition between a first arc and a second subsequent arc is such that the centre point of this second subsequent arc is positioned in such a manner on the straight line through the end point and the centre point of the first arc that the distance between the centre point of the second subsequent arc and the end point of the first arc is equal to the radius of the second subsequent arc and the screw profile is convex. An arc with a radius of 0 is treated in the same way as an arc with a very small radius eps, which tends towards 0, so that the tangential transition can continue to be constructed. Alternatively an arc with a radius of 0 can be treated in such a manner that the screw profile has a bend at the position of this arc, the size of the bend being determined by the angle of this arc. In the present example, the abovementioned configuration rule results in the following positions of the centre points of the 14 additional arcs: Mx_2=0.5971, My_2=0.1681, Mx_3=−0.0187, My_3=−0.6198, Mx_4=0.0001, My_4=0.0002, Mx_5=0.0699, My_5=−0.3619, Mx_6=−0.0316, My_6=−0.1054, Mx_7=−0.0316, My_7=−0.1054, Mx_8=−0.2855, My_8=0.0000, Mx_9=−0.0005, My_9=0.0000, Mx_10=0.1124, My_10=0.0318, Mx_11=−0.0107, My_11=−0.1258, Mx_12=−0.0072, My_12=−0.0086, Mx_13=0.0626, My_13=−0.3707, Mx_14=−0.2097, My_14=0.3176 and Mx_15=−0.2097, My_15=0.3176. The end point of arc 4 and the starting point of arc 5 are located on the dimensionless inner radius RI of the generating screw profile, thus fulfilling the configuration rule that at least one arc touches the dimensionless inner radius RI.

According to the invention, angle $\alpha\_16$ of the last arc of the generating screw profile is such that the sum of the angles of the 16 arcs of the generating screw profile is, in terms of radian measurement, $2\pi$, wherein angle $\alpha\_16$ is, in terms of radian measurement, greater than or equal to 0 and smaller than or equal to $2\pi$. In the present example, the angle of the last arc $\alpha\_16$ is 0.3654. According to the invention, the dimensionless radius R_16 of the last arc of the generating screw profile is such that this last arc closes the generating screw profile. Since the end point of arc 15 is at the same time the starting point of the first arc, the radius of arc 16, R_16, is 0.0000. The centre point of arc 16 is thus located at coordinate Mx_16=0.6203, My_16=0.0000.

In the present example, the configuration rule that all arcs of the generating screw profile are located within and/or on the boundaries of an annulus with a dimensionless outer radius RA and a dimensionless inner radius RI with a centre point at the point of rotation of the generating screw profile is also fulfilled by the angles and radii selected for the 16 arcs and their positions.

The generated screw profile is based on the generating screw profile. According to the invention, the number of arcs n' of the generated screw profile is the same as the number of arcs n of the generating screw profile. In the present example, the number of arcs of the generated screw profile n' is 16. According to the invention, the dimensionless outer screw radius RA' of the generated screw profile is equal to the dimensionless centre distance A minus the dimensionless inner radius RI of the generating screw profile. In the present example the dimensionless outer screw radius of the generated screw profile RA' is A−RI=0.6202. According to the invention, the dimensionless inner radius RI' of the generated screw profile is equal to the dimensionless centre distance A minus the dimensionless outer screw radius RA of the generating screw profile. In the present example, the dimensionless inner radius RI' of the generated screw profile is A−RA=0.3797.

According to the invention, the angle $\alpha\_i'$ of the i'nth arc of the generated screw profile is the same as the angle $\alpha\_i$ of the inth arc of the generating screw profile, wherein i is an index which represents all integers in the range from 1 to the number of arcs n and i' is an index which represents all integers in the range from 1 to the number of arcs n'. In the present example, the angles of the 16 arcs of the generated screw profile are: $\alpha\_1'=\alpha\_1=0.2744$, $\alpha\_2'=\alpha\_2=0.6330$, $\alpha\_3'=\alpha\_3=0.6330$, $\alpha\_4'=\alpha\_4=0.2208$, $\alpha\_5'=\alpha\_5=0.1864$, $\alpha\_6'=\alpha\_6=0.4003$, $\alpha\_7'=\alpha\_7=0.4003$, $\alpha\_8'=\alpha\_8=0.3934$, $\alpha\_9'=\alpha\_9=0.2744$, $\alpha\_10'=\alpha\_10=0.6330$, $\alpha\_11'=\alpha\_11=0.6330$, $\alpha\_12'=\alpha\_12=0.2208$, $\alpha\_13'=\alpha\_13=0.1864$, $\alpha\_14'=\alpha\_14=0.4143$, $\alpha\_15'=\alpha\_15=0.4143$ and $\alpha\_16'=\alpha\_16=0.3654$.

According to the invention, the sum of the dimensionless radius $R\_i'$ of the i'nth arc of the generated screw profile and the dimensionless radius $R\_i$ of the inth arc of the generating screw profile is equal to the dimensionless centre distance A, wherein i is an index which represents all integers in the range from 1 to the number of arcs n and i' is an index which represents all integers in the range from 1 to the number of arcs n'($R\_1'+R\_1=A=1, \ldots, R\_n'+R\_n=a=1$). In the present example the radii of the 16 arcs of the generated screw profile are: $R\_1'=A-R\_1=1-0.6203=0.3797$, $R\_2'=A-R\_2=1-0.0000=1.0000$, $R\_3'=A-R\_3=1-1.0000=0.0000$, $R\_4'=A-R\_4=1-0.3797=0.6203$, $R\_5'=A-R\_5=1-0.7485=0.2515$, $R\_6'=A-R\_6=1-0.4726=0.5274$, $R\_7'=A-R\_7=1-0.4726=0.5274$, $R\_8'=A-R\_8=1-0.1977=0.8023$, $R\_9'=A-R\_9=1-0.4827=0.5173$, $R\_10'=A-R\_10=1-0.6000=0.4000$, $R\_11'=A-R\_11=1-0.4000=0.6000$, $R\_12'=A-R\_12=1-0.5173=0.4827$, $R\_13'=A-R\_13=1-0.1485=0.8515$, $R\_14'=A-R\_14=1-0.8887=0.1113$ $R\_15'=A-R\_15=1-0.8887=0.1113$ and $R\_16'=A-R\_16=1-0.0000=1.0000$.

According to the invention, the distance between the centre point of the i'nth arc of the generated screw profile and the centre point of the inth arc of the generating screw profile is equal to the dimensionless centre distance A and, according to the invention, the distance between the centre point of the i'nth arc of the generated screw profile and the point of rotation of the generated screw profile is equal to the distance between the centre point of the inth arc of the generating screw profile and the point of rotation of the generating screw profile and, according to the invention, the connecting line between the centre point of the i'nth arc of the generated screw profile and the centre point of the inth arc of the generating screw profile is a line parallel to a connecting line between the point of rotation of the generated screw profile and the point of rotation of the generating screw profile, wherein i is an index which represents all integers in the range from 1 to the number of arcs n and i' is an index which represents all integers in the range from 1 to the number of arcs n'(i'=i). By positioning the point of rotation of the generating screw profile at point x=0, y=0 and the point of rotation of the generated screw profile at point x=A=1, y=0, the x coordinate of the centre of the circle $Mx\_i'$ of the generated screw profile can be calculated by adding the dimensionless centre distance A to the x coordinate of the centre of the circle $Mx\_i$ of the generating screw profile, and the y coordinate of the centre of the circle $My\_i'$ of the generated screw profile is the same as the y coordinate of the centre of the circle $My\_i$ of the generating screw profile. In the present example the positions of the centre points of the 16 arcs of the generated screw profile are: $Mx\_1'=1.0000$, $My\_1'=0.0000$, $Mx\_2'=1.5971$, $My\_2'=0.1681$, $Mx\_3'=0.9813$, $My\_3'=-0.6198$, $Mx\_4'=1.0001$, $My\_4'=0.0002$, $Mx\_5'=1.0699$, $My\_5'=0.3619$, $Mx\_6'=0.9684$, $My\_6'=-0.1054$, $Mx\_7'=0.9684$, $My\_7'=-0.1054$, $Mx\_8'=0.7145$, $My\_8'=0.0000$, $Mx\_9'=0.9995$, $My\_9'=0.0000$, $Mx\_10'=1.1124$, $My\_10'=0.0318$, $Mx\_11'=0.9893$, $My\_11'=-0.1258$, $Mx\_12'=0.9928$, $My\_12'=-0.0086$, $Mx\_13'=1.0626$, $My\_13'=-0.3707$, $Mx\_14'=0.7903$, $My\_14'=0.3176$, $Mx\_15'=0.7903$, $My\_15'=0.3176$ and $Mx\_16'=1.6203$, $My\_16'=0.0000$.

According to the invention, the starting point of the i'nth arc of the generated screw profile is located in an opposite direction, in relation to the centre point of the i'nth arc of the generated screw profile, to that of the starting point of the inth arc of the generating screw profile in relation to the centre point of the inth arc of the generating screw profile, wherein i is an index which represents all integers in the range from 1 to the number of arcs n and i' is an index which represents all integers in the range from 1 to the number of arcs n'(i'=i). In the present example the starting point of arc 1 of the generated screw profile is, for example, located at coordinate x=0.6203, y=0.

In the present example, the method according to the invention for generating planar, tightly intermeshing, self-cleaning, co-rotating screw profiles produces a screw profile in which all 16 arcs merge tangentially into each other and form a closed, convex screw profile. Also, all 16 arcs of the generated screw profile are located within and/or on the boundaries of an annulus with a dimensionless outer radius RA' and a dimensionless inner radius RI', whose centre point is located on the point of rotation of the generated screw profile. In addition, arc 1 of the generated screw profile is located on the dimensionless inner radius RI' and the configuration rule that at least one arc touches the dimensionless inner radius RI' is thereby fulfilled. In addition, the end point of arc 4, which is also the starting point of arc 5, of the generated screw profile, is located on the dimensionless outer screw radius RA' of the generated screw profile and the configuration rule that at least one arc touches the dimensionless outer screw radius RA' is thereby fulfilled.

The method of generating planar, tightly intermeshing, self-cleaning, co-rotating screw profiles with z flights produces a screw profile in which each of the sections of the generated screw profile is designed in such a manner that the radii of the arcs of the generated screw profile are, in reverse order, identical to the radii of the arcs of the generating screw profile. As will be clear to any person of ordinary skill in the art, the profile sections of the generating screw profile and the generated screw profile are identically superimposable by rotation and mirroring. In the description of the figures hereinbelow, which relate to sections of screw profiles with different numbers of flights, frequently no distinction is therefore made between the generating and the generated screw profile, reference merely being made to screw profiles.

BRIEF DESCRIPTION OF THE DRAWINGS

FIGS. 9a-9d depict preferred 6-circle screw profiles.

FIGS. 13a-13d depict an additional preferred transition based on FIG. 2a

FIGS. 16a-16d depict preferred 8-circle screw profiles.

FIGS. 17a-17d depict an additional preferred transition based on FIG. 2a.

FIGS. 18a-18d depict additional preferred 8-circle screw profiles.

FIGS. 19a-19d depict additional preferred 8-circle screw profiles.

FIG. 24a depicts, as an example, a pair of one-flight conveying elements based on the screw profile of FIG. 2a.

FIG. 24b depicts, as an example, a pair of one-flight kneading elements based on the screw profile of FIGS. 2a.

FIGS. 42a-42d depict additional preferred 8-circle screw profiles.

FIG. 46a depicts a pair of two-flight conveying elements based on the screw profile of FIG. 26a.

FIG. 46b depicts a pair of two-flight kneading elements based on the screw profile of FIGS. 26a.

FIGS. 49a and 49b depict additional preferred 4-circle screw profiles.

FIG. 53a depicts a pair of three-flight conveying elements based on the screw profile of FIG. 48a FIG. 53b depicts a pair of three-flight kneading elements based on the screw profile of FIG. 48a.

FIGS. 56a and 56b depict additional preferred 4-circle screw profiles.

FIG. 60a depicts a pair of four-flight conveying elements based on the screw profile according to FIG. 55a.

FIG. 60b depicts a pair of four-flight kneading elements based on the screw profile according to FIG. 55a.

DETAILED DESCRIPTION OF THE INVENTION

FIGS. 1 to 24 depict screw profiles with one flight obtained by the method according to the invention. FIGS. 1 to 20 all depict one half and thus one section of a screw profile with 1 flight. All of these figures have the same type of structure, which is described in detail in the following. The xy coordinate system, at whose origin the point of rotation of the screw profile is located, is in the middle of the figures. The arcs of the screw profile are shown by thick, unbroken lines which are labelled with the respective arc numbers. The centre points of the arcs are depicted in the form of small circles. The centre points of the arcs are connected by thin, unbroken lines both to the starting point and the end point of the corresponding arc. The straight line FP is depicted by a thin dotted line. The outer screw radius RA is characterized by a thin, broken line and its numerical value is given to four significant digits on the bottom righthand side of each figure. On the righthand side of the figures the radius R, the angle α and the x and y coordinates of the centre point Mx and My of each arc are given to four significant digits. The screw profile is clearly defined by these values.

FIGS. 1 to 24 show screw profiles and screw elements in which the dimensionless outer screw radius RA has the values 0.54, 0.56, 0.57, 0.58 and 0.63. The method according to the invention for generating planar, tightly intermeshing, self-cleaning, co-rotating screw profiles with z flights is not limited to these discrete values of the dimensionless outer screw radius. Using the method according to the invention, one-flight screw profiles with a dimensionless outer screw radius between RA greater than 0.5 and RA smaller than or equal to 1, and preferably in the range from RA=0.52 to RA=0.707, can be generated.

Screw profiles in which a screw profile section consists of a total of 2 arcs are referred to hereinafter as 2-circle screw profiles. Screw profiles in which a screw profile section consists of a total of 4 arcs are referred to hereinafter as 4-circle screw profiles. Screw profiles in which a screw profile section consists of a total of 6 arcs are referred to hereinafter as 6-circle screw profiles. Screw profiles in which a screw profile section consists of a total of 8 arcs are referred to hereinafter as 8-circle screw profiles.

Figure 1A:
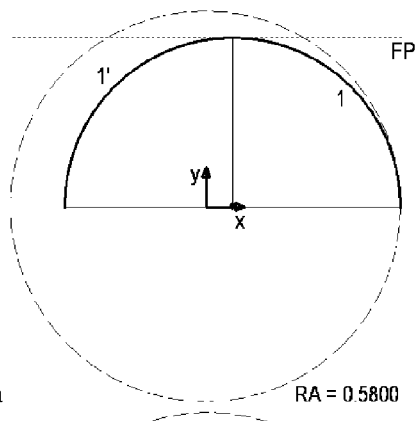
FIGS. 1a-1b depict preferred 2-circle screw profiles.
Figure 1B:
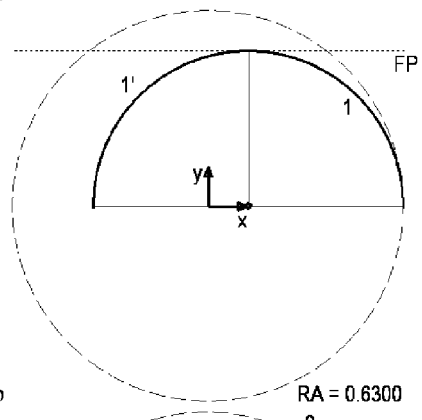

FIG. 1: FIGS. 1a and 1b depict preferred 2-circle screw profiles. FIGS. 1a and 1b differ in their outer screw radius RA. In FIG. 1a the outer screw radius RA is 0.58. In FIG. 1b the outer screw radius RA is 0.63. In FIGS. 1a and 1b arc 1 has a radius $R\_1=A/2=0.5$. In FIGS. 1a and 1b arc 1 has an angle $\alpha\_1=\pi/2$.

Figure 2A:
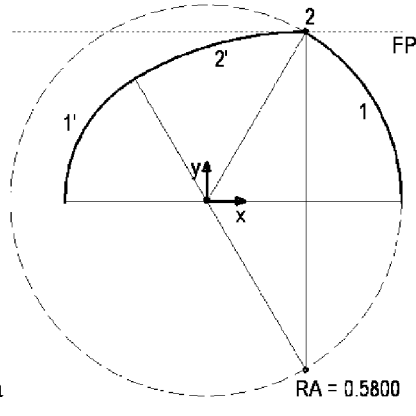
FIGS. 2a-2b depict preferred 4-circle screw profiles.
Figure 2B:
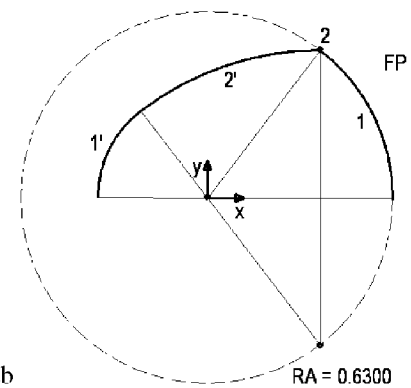

FIG. 2: FIGS. 2a and 2b depict preferred 4-circle screw profiles. FIGS. 2a and 2b differ in their outer screw radius RA. In FIG. 2a the outer screw radius RA is 0.58. In FIG. 2b the outer screw radius RA is 0.63. In FIGS. 2a and 2b arc 1 has a radius $R\_1=RA$. In FIGS. 2a and 2b arc 2 has a radius $R\_2=0$. In FIGS. 2a and 2b angle $\alpha\_1$ of arc 1 is dependent on the outer screw radius RA. In FIGS. 2a and 2b angle $\alpha\_2$ of arc 2 is dependent on the outer screw radius RA.

Figure 3A:
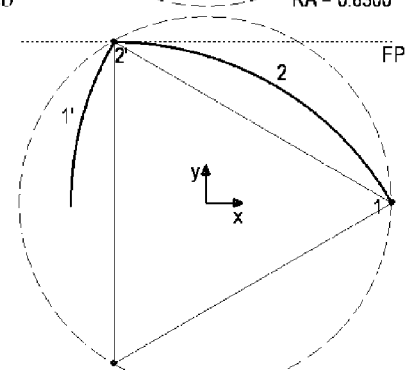
FIGS. 3a-3b additional preferred 4-circle screw profiles
Figure 3B:
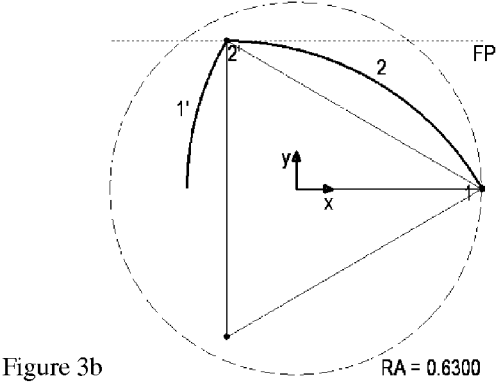
Figure 4A:
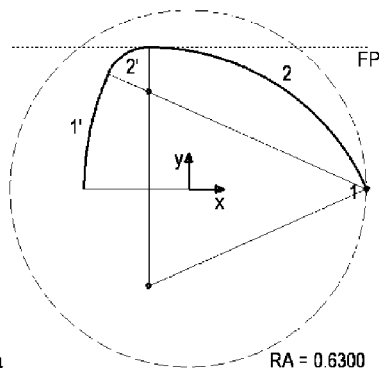
FIGS. 4a-4d depict additional preferred 4-circle screw profiles.
Figure 4B:
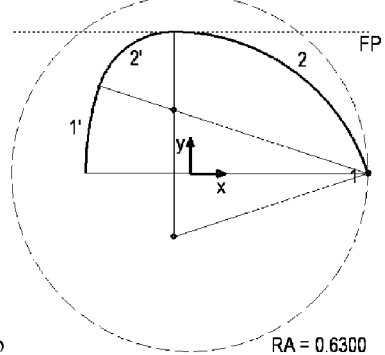
Figure 4C:
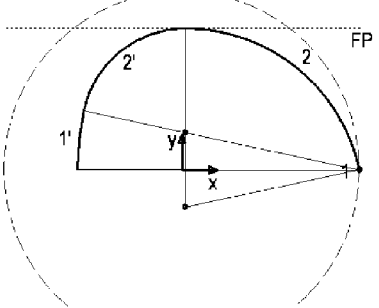
Figure 4D:
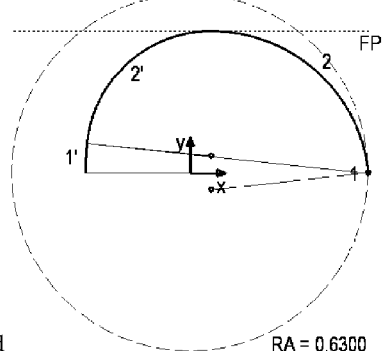
Figure 5A:
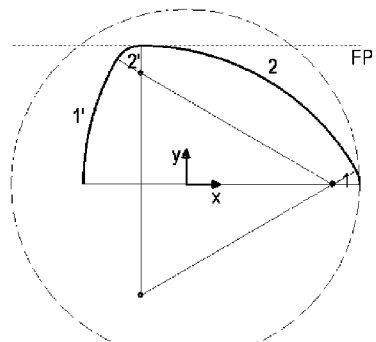
FIGS. 5a-5d depict additional preferred 4-circle screw profiles.
Figure 5B:
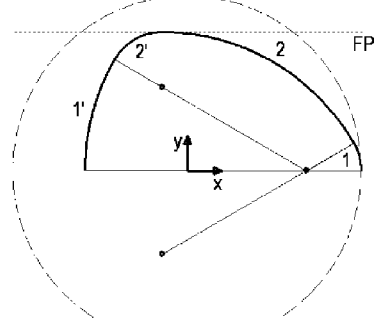
Figure 5C:
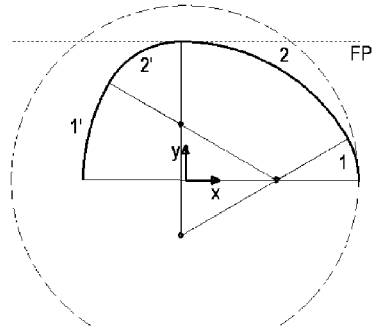
Figure 5D:
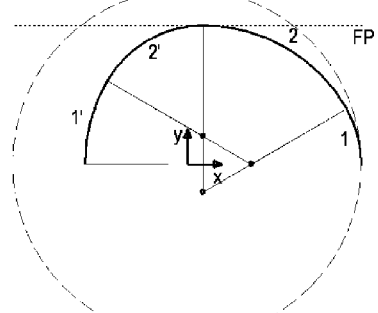
Figure 6A:
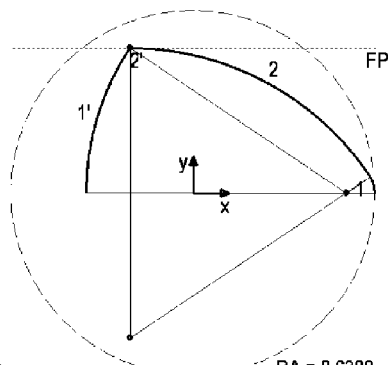
FIGS. 6a-6d depict additional preferred 4-circle screw profiles.
Figure 6B:
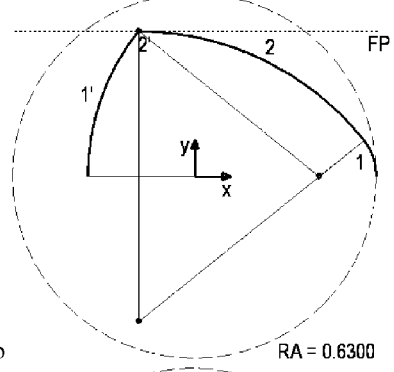
Figure 6C:
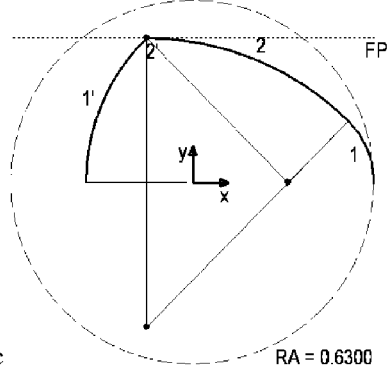
Figure 6D:
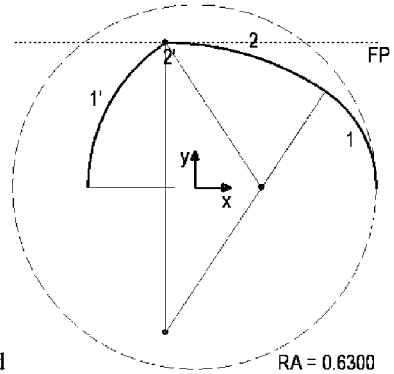
Figure 7A:
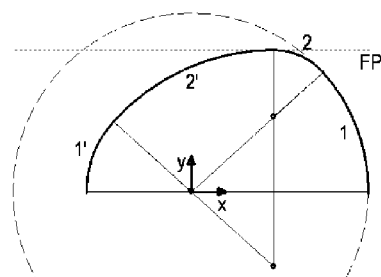
FIGS. 7a-7d depict additional preferred 4-circle screw profiles.
Figure 7B:
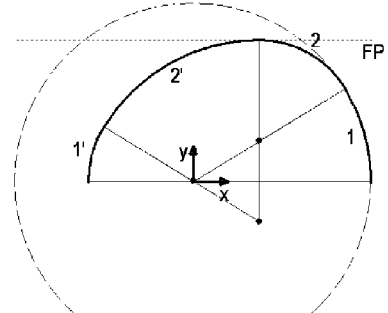
Figure 7C:
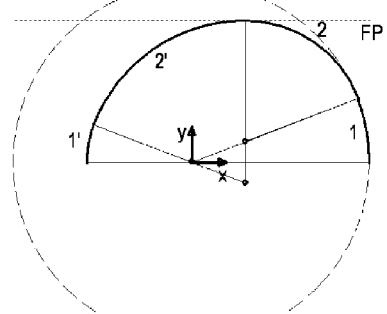
Figure 7D:
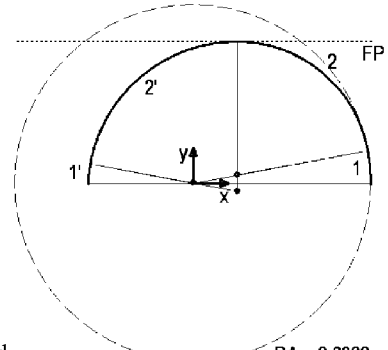
Figure 8A:
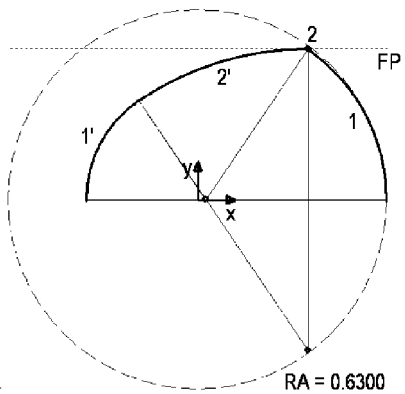
FIGS. 8a-8d depict additional preferred 4-circle screw profiles.
Figure 8B:
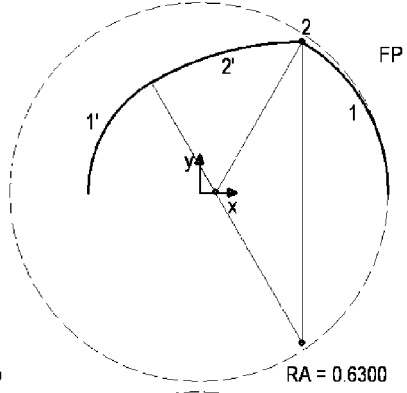
Figure 8C:
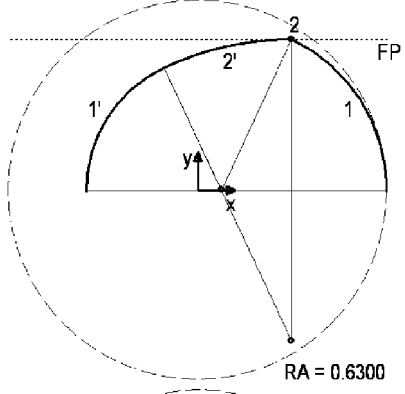
Figure 8D:
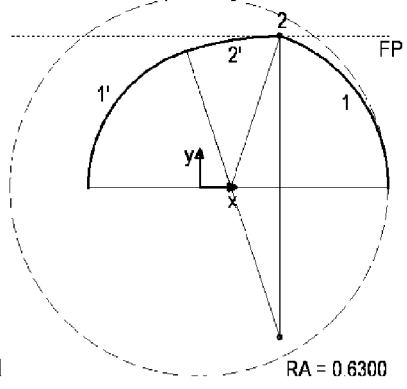
Figure 10A:
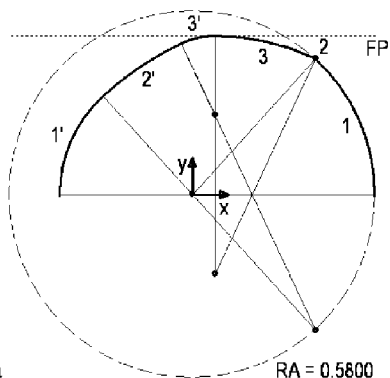
FIGS. 10a-10d depict additional preferred 6-circle screw profiles.
Figure 10B:
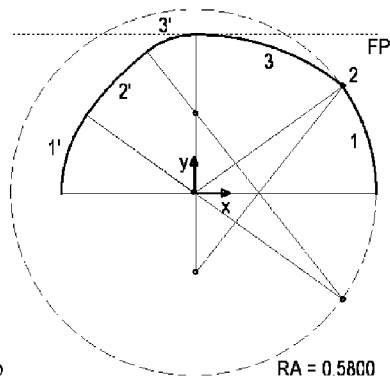
Figure 10C:
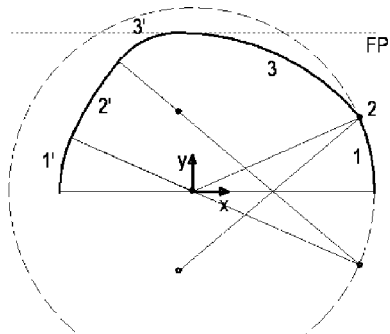
Figure 10D:
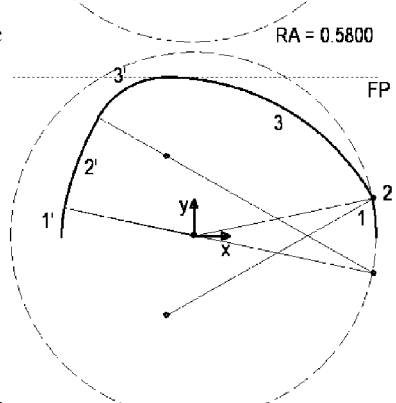
Figure 11A:
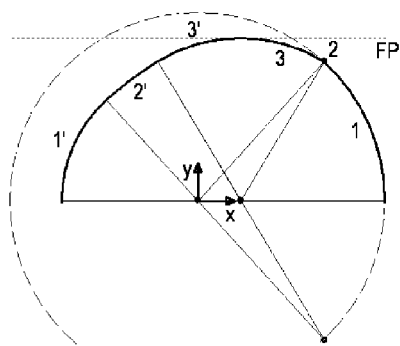
FIGS. 11a-11d depict additional preferred 6-circle screw profiles
Figure 11B:
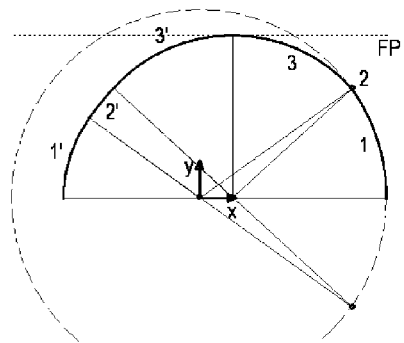
Figure 11C:
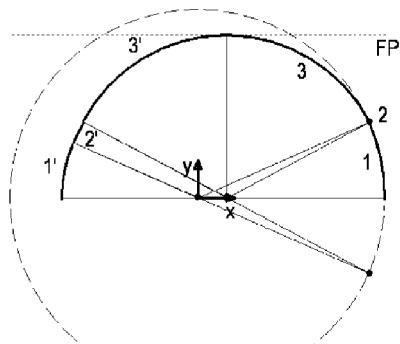
Figure 11D:
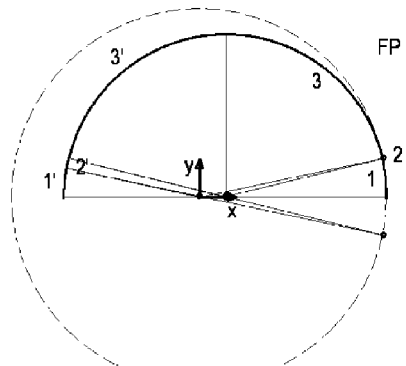
Figure 12A:
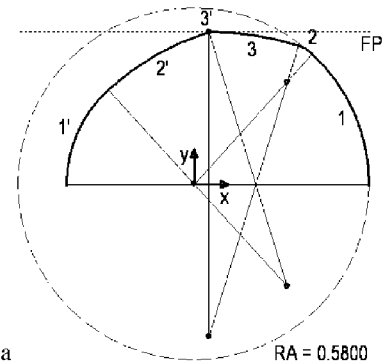
FIGS. 12a-12d depict additional preferred 6-circle screw profiles
Figure 12B:
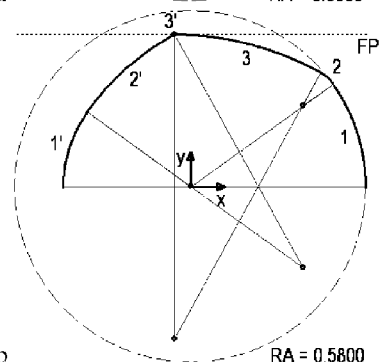
Figure 12C:
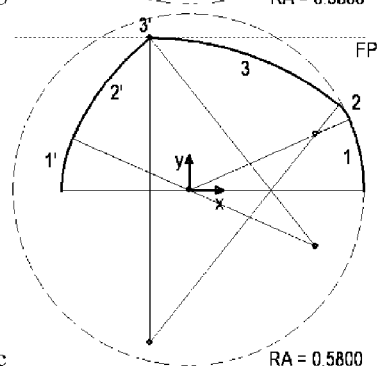
Figure 12D:
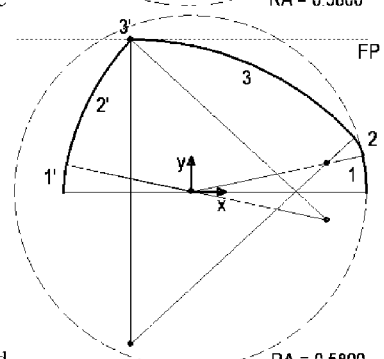
Figure 13A:
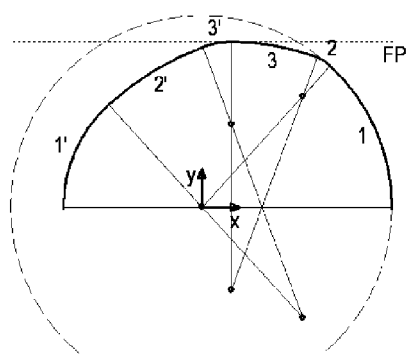
Figure 13B:
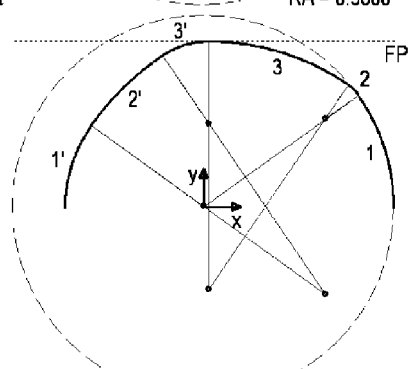
Figure 13C:
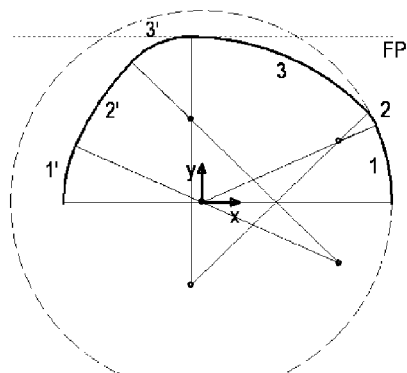
Figure 13D:
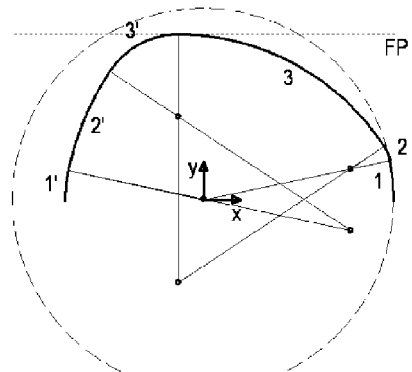
Figure 14A:
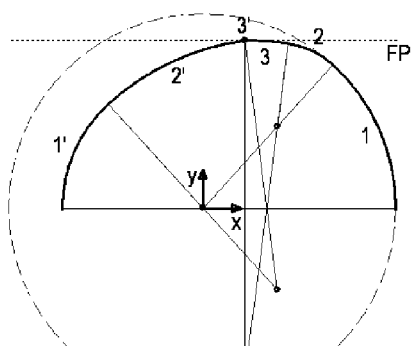
FIGS. 14a-14d depict additional preferred 6-circle screw profiles.
Figure 14B:
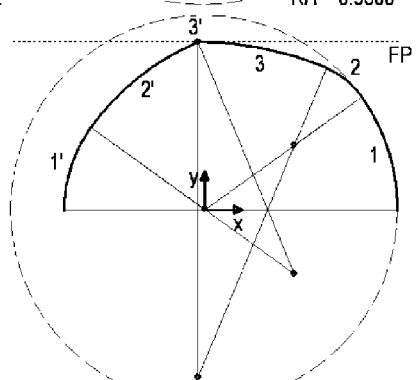
Figure 14C:
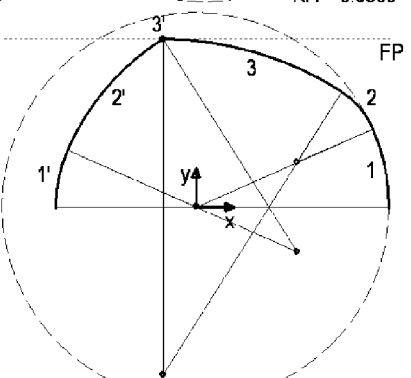
Figure 14D:
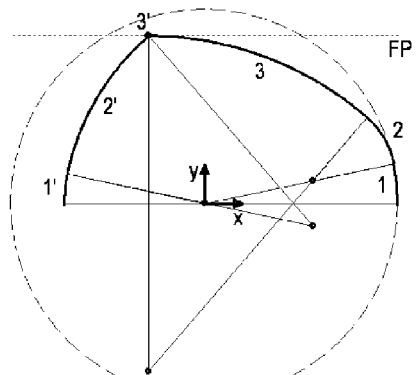
Figure 15A:
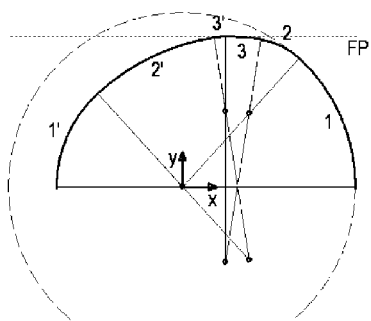
FIGS. 15a-15d depict additional preferred 6-circle screw profiles.
Figure 15B:
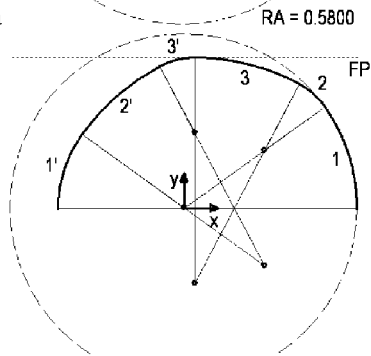
Figure 15C:
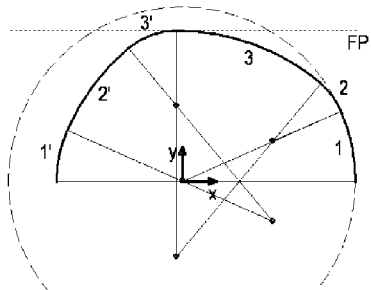
Figure 15D:
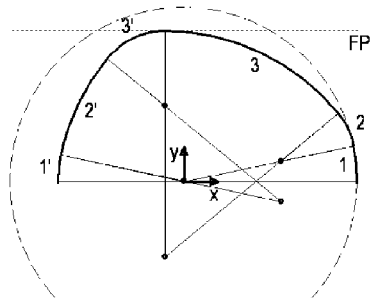
Figure 20A:
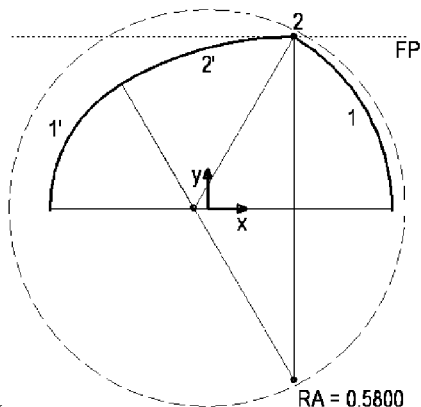
FIGS. 20a-20d depicts one-flight screw profiles that can be shifted to a certain extent along the x-axis in a positive or negative x direction.
Figure 20B:
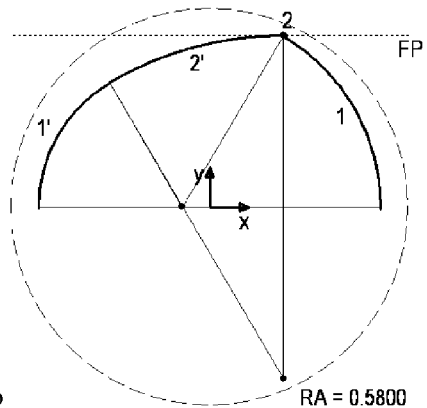
Figure 20C:
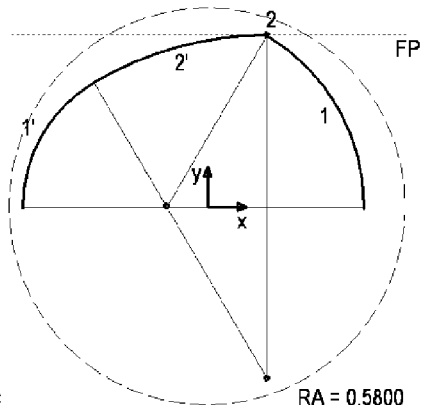
Figure 20D:
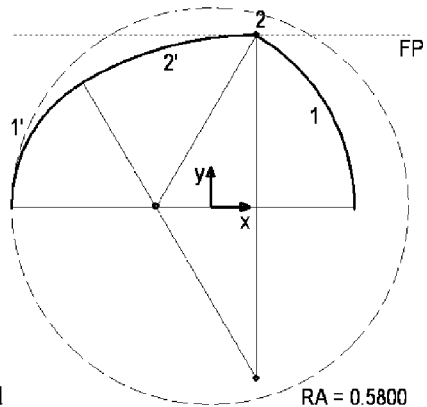
Figure 21A:
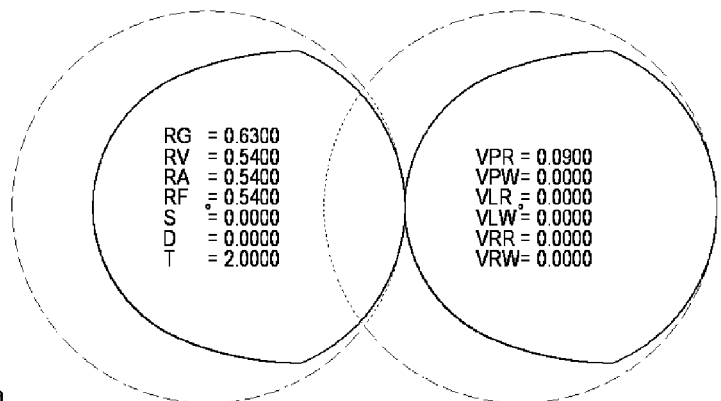
FIGS. 21a-21d depict preferred variants of eccentrically positioned one-flight screw profiles.
Figure 21B:
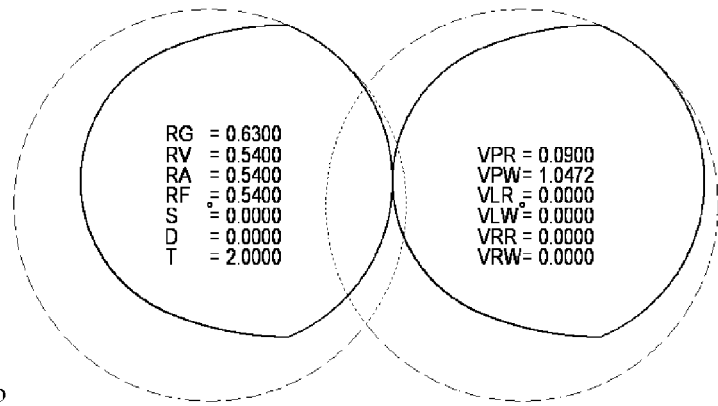
Figure 21C:
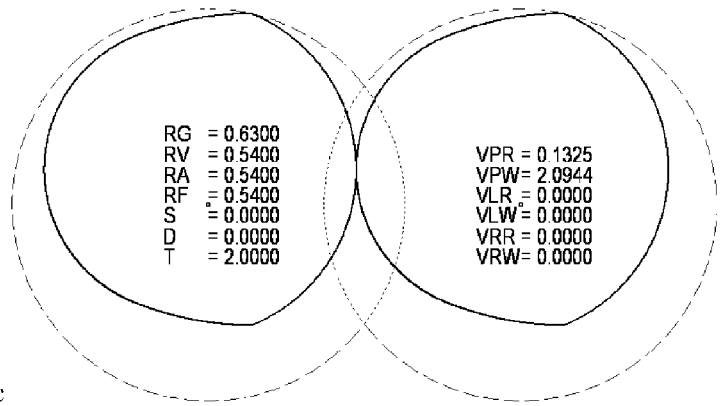
Figure 21D:
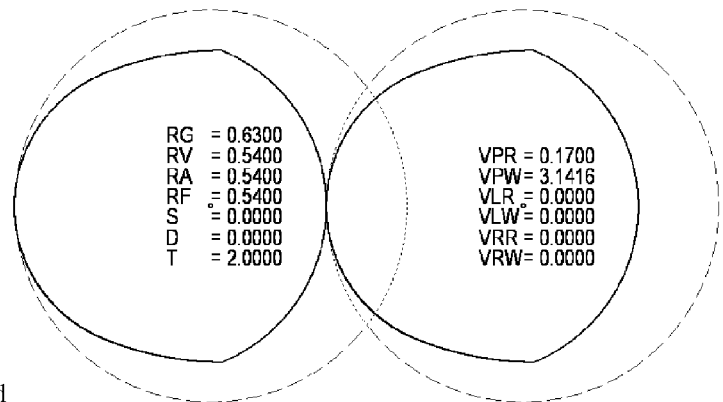
Figure 22A:
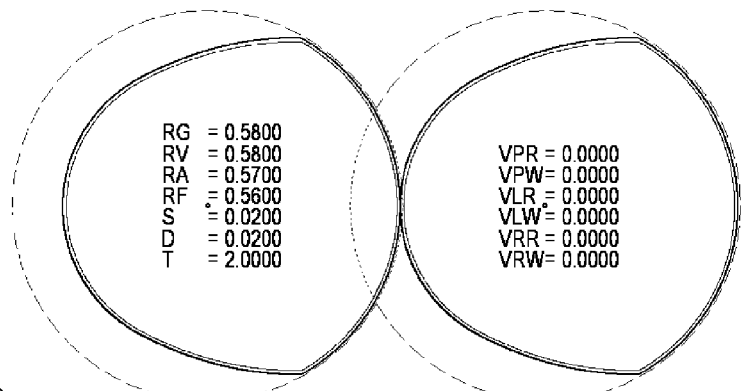
FIGS. 22a-22d depict various clearance strategies.
Figure 22B:
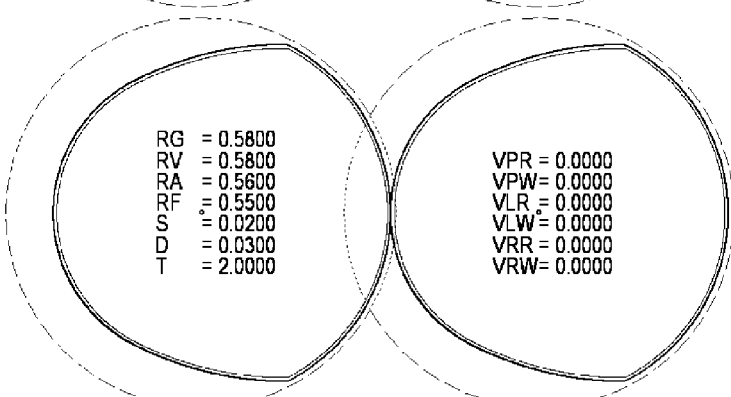
Figure 22C:
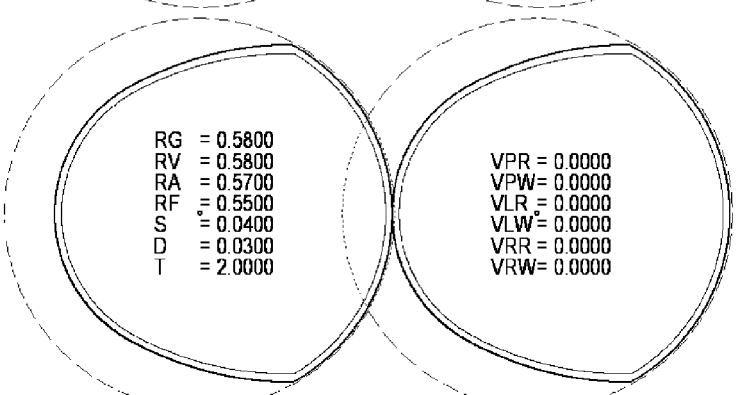
Figure 22D:
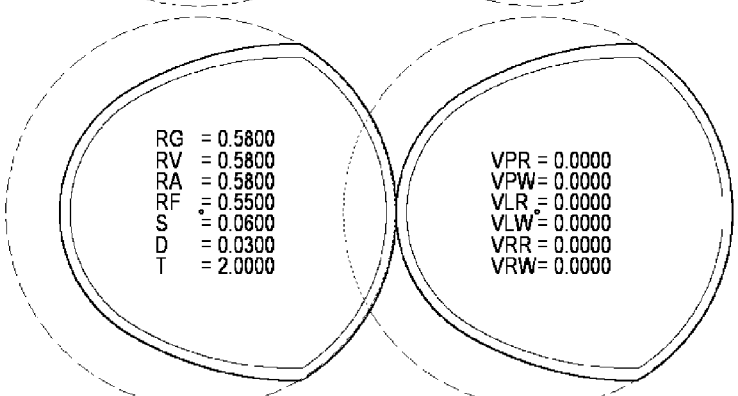
Figure 23A:
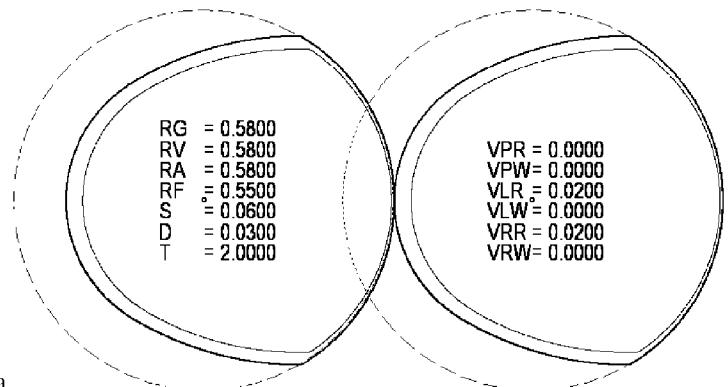
FIGS. 23a-23d depict a selection of possible shifts.
Figure 23B:
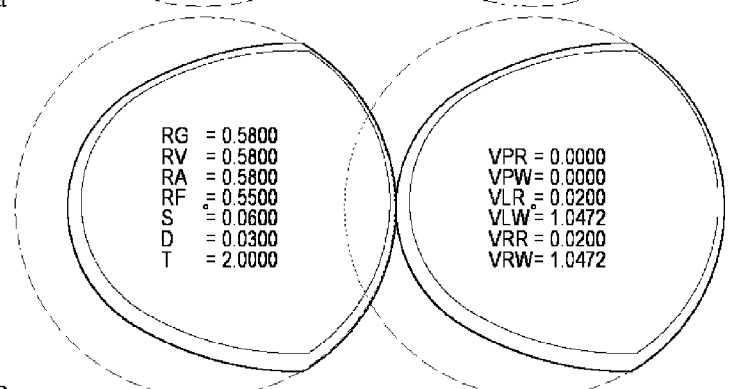
Figure 23C:
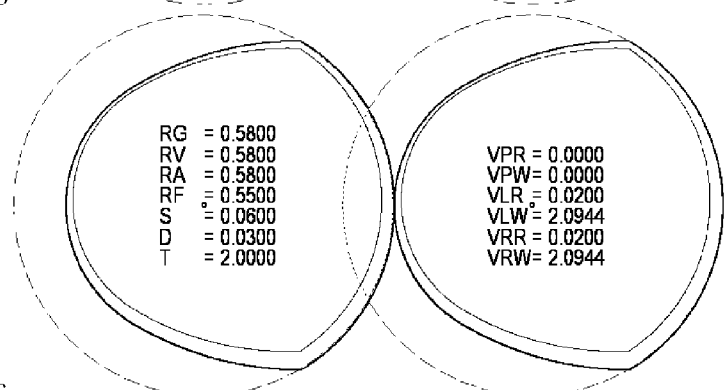
Figure 23D:
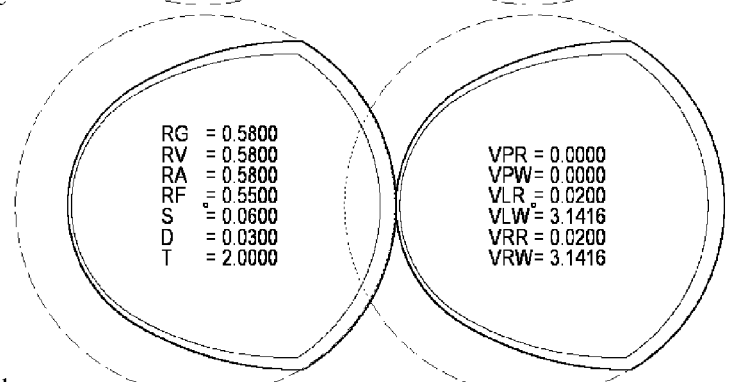

FIG. 3: FIGS. 3a and 3b depict additional preferred 4-circle screw profiles. FIGS. 3a and 3b differ in their outer screw radius RA. In FIG. 3a the outer screw radius RA is 0.58. In FIG. 3b the outer screw radius RA is 0.63. In FIGS. 3a and 3b arc 1 has a radius $R\_1=0$. In FIGS. 3a and 3b arc 2 has a radius $R\_2=A=1$. In FIGS. 3a and 3b arc 1 has an angle $\alpha\_1=\pi/6$. In FIGS. 3a and 3b arc 2 has an angle $\alpha\_2=\pi/3$.

FIG. 4: FIGS. 4a to 4d depict additional preferred 4-circle screw profiles. FIGS. 4a to 4d depict a preferred transition between FIG. 3b and FIG. 1b. In FIGS. 4a to 4d the outer screw radius RA is 0.63. In FIGS. 4a to 4d arc 1 has a radius $R\_1=0$. In FIGS. 4a to 4d angle $\alpha\_1$ of arc 1 is gradually decreased.

FIG. 5: FIGS. 5a to 5d depict additional preferred 4-circle screw profiles. FIGS. 5a to 5d depict an additional preferred transition between FIG. 3b and FIG. 1b. In FIGS. 5a to 5d the outer screw radius RA is 0.63. In FIGS. 5a to 5d arc 1 has an angle $\alpha\_1=\pi/6$. In FIGS. 5a to 5d radius $R\_1$ of arc 1 is gradually increased.

FIG. 6: FIGS. 6a to 6d depict additional preferred 4-circle screw profiles. FIGS. 6a to 6d depict an additional preferred transition between FIG. 3b and FIG. 1b. In FIGS. 6a to 6d the outer screw radius RA is 0.63. In FIGS. 6a to 6d arc 2 has a radius $R\_2=A=1$. In FIGS. 6a to 6d radius $R\_1$ of arc 1 is gradually increased.

FIG. 7: FIGS. 7a to 7d depict additional preferred 4-circle screw profiles. FIGS. 7a to 7d depict a preferred transition between FIG. 2b and FIG. 1b. In FIGS. 7a to 7d the outer screw radius RA is 0.63. In FIGS. 7a to 7d arc 1 has a radius $R\_1=RA$. In FIGS. 7a to 7d angle $\alpha\_1$ of arc 1 is gradually decreased.

FIG. 8: FIGS. 8a to 8d depict additional preferred 4-circle screw profiles. FIGS. 8a to 8d depict an additional preferred transition between FIG. 2b and FIG. 1b. In FIGS. 8a to 8d the outer screw radius RA is 0.63. In FIGS. 8a to 8d arc 2 has a radius $R\_2=0$. In FIGS. 8a to 8d radius $R\_1$ of arc 1 is gradually decreased and angle $\alpha\_1$ of arc 1 is gradually increased.

A direct transition between FIG. 2b and FIG. 3b is not possible via a 4-circle screw profile. In such a case the transition takes place via FIG. 1b.

FIG. 9: FIGS. 9a to 9d depict preferred 6-circle screw profiles. FIGS. 9a to 9d depict a preferred transition between FIG. 2a and FIG. 3a. In FIGS. 9a to 9d the outer screw radius RA is 0.58. In FIGS. 9a to 9d arc 1 has a radius $R\_1=RA$. In FIGS. 9a to 9d arc 2 has a radius $R\_2=0$. In FIGS. 9a to 9d arc 3 has a radius $R\_3=A=1$. In FIGS. 9a to 9d angle $\alpha\_1$ of arc 1 is gradually decreased.

FIG. 10: FIGS. 10a to 10d depict additional preferred 6-circle screw profiles. FIGS. 10a to 10d depict an additional preferred transition between FIG. 2a and a figure which is similar to FIG. 4b. In FIGS. 10a to 10d the outer screw radius RA is 0.58. In FIGS. 10a to 10d arc 1 has a radius $R\_1=RA$. In FIGS. 10a to 10d arc 2 has a radius $R\_2=0$. In FIGS. 10a to 10d arc 3 has a radius $R\_3=0.75$. In FIGS. 10a to 10d angle $\alpha\_1$ of arc 1 is gradually decreased.

FIG. 11: FIGS. 11a to 11d depict additional preferred 6-circle screw profiles. FIGS. 11a to 11d depict an additional preferred transition between FIG. 2a and FIG. 1a. In FIGS. 11a to 11d the outer screw radius RA is 0.58. In FIGS. 11a to 11d arc 1 has a radius $R\_1=RA$. In FIGS. 11a to 11d arc 2 has a radius $R\_2=0$. In FIGS. 11a to 11d arc 3 has a radius $R\_3=0.5$. In FIGS. 11a to 11d angle $\alpha\_1$ of arc 1 is gradually decreased.

In addition to the abovementioned transitions between the screw profiles in the individual figures, transitions from one figure to another are also possible. Thus, the screw profiles of FIGS. 9a, 10a and 11a or FIGS. 9b, 10b and 11b can, for example, merge gradually into each other.

FIG. 12: FIGS. 12a to 12d depict additional preferred 6-circle screw profiles. FIGS. 12a to 12d depict a further preferred transition based on FIG. 2a. In FIGS. 12a to 12d the outer screw radius RA is 0.58. In FIGS. 12a to 12d arc 1 has a radius $R\_1=RA$. In FIGS. 12a to 12d arc 2 has a radius $R\_2=0.125$. In FIGS. 12a to 12d arc 3 has a radius $R\_3=A=1$. In FIGS. 12a to 12d angle $\alpha\_1$ of arc 1 is gradually decreased.

FIG. 13: FIGS. 13a to 13d depict additional preferred 6-circle screw profiles. FIGS. 13a to 13d depict an additional preferred transition based on FIG. 2a. In FIGS. 13a to 13d the outer screw radius RA is 0.58. In FIGS. 13a to 13d arc 1 has a radius $R\_1=RA$. In FIGS. 13a to 13d arc 2 has a radius $R\_2=0.125$. In FIGS. 13a to 13d arc 3 has a radius $R\_3=0.75$. In FIGS. 13a to 13d angle $\alpha\_1$ of arc 1 is gradually decreased.

In addition to the abovementioned transitions between the individual screw profiles in each figure, transitions from one figure to another are also possible. Thus, the screw profiles of FIGS. 12a and 13a or FIGS. 12b and 13b can, for example, merge gradually into each other.

FIG. 14: FIGS. 14a to 14d depict additional preferred 6-circle screw profiles. FIGS. 14a to 14d depict an additional preferred transition based on FIG. 2a. In FIGS. 14a to 14d the outer screw radius RA is 0.58. In FIGS. 14a to 14d arc 1 has a radius $R\_1=RA$. In FIGS. 14a to 14d arc 2 has a radius $R\_2=0.25$. In FIGS. 14a to 14d arc 3 has a radius $R\_3=A=1$. In FIGS. 14a to 14d angle $\alpha\_1$ of arc 1 is gradually decreased.

FIG. 15: FIGS. 15a to 15d depict additional preferred 6-circle screw profiles. FIGS. 15a to 15d depict an additional preferred transition based on FIG. 2a. In FIGS. 15a to 15d the outer screw radius RA is 0.58. In FIGS. 15a to 15d arc 1 has a radius $R\_1=RA$. In FIGS. 15a to 15d arc 2 has a radius $R\_2=0.25$. In FIGS. 15a to 15d arc 3 has a radius $R\_3=0.75$. In FIGS. 15a to 15d angle $\alpha\_1$ of arc 1 is gradually decreased.

In addition to the abovementioned transitions between the individual screw profiles in each figure, transitions from one figure to another are also possible. Thus, the screw profiles of FIGS. 14a and 15a or FIGS. 9a, 12a and 14a or FIGS. 10a, 13a and 15a can, for example, merge gradually into each other.

In the above figures relating to one-flight screw profiles the screw profile always starts at point x=RA, y=0. FIGS. 16 to 19 depict a selection of 8-circle screw profiles which start at point x<RA, y=0 and in which only arc 3 is positioned on the outer screw radius.

FIG. 16: FIGS. 16a to 16d depict preferred 8-circle screw profiles. FIGS. 16a to 16d depict a preferred transition based on FIG. 2a. In FIGS. 16a to 16d the outer screw radius RA is 0.58. In FIGS. 16a to 16d radius R_1 of arc 1 is gradually increased. In FIGS. 16a to 16d arc 2 has a radius R_2=0. In FIGS. 16a to 16d arc 3 has a radius R_3=RA and is positioned on the outer screw radius. In FIGS. 16a to 16d arc 4 has a radius R_4=0. In FIGS. 16a to 16d angle $\alpha\_1$ of arc 1 is gradually decreased and angle $\alpha\_2$ of arc 2 is gradually increased. In FIGS. 16a to 16d arc 3 has an angle $\alpha\_3$=0.4285.

In FIGS. 16a to 16d arc 4 has an angle $\alpha\_4$=0.5315.

FIG. 17: FIGS. 17a to 17d depict additional preferred 8-circle screw profiles. FIGS. 17a to 17d depict an additional preferred transition based on FIG. 2a. In FIGS. 17a to 17d the outer screw radius RA is 0.58. In FIGS. 17a to 17d radius R_1 of arc 1 is gradually increased. In FIGS. 17a to 17d arc 2 has a radius R_2=0. In FIGS. 17a to 17d arc 3 has a radius R_3=RA and is positioned on the outer screw radius. In FIGS. 17a to 17d angle $\alpha\_1$ of arc 1 is gradually decreased and angle $\alpha\_2$ of arc 2 is gradually increased. In FIGS. 17a to 17d arc 3 has an angle $\alpha\_3$=0.2627. In FIGS. 17a to 17d arc 4 has an angle $\alpha\_4$=0.5315. In FIGS. 17a to 17d arc 4 has a radius R_4=0, i.e. at this point there is a bend in the profile. The centre point of arc 4 coincides with the bend. The "size of the bend" is determined by angle $\alpha\_4$, i.e. the transition from arc 3 to arc 4' takes place by rotation about angle $\alpha\_4$. Or in other words: A tangent on arc 3 at the centre point of arc 4 intersects a tangent on arc 4' at the centre point of arc 4 and at an angle $\alpha\_4$. With the inclusion of arc 4 all of the adjacent arcs 3→4, 4→4' merge tangentially into each other.

In addition to the abovementioned transitions between the individual screw profiles in each figure, transitions from one figure to another are also possible. Thus, the screw profiles of FIGS. 16a and 17a or FIGS. 16b and 17b can, for example, merge gradually into each other.

FIG. 18: FIGS. 18a to 18d depict additional preferred 8-circle screw profiles. FIGS. 18a to 18d depict an additional preferred transition based on FIG. 2a. In FIGS. 18a to 18d the outer screw radius RA is 0.58. In FIGS. 18a to 18d radius R_1 of arc 1 is gradually increased and radius R_2 of arc 2 is gradually decreased. In FIGS. 18a to 18d arc 3 has a radius R_3=RA and is positioned on the outer screw radius. In FIGS. 18a to 18d arc 4 has a radius R_4=0. In FIGS. 18a to 18d angle $\alpha\_1$ of arc 1 is gradually decreased and angle $\alpha\_2$ of arc 2 is gradually increased. In FIGS. 18a to 18d arc 3 has an angle $\alpha\_3$=0.2278. In FIGS. 18a to 18d arc 4 has an angle $\alpha\_4$=0.5315.

FIG. 19: FIGS. 19a to 19d depict additional preferred 8-circle screw profiles. FIGS. 19a to 19d depict a preferred transition based on FIG. 18d. In FIGS. 19a to 19d the outer screw radius RA is 0.58. In FIGS. 19a to 19d arc 1 has a radius R_1=0.9061. In FIGS. 19a to 19d arc 2 has a radius R_2=0.1385. In FIGS. 19a to 19d arc 3 has a radius R_3=RA and is located on the outer screw radius. In FIGS. 19a to 19d radius R_4 of arc 4 is gradually increased. In FIGS. 19a to 19d arc 1 has an angle $\alpha\_1$=0.4304. In FIGS. 19a to 19d arc 2 has an angle $\alpha\_2$=0.3812. In FIGS. 19a to 19d angle $\alpha\_3$ of arc 3 is gradually decreased and angle $\alpha\_4$ of arc 4 is gradually increased.

The method according to the invention for generating planar, tightly intermeshing, self-cleaning and co-rotating screw profiles with z flights is illustrated in the following by means of the section of a screw profile shown in FIG. 19b.

According to the invention, the screw profile and the screw profile section are both located in one plane. For the sake of simplicity this plane is placed on the xy plane of a Cartesian coordinate system. For the sake of simplicity the point of rotation of the screw profile is placed at the origin of the Cartesian coordinate system (x=0, y=0).

According to the invention, the flight number z is selected such that z is greater than or equal to 1. In the present example the flight number is selected to be z=1. According to the invention, the number of arcs n of the screw profile is selected such that n is an integer multiple p of 4z. In the present example the number of arcs is selected to be n=16, resulting in p=4. According to the invention, the dimensionless outer screw radius RA of the screw profile is selected such that it is greater than 0 and smaller than or equal to the dimensionless centre distance A. In the present example the dimensionless outer screw radius of the screw profile is selected to be RA=0.58. According to the invention, the dimensionless inner radius RI of the screw profile is selected such that it is greater than or equal to 0 and smaller than or equal to the dimensionless outer screw radius RA. In the present example the dimensionless inner radius of the screw profile is selected to be RI=A−RA=0.42.

The arcs of the screw profile can be arranged in a clockwise or anti-clockwise direction about the axis of rotation of the screw profile. In the present example, the arcs are arranged in an anti-clockwise direction about the axis of rotation of the screw profile.

The screw profile is subdivided into 2z sections which are characterized in that each section is enclosed between two straight lines which are at an angle to each other of π/z in terms of radian measurement and which meet at the point of rotation of the screw profile, these two straight lines being referred to as section boundaries. In the present example the screw profile is subdivided into two sections. For the sake of simplicity, both section boundaries are located on the x axis of the coordinate system. In relation to the present example, only that screw profile section is explained hereinbelow which is positioned in the positive y direction.

The screw profile section is subdivided into a first and a second part, the first part consisting of p arcs and the second part consisting of p' arcs, wherein p'=p. In the present example it follows that p'=4. The arcs of the first part of the screw profile section can be numbered in ascending or descending order. The arcs of the second part of the screw profile section are numbered in reverse order to the arcs of the first part of the screw profile section. In the present example the arcs of the first part of the screw profile section are numbered in ascending order and the arcs of the second part of the screw profile section are accordingly numbered in descending order.

According to the invention, angle $\alpha\_1$ of arc 1 of the first part of the screw profile section is selected such that it is, in terms of radian measurement, greater than or equal to 0 and smaller than or equal to π/(2z). In the present example the angle of arc 1 is selected to be $\alpha\_1$=0.4304. According to the invention, the dimensionless radius R_1 of arc 1 of the first part of the screw profile section is selected such that it is greater than or equal to 0 and smaller than or equal to the centre distance A. In the present example the dimensionless radius of arc 1 is selected to be R_1=0.9061. According to the invention, the position of arc 1 of the first part of the screw profile section is selected such that arc 1 is located within and/or on the boundaries of an annulus with a dimensionless outer screw radius RA and a dimensionless inner radius RI, whose centre point is located on the point of rotation of the screw profile. Its position is preferably determined by the position of the starting point and the centre point of arc 1. In the method according to the invention the starting point and the centre point of arc 1 are located on one of the section boundaries, the starting point resulting from the position of the centre point and the dimensionless radius $R\_1$. In the present example the centre point of arc 1 is located at coordinate $Mx\_1=-0.3937$, $My\_1=0.0000$ and the starting point is thus located at coordinate $x=0.5124$, $y=0.0000$.

According to the invention, the angles $\alpha\_2, \ldots, \alpha\_(p-1)$ of p−2 additional arcs, i.e. 2 additional arcs of the first part of the screw profile section are selected such that they are, in terms of radian measurement, greater than or equal to 0 and smaller than or equal to $\pi/(2z)$. In the present example the angles of the 2 additional arcs are selected to be $\alpha\_2=0.3812$ and $\alpha\_3=0.1580$. According to the invention, the dimensionless radii $R\_2, \ldots, R\_(p-1)$ of the 2 additional arcs of the first part of the screw profile section are selected such that they are greater than or equal to 0 and smaller than or equal to the dimensionless centre distance A. In the present example the dimensionless radii of the 2 additional arcs are selected to be $R\_2=0.1385$ and $R\_3=0.5800$. According to the configuration rules the arcs are arranged so that they merge into each other tangentially in such a manner that a closed, convex screw profile is obtained, an arc with a dimensionless radius of 0 being treated in the same manner as an arc with a dimensionless radius of eps, which is a very small positive real number which tends towards 0 (eps<<1, eps→0). This configuration rule means that the end point of an arc is at the same time the starting point of the next arc. The required tangential transition between a first arc and a second successive arc is obtained by the centre point of the second successive arc being placed in such a manner on a straight line through the end point and the centre point of the first arc that the distance between the centre point of the second successive arc and the end point of the first arc is equal to the radius of the second successive arc and the screw profile is convex. An arc with a radius of 0 is treated in the same way as an arc with a very small radius eps, which tends towards 0, so as to allow the tangential transition pattern to be continued. Alternatively, an arc with a radius of 0 can be treated in such a manner that the screw profile has a bend at the position of this arc, the size of the bend being determined by the angle of this arc. In the present example the abovementioned configuration rule results in the following positions of the centre points of the two additional arcs: $Mx\_2=0.3039$, $My\_2=0.3202$ and $Mx\_3=0.0000$, $My\_3=0.0000$. Arc 3 is positioned on the dimensionless outer screw radius RA and the configuration rule that at least one arc touches the dimensionless outer screw radius RA is thereby fulfilled.

According to the invention, angle $\alpha\_4$ of the last arc of the first part of the screw profile section is such that the sum of the angles of the 4 arcs of the first part of the screw profile section is, in terms of radian measurement, $\pi/(2z)$, wherein angle $\alpha\_4$ is, in terms of radian measurement, greater than or equal to 0 and smaller than or equal to $\pi/(2z)$. In the present example, the angle of this last arc, $\alpha\_4$, is 0.6013. According to the invention, the dimensionless radius $R\_4$ of the last arc of the first part of the screw profile section is such that the end point of this last arc touches a straight line FP at one point, this straight line FP being vertical to the angle bisector of the two section boundaries of this section and at such a distance from the point of rotation of the screw profile in the direction of this section which is equal to half the centre distance, the angle bisector and the section boundaries passing through the point of rotation of the screw profile. In FIG. 19b, straight line FP is shown in the form of a dotted line. Arc 4 of the first part of the screw profile section is constructed in such a manner that a tangent is placed on arc 3 at the end point of arc 3, the point of intersection between the tangent and the straight line FP being the centre point of a circle whose radius is equal to the length of the distance between the end point of arc 3 and the point of intersection between the tangent and the straight line FP and the point of intersection in the direction of the selected clock direction between the circle and the straight line FP is the required point of contact between the end point of arc 4 and straight line FP. At the end point of arc 4 a perpendicular to the straight line FP is formed. The point of intersection between this perpendicular and the straight line through the end point and the centre point of arc 3 is the centre point of arc 4. In the present example the position of the centre point of arc 4 is $Mx\_4=0.2580$, $My\_4=0.3761$ and the dimensionless radius of arc 4, $R\_4$, is 0.1239.

Angles $\alpha\_p', \ldots, \alpha\_1'$ of the second part of the screw profile section are defined in such a manner that angle $\alpha\_j'$ of the j'th arc of the second part of the section is the same as angle $\alpha\_j$ of the jth arc of the first part of the section, wherein j is an index which represents all integers in the range from 1 to the number of arcs p and j' is an index which represents all integers in the range from 1 to the number of arcs p' ($\alpha\_1'=\alpha\_1, \ldots, \alpha\_p'=\alpha\_p$). In the present example the angles of the second part of the section are $\alpha\_1'=\alpha\_1=0.4304$, $\alpha\_2'=\alpha\_2=0.3812$, $\alpha\_3'=\alpha\_3=0.1580$ and $\alpha\_4'=\alpha\_4=0.6013$.

The dimensionless radii $R\_p', \ldots, R\_1'$ of the second part of the screw profile section are defined in such a manner that the sum of the dimensionless radius $R\_j'$ of the j'th arc of the second part of a section and the dimensionless radius $R\_j$ of the jth arc of the first part of a section is equal to the dimensionless centre distance A, wherein j is an index which represents all integers in the range from 1 to the number of arcs p and j' is an index which represents all integers in the range from 1 to the number of arcs p' ($R\_1'+R\_1=A=1, \ldots, R\_p'+R\_p=A=1$). In the present example the dimensionless radii of the second part of the section are $R\_1'=A-R\_1=0.0939$, $R\_2'=A-R\_2=0.8615$, $R\_3'=A-R\_3=0.4200$ and $R\_4'=A-R\_4=0.8761$.

According to the invention, the position of the arcs of the second part of the screw profile section is such that the arcs merge tangentially into each other and the screw profile is convex. In the present example the following coordinates apply to the centre points of the 4 arcs of the second part of the screw profile section: $Mx\_1'=-0.3937$, $My\_1'=0.0000$, $Mx\_2'=0.3039$, $My\_2'=-0.3202$, $Mx\_3'=0.0000$, $My\_3'=0.0000$ and $Mx\_4'=0.2580$, $My\_4'=-0.3761$. Arc 3 of the second part of the screw profile section is positioned on the dimensionless inner radius RI and the configuration rule that at least one arc touches the dimensionless inner radius RI is thereby fulfilled.

FIG. 20: All one-flight screw profiles can be shifted to a certain extent along the x-axis in a positive or negative x direction without forfeiting their self-cleaning properties, since, due to the shift along the x-axis, the condition of touching the straight line FP at one point continues to be met. The maximum shift in a positive or negative x direction is reached when the screw profile has a distance at one point from the point of rotation which is greater than the outer radius RA. The maximum degree of shift depends on the screw profile to be shifted and is smaller than or equal to the difference between the outer radius RA and the inner radius RI. If the shift is smaller than the maximum admissible shift, the maximum distance between the screw profile and the point of rotation is smaller than the originally required outer radius RA. FIGS. 20*a* to 20*d* illustrate the stepwise shift of a screw profile corresponding to FIG. 2*a*. It can be seen that the radii and the angles of the individual arcs are not changed by the shift.

FIGS. 21 to 23 show the generating and the generated screw profile inside a figure 8-shaped screw barrel. Numerical values are provided inside the two screw profiles for the following screw parameters:

RG: radius of the two barrel bores
RV: virtual barrel radius which is smaller than or equal to the barrel radius RG
RA: outer screw radius of the tightly intermeshing self-cleaning screw profiles
RF: outer screw radius of the screw profiles to be fabricated
S: clearance between the two screw profiles to be fabricated
D: clearance between the screw profiles to be fabricated and the barrel
T: pitch of a conveying, mixing or transition element
VPR: size of the shift of the tightly intermeshing, self-cleaning screw profiles if the latter are arranged eccentrically
VPW: angle of the shift (in terms of direction) of the tightly intermeshing, self-cleaning screw profiles, if they are arranged eccentrically
VLR: size of the shift within the clearances of the screw profile to be fabricated for the lefthand screw
VLW: angle of the shift within the clearances of the screw profile to be fabricated for the righthand screw
VRR: size of the shift within the clearances of the screw profile to be fabricated for the righthand screw
VRW: angle of the shift within the clearances of the screw profile to be fabricated for the righthand screw The screw barrel consisting of two overlapping bores each with a radius RG and a spacing A=1 is depicted by a thin, broken line. In the overlapping area between the two barrel bores the two bores are depicted by thin, dotted lines. The centre points of the two barrel bores are identical to the two points of rotation of the screw profiles and are each characterized by a small circle. The theoretical tightly intermeshing, self-cleaning screw profiles are characterized by a thick unbroken line. The screw profiles actually fabricated are depicted by a thin unbroken line.

It is well-known to those skilled in the art that the equation RA=RV−D+S/2 applies to the relationship between the outer screw radius RA of the tightly intermeshing, self-cleaning screw profile, the virtual barrel radius RV, the clearance S between the two screw profiles to be fabricated and the clearance D between the screw profiles to be fabricated and the screw barrel.

It is also well-known to those skilled in the art that the equation RF=RV−D applies to the relationship between the outer screw radius RF of the screw profile to be fabricated, the virtual barrel radius RV and the clearance D between the screw profiles to be fabricated and the screw barrel.

Typically, the virtual barrel radius RV is equal to the actual barrel radius RG. If the virtual barrel radius RV is smaller than the barrel radius RG additional clearance exists between the screw profiles and the barrel. This clearance can be used for shifting the generating and the generated screw profile eccentrically while maintaining self-cleaning. This eccentricity is clearly characterized by the size of the shift VPR and the direction of the shift in the form of angle VPW.

FIG. 21: FIGS. 21*a* to 21*d* depict preferred variants of eccentrically positioned one-flight screw profiles. The depicted tightly intermeshing, self-cleaning screw profiles are based on FIG. 2, although the outer screw radius RA is 0.54 in FIGS. 21*a* to 21*d*. The virtual barrel radius is RV=0.54 and is smaller than the barrel radius RG (RG=0.63). The remaining geometrical parameters can be found in the individual figures. Eccentrically positioned, one-flight, tightly intermeshing, self-cleaning screw profiles are characterized in that the distance between the screw profiles and the barrel is always identical for both screw profiles, regardless of the direction of the shift. The screw profiles in FIGS. 21*a* to 21*d* have in each case been shifted to such an extent that precisely one point of the screw profiles touches the barrel. The size of the shift required for this purpose depends on the direction of the shift. It is also possible for the screw profiles to be in eccentric positions in which no point of the screw profiles touches the barrel.

FIG. 22: As is well-known to those skilled in the art, all screw elements require a certain amount of clearance in practice, not only between each other but also between them and the barrel. FIGS. 22*a* to 22*d* depict various clearance strategies. The depicted tightly intermeshing, self-cleaning screw profiles are based on FIG. 2*a*. The remaining geometrical parameters can be found in the individual figures. FIG. 22*a* depicts a clearance strategy in which the clearance between the screw profiles to be fabricated is the same as that between the screw profiles to be fabricated and the barrel. FIG. 22*b* depicts a clearance strategy in which the clearance between the screw profiles to be fabricated is smaller than that between the screw profiles to be fabricated and the barrel. FIG. 22*c* depicts a clearance strategy in which the clearance between the screw profiles to be fabricated is greater than the clearance between the screw profiles to be fabricated and the barrel. FIG. 22*d* depicts a further variant according to FIG. 22*c* with particularly large clearances. Typical clearances occurring in practice for the clearance between the screw profiles to be fabricated are in the range from 0.002 to 0.1. Typical clearances occurring in practice for the clearance between the screw profiles to be fabricated and the barrel are in the range from 0.002 to 0.1. Typical clearances occurring in practice are constant around the periphery of the screw profile. It is however possible to vary around the periphery of the screw profiles not only the clearance between the screw profiles to be fabricated but also the clearance between the screw profiles to be fabricated and the barrel.

FIG. 23: It is also possible to shift the screw profiles to be fabricated within the clearances. FIGS. 23*a* to 23*d* depict a selection of possible shifts. The tightly intermeshing, self-cleaning screw profiles depicted are based on FIG. 2*a*. The depicted screw profiles to be fabricated are based on FIG. 22*d*. The remaining geometrical parameters can be found in the individual figures. In FIGS. 23*a* to 23*d* the size of the shift for both screw profiles to be fabricated is VLR=VRR=0.02. In FIGS. 23*a* to 23*d* the direction of the shift for each two screw profiles to be fabricated is varied gradually between VLW=VRW=0 and VLW=VRW=π. It is possible to shift the two screw profiles to be fabricated independently of each other in various directions and to different degrees.

One-flight screw profiles generated by the method of generating tightly intermeshing, self-cleaning, co-rotating screw profiles according to the invention can be used for fabricating screw elements. In particular, such screw profiles can be used for fabricating conveying, mixing, kneading and transition elements.

Figure 24A:
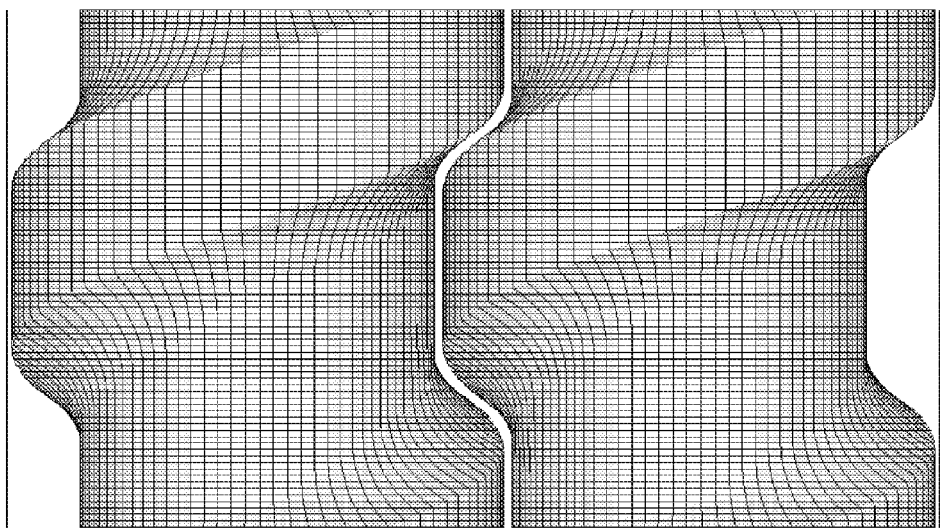

FIG. 24*a* depicts, as an example, a pair of one-flight conveying elements based on the screw profile of FIG. 2*a*. The barrel radius RG is 0.58. The clearance S between the two conveying elements is 0.02. The clearance D between the two conveying elements and the barrel is 0.01. The pitch T of the conveying elements is 1.2. The length of the conveying elements is 1.2, which corresponds to the rotation of the screw profiles by an angle $2\pi$. The barrel is depicted by thin, unbroken lines on the left and right of the two conveying elements. A possible computational grid is also depicted on the surfaces of the two conveying elements. This grid can be used for computing the flow through twin and multiple screw extruders.

Figure 24B:
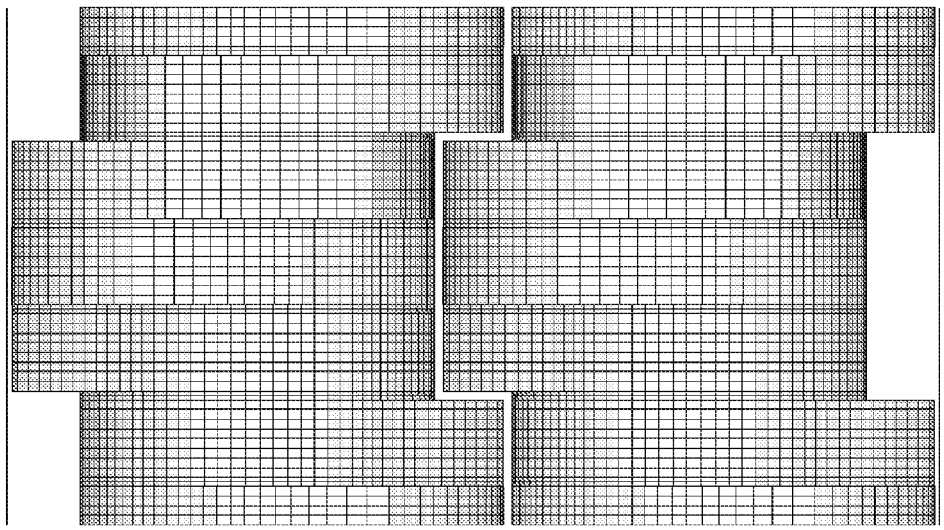

FIG. 24b depicts, as an example, a pair of one-flight kneading elements based on the screw profile of FIG. 2a. The barrel radius RG is 0.58. The clearance S between the kneading discs of the two kneading elements is 0.02. The clearance D between the kneading discs of the two kneading elements and the barrel is 0.01. The kneading element consists of 7 kneading discs each staggered clockwise in relation to each other by an angle $\pi/3$. The first and the last kneading disc have a length of 0.09. The kneading discs in the middle have a length of 0.18. The groove between the kneading discs has a length of 0.02. The barrel is depicted by thin unbroken lines on the right and left of the two kneading elements. A possible computational grid is also depicted on the surfaces of the two kneading elements. This grid can be used for computing the flow in twin and multiple screw extruders.

FIGS. 25 to 46 show screw profiles with 2 flights, which are generated by the method of generating tightly intermeshing, self-cleaning, co-rotating screw profiles according to the invention. FIGS. 25 to 42 in each case depict a quarter of a screw profile with 2 flights. All of these figures have an analogous design to that of FIGS. 1 to 20, which has already been described in detail for these figures.

FIGS. 25 to 46 depict screw profiles and screw elements in which the dimensionless outer screw radius RA is 0.54, 0.56, 0.57, 0.58 and 0.63. The method according to the invention for generating planar, tightly intermeshing, self-cleaning, co-rotating screw profiles with z flights is not limited to these discrete values for the dimensionless outer screw radius. Using the method according to the invention, two-flight screw profiles with a dimensionless outer screw radius between RA greater than 0.5 and RA smaller than or equal to 0.707, and preferably in the range from RA=0.52 to RA=0.69, can be generated.

Figure 25A:
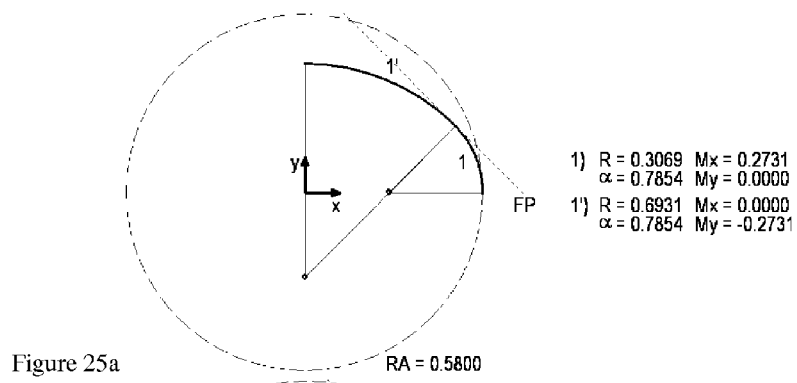
FIGS. 25a and 25b depict preferred 2-circle screw profiles.
Figure 25B:
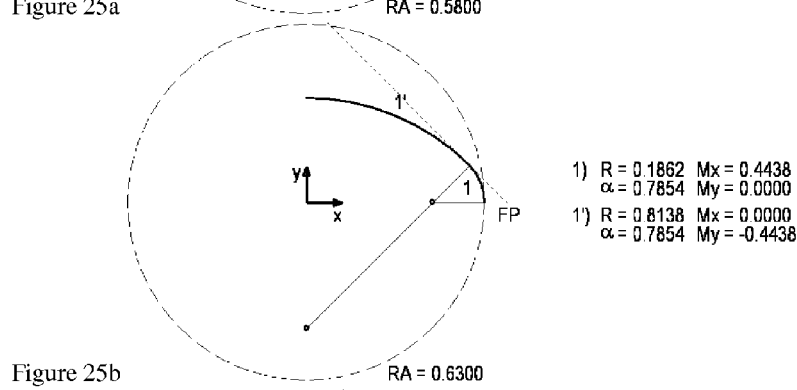

FIG. 25: FIGS. 25a and 25b depict preferred 2-circle screw profiles. FIGS. 25a and 25b differ in the outer screw radius RA. In FIG. 25a the outer screw radius RA is 0.58. In FIG. 25b the outer screw radius RA is 0.63. In FIGS. 25a and 25b radius R_1 of arc 1 is dependent on the outer screw radius RA. In FIGS. 25a and 25b arc 1 has an angle $\alpha\_1=\pi/4$.

Figure 26A:
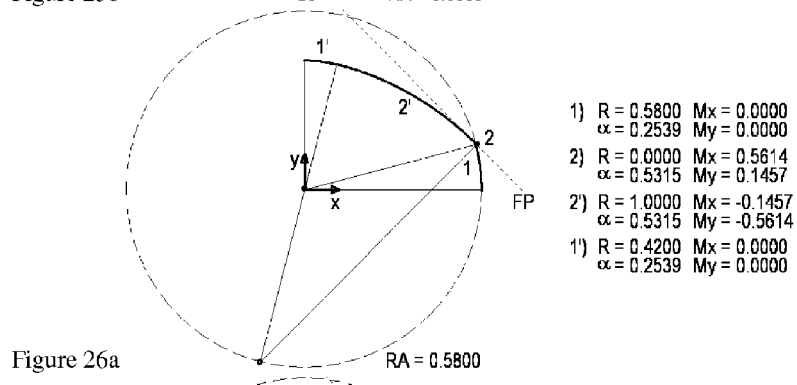
FIGS. 26a and 26b depict preferred 4-circle screw profiles.
Figure 26B:
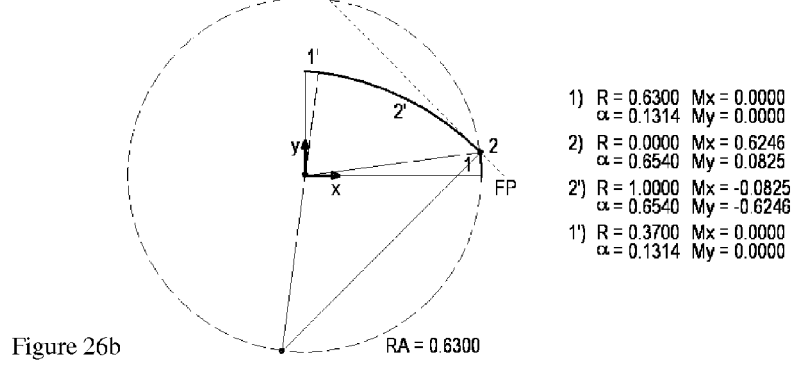

FIG. 26: FIGS. 26a and 26b depict preferred 4-circle screw profiles. FIGS. 26a and 26b differ in the outer screw radius RA. In FIG. 26a the outer screw radius RA is 0.58. In FIG. 26b the outer screw radius RA is 0.63. In FIGS. 26a and 26b arc 1 has a radius R_1=RA. In FIGS. 26a and 26b arc 2 has a radius R_2=0. In FIGS. 26a and 26b angle $\alpha\_1$ of arc 1 is dependent on the outer screw radius RA. In FIGS. 26a and 26b angle $\alpha\_2$ of arc 2 is dependent on the outer screw radius RA.

Figure 27A:
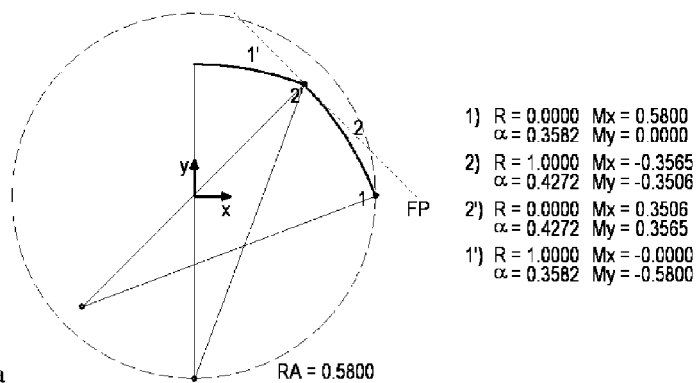
FIGS. 27a and 27b depict additional preferred 4-circle screw profiles
Figure 27B:
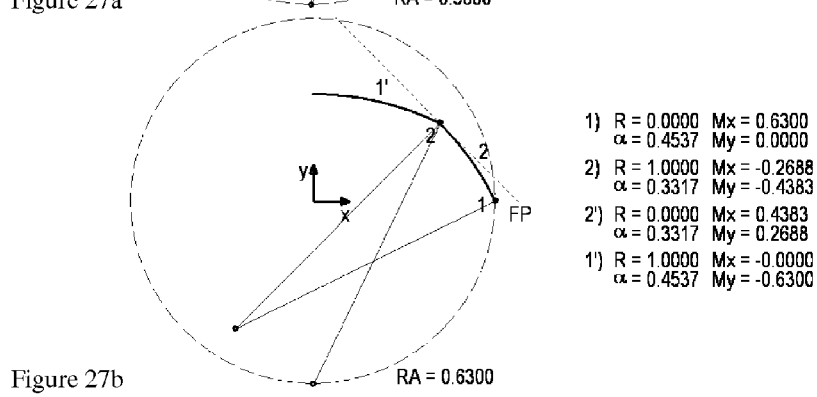
Figure 28A:
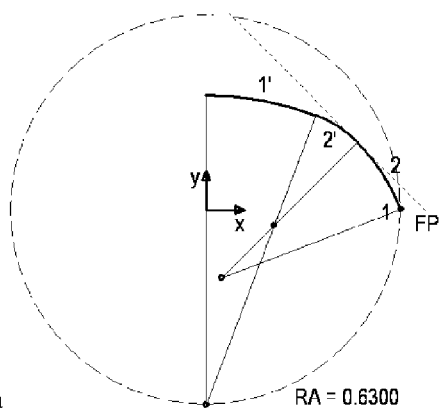
FIGS. 28a-28d depict additional preferred 4-circle screw profiles.
Figure 28B:
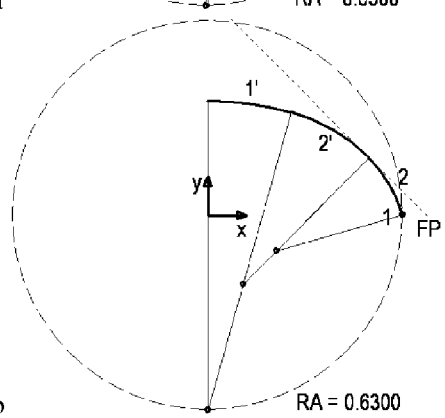
Figure 28C:
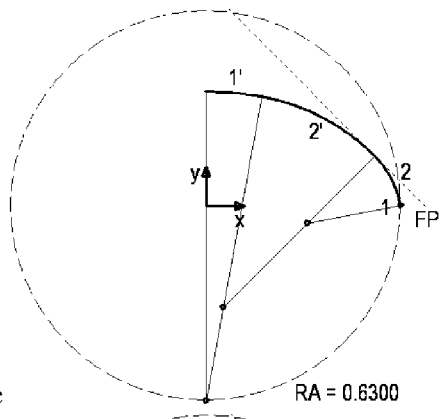
Figure 28D:
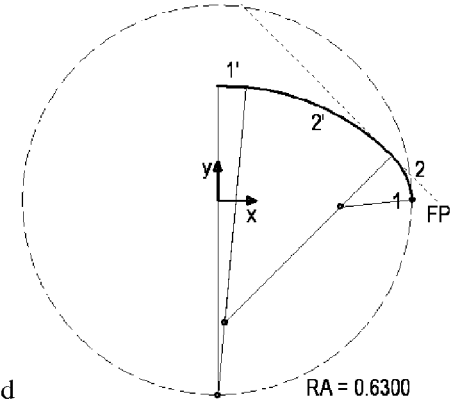
Figure 29A:
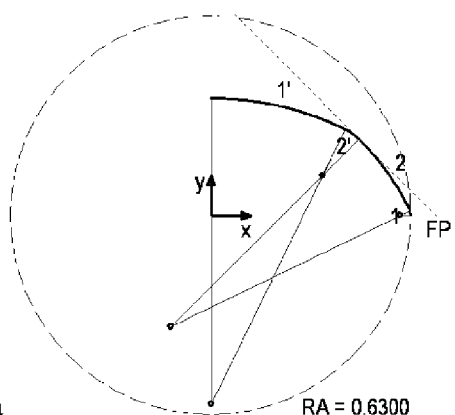
FIGS. 29a-29d depict additional preferred 4-circle screw profiles.
Figure 29B:
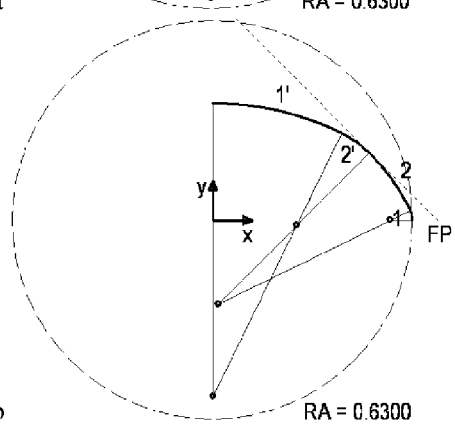
Figure 29C:
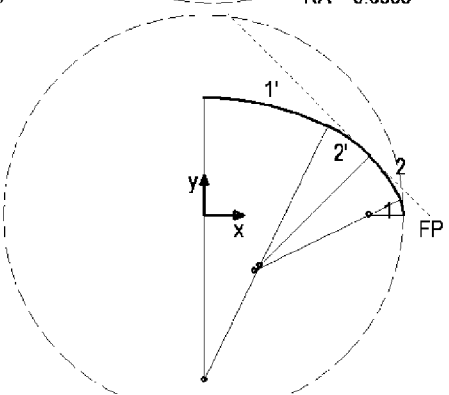
Figure 29D:
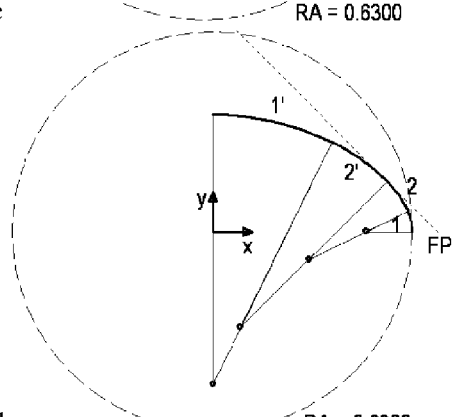
Figure 30A:
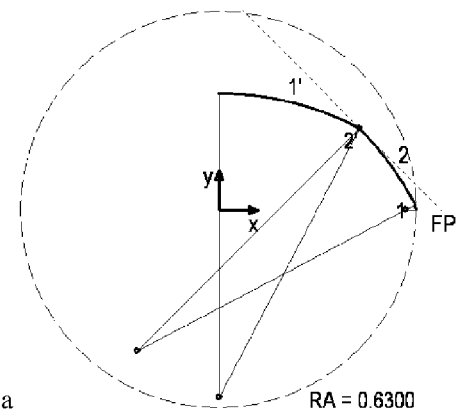
FIGS. 30a-30d depict additional preferred 4-circle screw profiles.
Figure 30B:
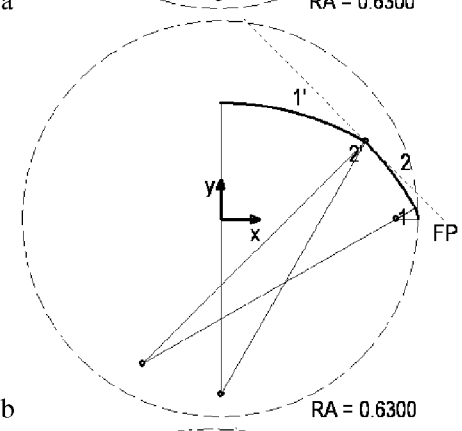
Figure 30C:
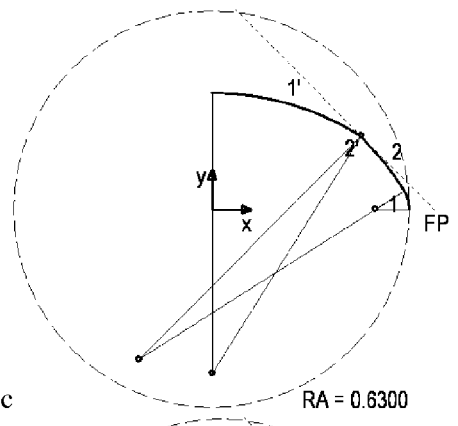
Figure 30D:
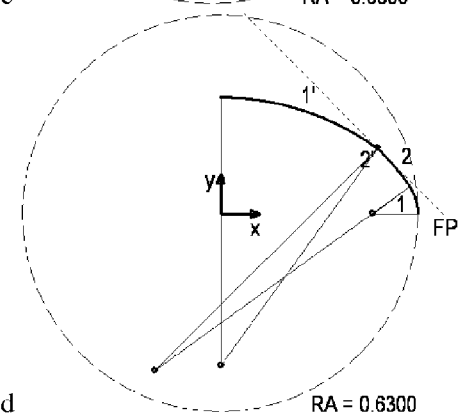
Figure 31A:
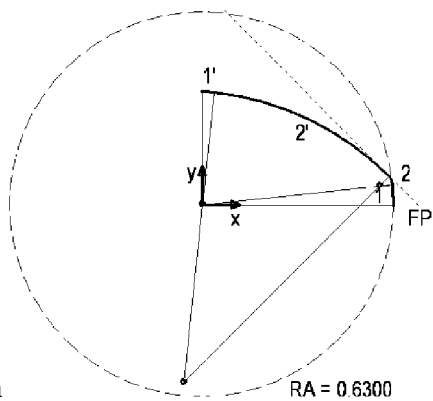
FIGS. 31a-31d depict additional preferred 4-circle screw profiles
Figure 31B:
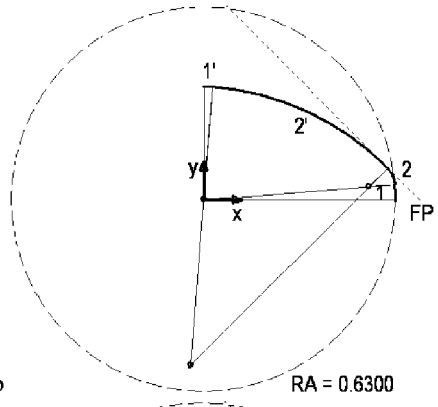
Figure 31C:
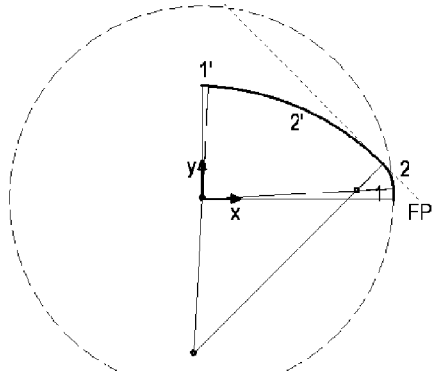
Figure 31D:
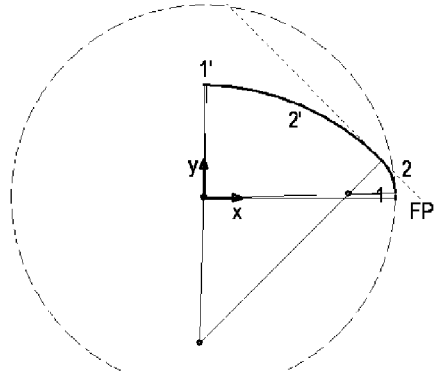
Figure 32A:
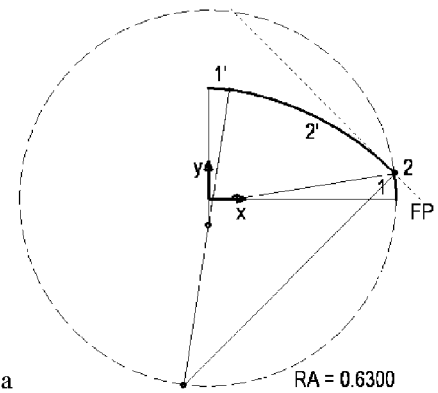
FIGS. 32a-32d depict additional preferred 4-circle screw profiles.
Figure 32B:
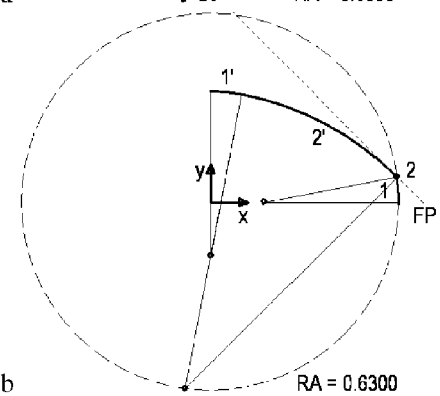
Figure 32C:
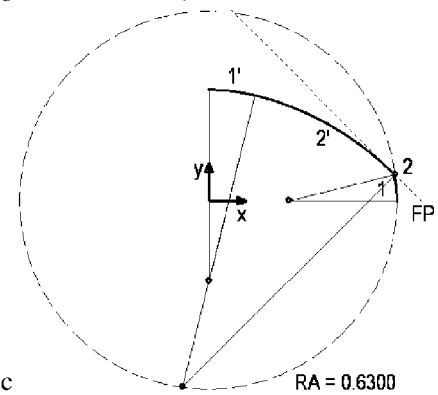
Figure 32D:
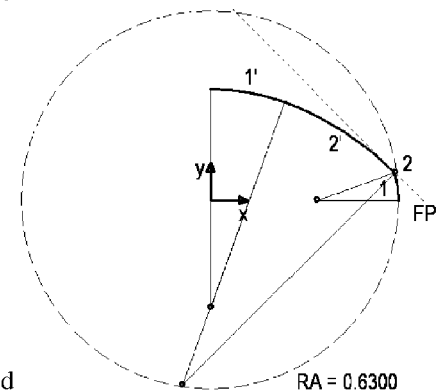
Figure 33A:
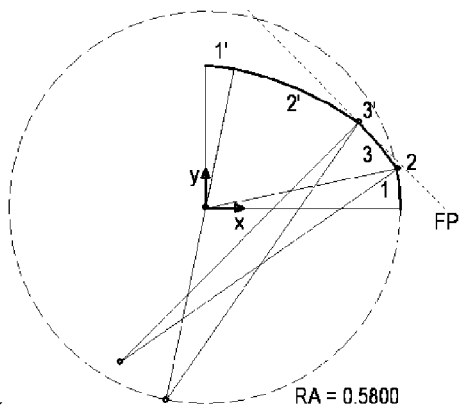
FIGS. 33a-33d depict preferred 6-circle screw profiles.
Figure 33B:
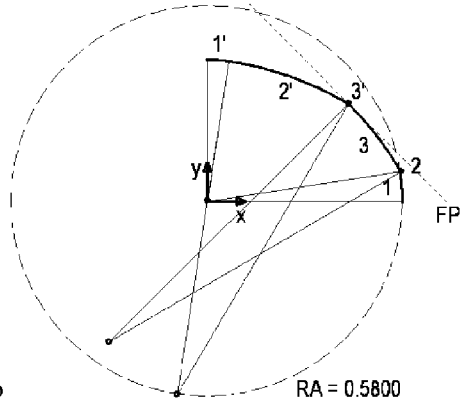
Figure 33C:
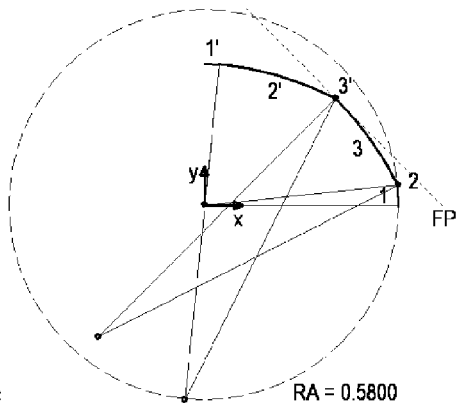
Figure 33D:
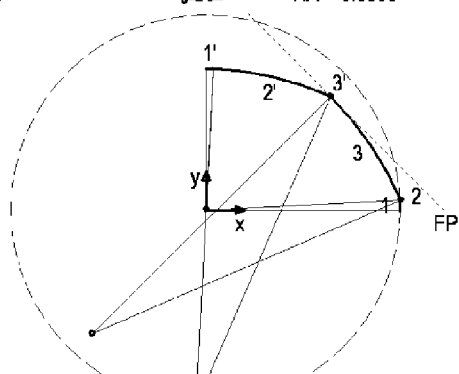
Figure 34A:
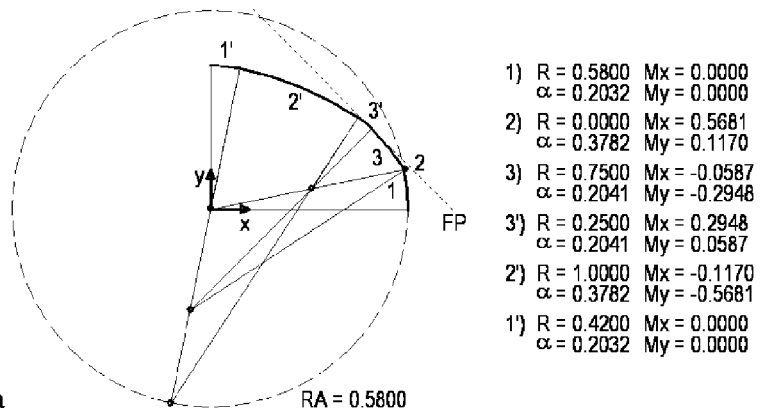
FIGS. 34a-34d depict additional preferred 6-circle screw profiles
Figure 34B:
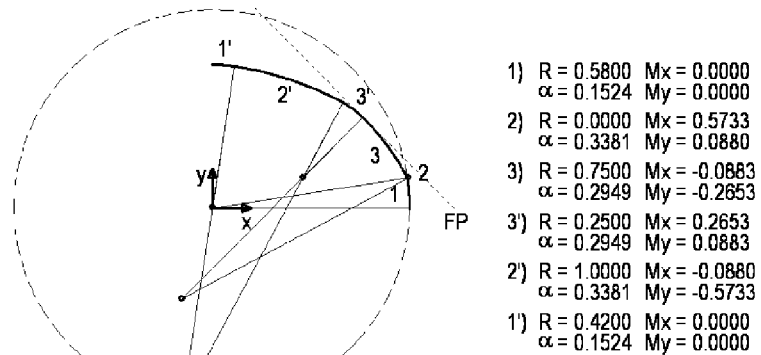
Figure 34C:
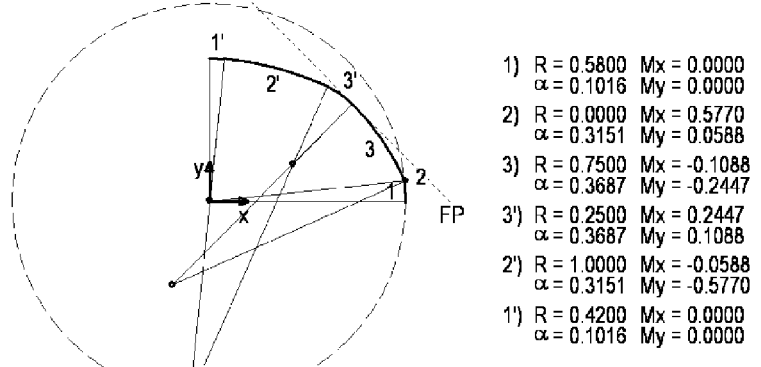
Figure 34D:
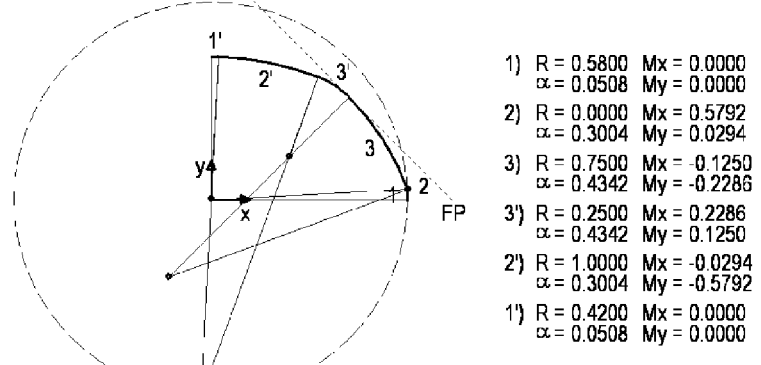
Figure 35A:
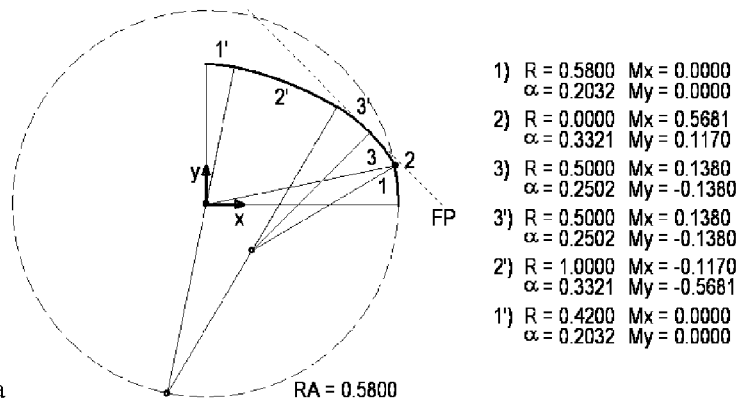
FIGS. 35a-35d depict additional preferred 6-circle screw profiles.
Figure 35B:
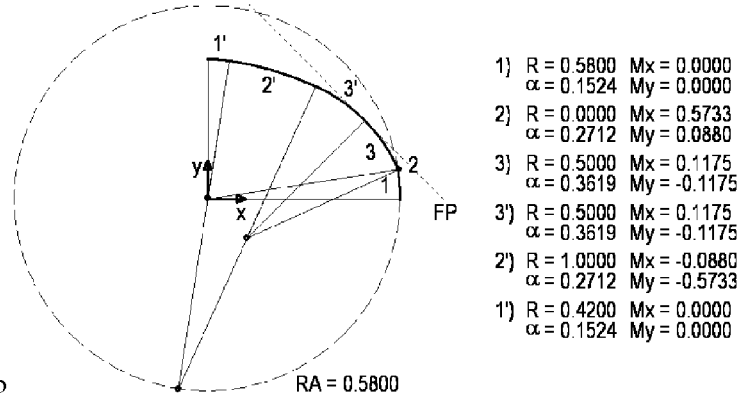
Figure 35C:
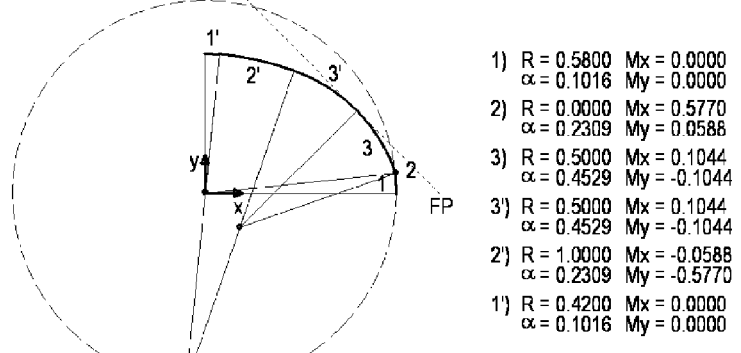
Figure 35D:
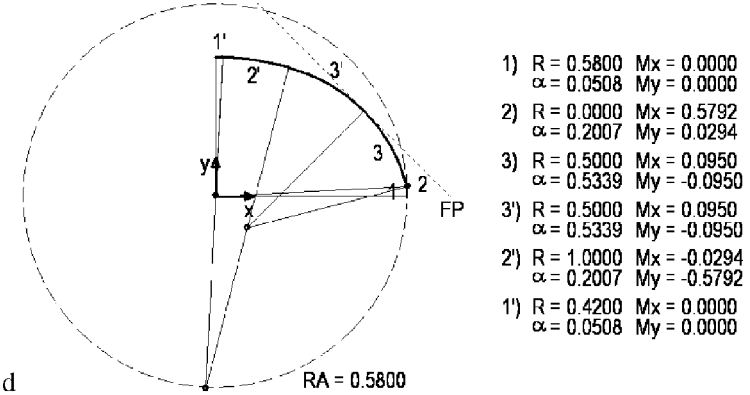
Figure 36A:
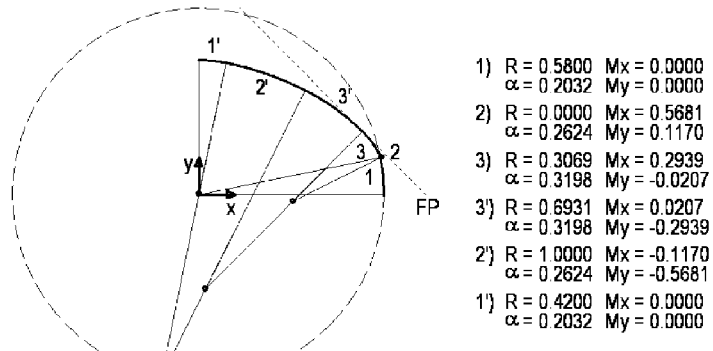
FIGS. 36a-36d depict additional preferred 6-circle screw profiles.
Figure 36B:
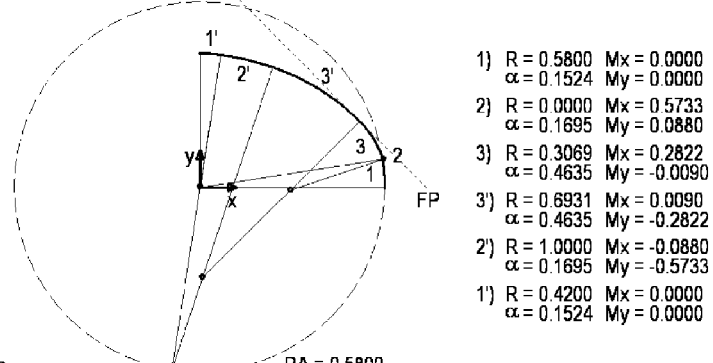
Figure 36C:
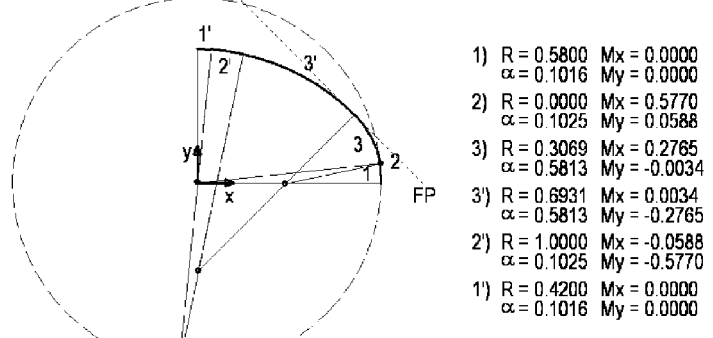
Figure 36D:
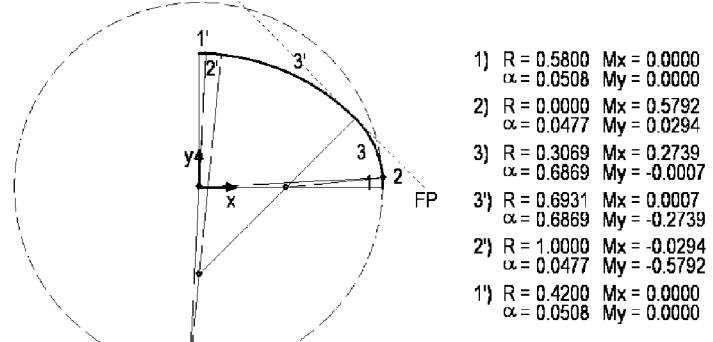
Figure 37A:
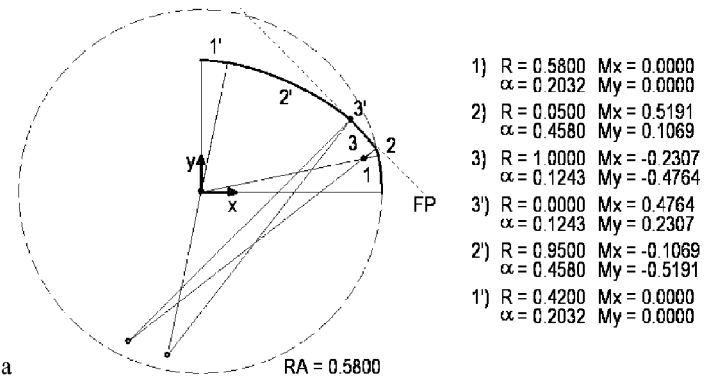
FIGS. 37a-37d depict additional preferred 6-circle screw profiles
Figure 37B:
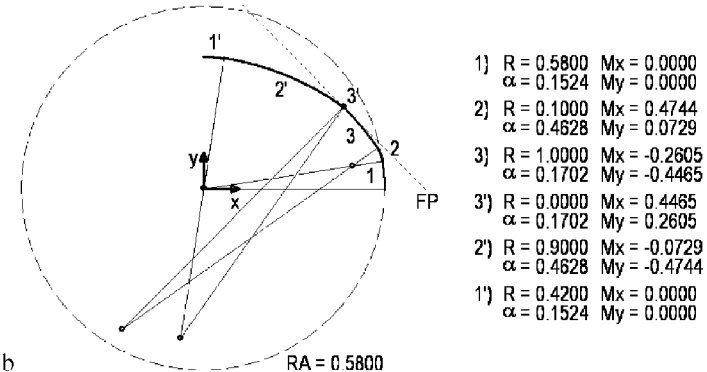
Figure 37C:
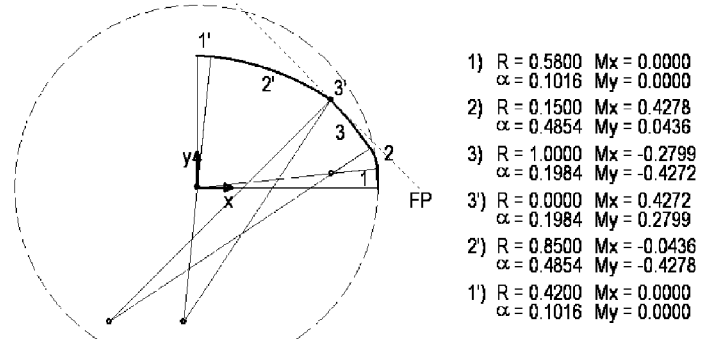
Figure 37D:
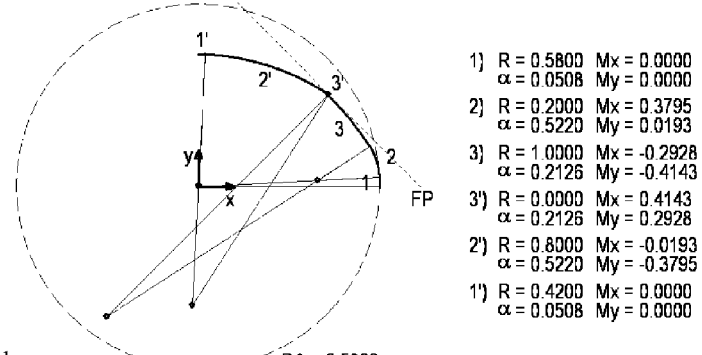
Figure 38A:
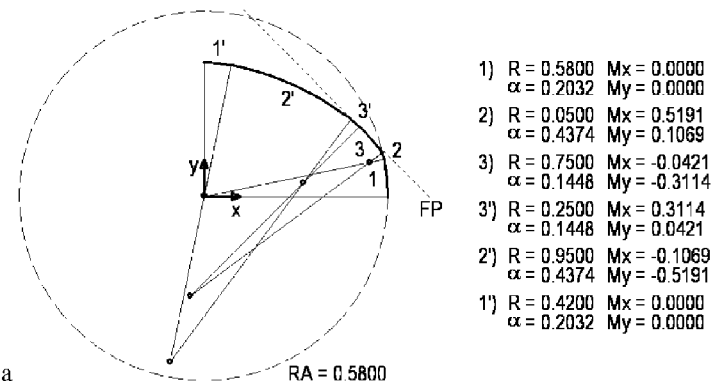
FIGS. 38a-38d depict additional preferred 6-circle screw profiles.
Figure 38B:
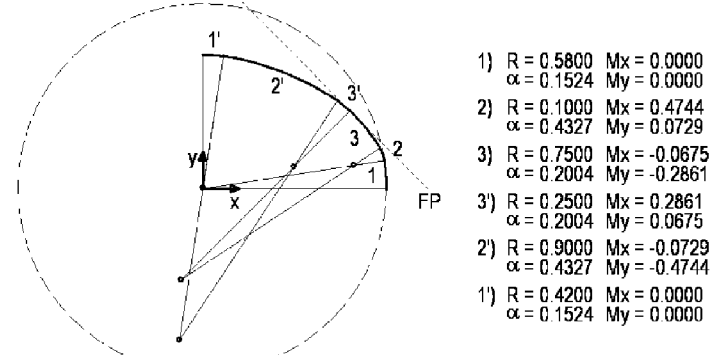
Figure 38C:
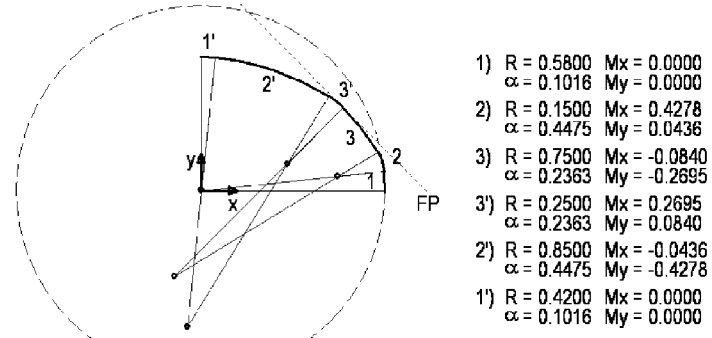
Figure 38D:
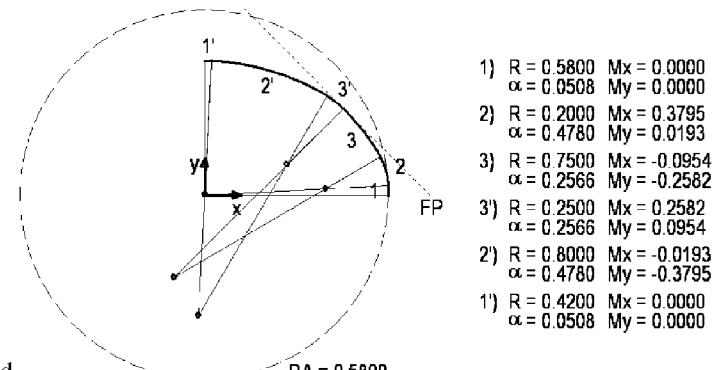
Figure 39A:
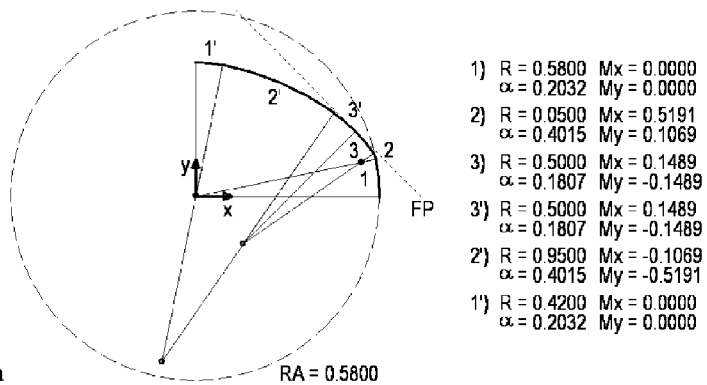
FIGS. 39a-39d depict additional preferred 6-circle screw profiles.
Figure 39B:
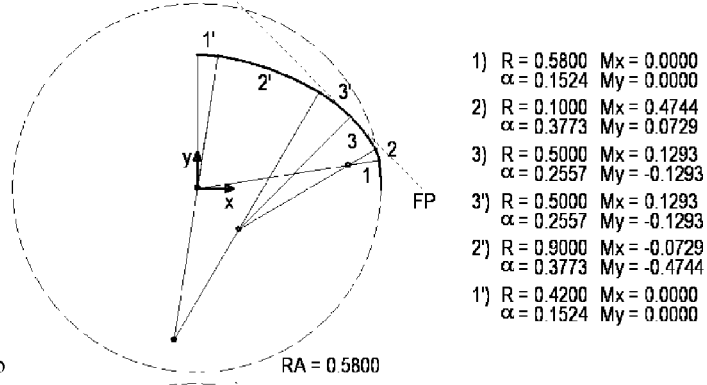
Figure 39C:
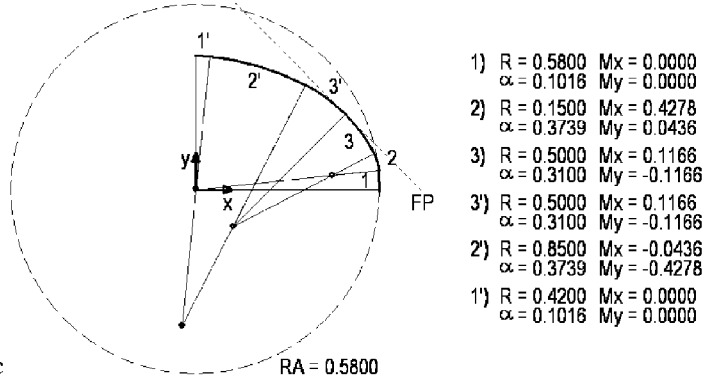
Figure 39D:
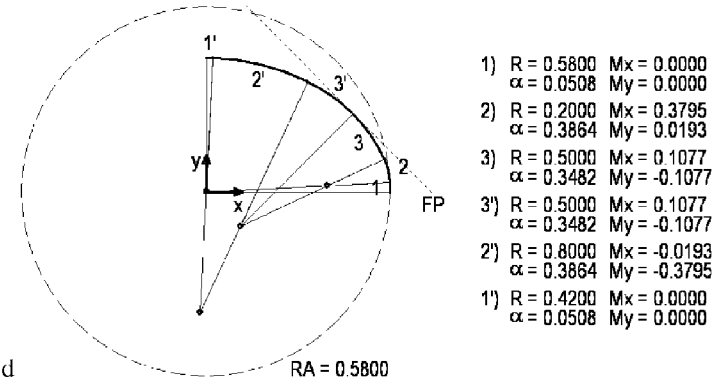
Figure 40A:
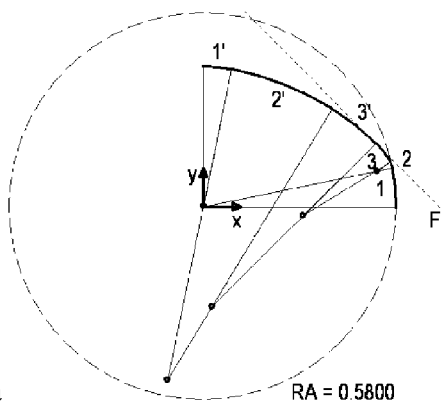
FIGS. 40a-40d depict additional preferred 6-circle screw profiles.
Figure 40B:
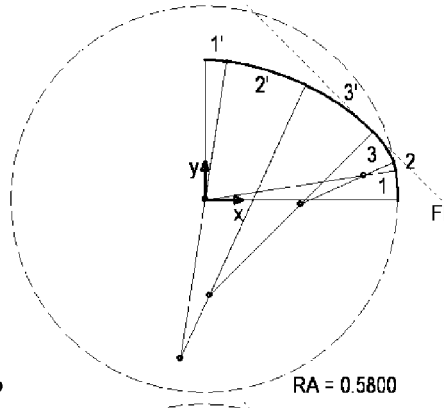
Figure 40C:
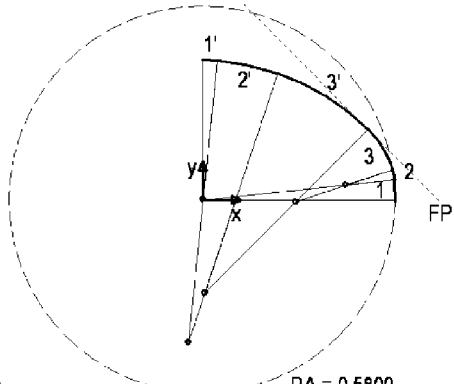
Figure 40D:
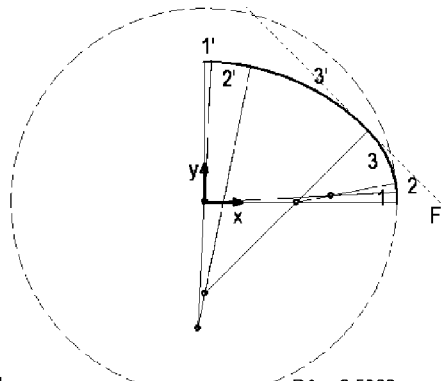

FIG. 27: FIGS. 27a and 27b depict additional preferred 4-circle screw profiles. FIGS. 27a and 27b differ in the outer screw radius RA. In FIG. 27a the outer screw radius is RA is 0.58. In FIG. 27b the outer screw radius RA is 0.63. In FIGS. 27a and 27b arc 1 has a radius R_1=0. In FIGS. 27a and 27b arc 2 has a radius R_2=A=1. In FIGS. 27a and 27b angle $\alpha\_1$ of arc 1 is dependent on the outer screw radius RA. In FIGS. 27a and 27b angle $\alpha\_2$ of arc 2 is dependent on the outer screw radius RA.

FIG. 28: FIGS. 28a to 28d depict additional preferred 4-circle screw profiles. FIGS. 28a to 28d depict a preferred transition between FIG. 27b and FIG. 25b. In FIGS. 28a to 28d the outer screw radius RA is 0.63. In FIGS. 28a to 28d arc 1 has a radius R_1=0. In FIGS. 28a to 28d angle $\alpha\_1$ of arc 1 is gradually decreased.

FIG. 29: FIGS. 29a to 29d depict additional preferred 4-circle screw profiles. FIGS. 29a to 29d depict another preferred transition between FIG. 27b and FIG. 25b. In FIGS. 29a to 29d the outer screw radius RA is 0.63. In FIGS. 29a to 29d arc 1 has an angle $\alpha\_1=0.4537$. In FIGS. 29a to 29d radius R_1 of arc 1 is gradually increased.

FIG. 30: FIGS. 30a to 30d depict additional preferred 4-circle screw profiles. FIGS. 30a to 30d depict an additional preferred transition between FIG. 27b and FIG. 25b. In FIGS. 30a to 30d the outer screw radius RA is 0.63. In FIGS. 30a to 30d arc 2 has a radius R_2=A=1. In FIGS. 30a to 30d radius R_1 of arc 1 is gradually increased.

FIG. 31: FIGS. 31a to 31d depict additional preferred 4-circle screw profiles. FIGS. 31a to 31d depict a preferred transition between FIG. 26b and FIG. 25b. In FIGS. 31a to 31d the outer screw radius RA is 0.63. In FIGS. 31a to 31d arc 1 has a radius R_1=RA. In FIGS. 31a to 31d angle $\alpha\_1$ of arc 1 is gradually decreased.

FIG. 32: FIGS. 32a to 32d depict additional preferred 4-circle screw profiles. FIGS. 32a to 32d depict an additional preferred transition between FIG. 26b and FIG. 25b. In FIGS. 32a to 32d the outer screw radius RA is 0.63. In FIGS. 32a to 32d arc 2 has a radius R_2=0. In FIGS. 32a to 32d radius R_1 of arc 1 is gradually decreased and angle $\alpha\_1$ of arc 1 is gradually increased.

A direct transition between FIG. 26b and FIG. 27b by means of a 4-circle screw profile is not possible. In such a case the transition takes place via FIG. 25b.

FIG. 33: FIGS. 33a to 33d depict preferred 6-circle screw profiles. FIGS. 33a to 33d depict a preferred transition between FIG. 26a and FIG. 27a. In FIGS. 33a to 33d the outer screw radius RA is 0.58. In FIGS. 33a to 33d arc 1 has a radius R_1=RA. In FIGS. 33a to 33d arc 2 has a radius R_2=0. In FIGS. 33a to 33d arc 3 has a radius R_3=A=1. In FIGS. 33a to 33d angle $\alpha\_1$ of arc 1 is gradually decreased.

FIG. 34: FIGS. 34a to 34d depict additional preferred 6-circle screw profiles. FIGS. 34a to 34d depict a preferred transition between FIG. 26a and a figure which is similar to FIG. 28a. In FIGS. 34a to 34d the outer screw radius RA is 0.58. In FIGS. 34a to 34d arc 1 has a radius R_1=RA. In FIGS. 34a to 34d arc 2 has a radius R_2=0. In FIGS. 34a to 34d arc 3 has a radius R_3=0.75. In FIGS. 34a to 34d angle $\alpha\_1$ of arc 1 is gradually decreased.

FIG. 35: FIGS. 35a to 35d depict additional preferred 6-circle screw profiles. FIGS. 35a to 35d depict a preferred transition between FIG. 26a and a figure which is similar to FIGS. 28a and 28b. In FIGS. 35a to 35d the outer screw radius RA is 0.58. In FIGS. 35a to 35d arc 1 has a radius R_1=RA. In FIGS. 35a to 35d arc 2 has a radius R_2=0. In FIGS. 35a to 35d arc 3 has a radius R_3=0.5. In FIGS. 35a to 35d angle $\alpha\_1$ of arc 1 is gradually decreased.

FIG. 36: FIGS. 36a to 36d depict additional preferred 6-circle screw profiles. FIGS. 36a to 36d depict a preferred transition between FIG. 26a and FIG. 25a. In FIGS. 36a to 36d the outer screw radius RA is 0.58. In FIGS. 36a to 36d arc 1 has a radius R_1=RA. In FIGS. 36a to 36d arc 2 has a radius R_2=0. In FIGS. 36a to 36d arc 3 has a radius R_3=0.3069. In FIGS. 36a to 36d angle $\alpha\_1$ of arc 1 is gradually decreased.

In addition to the abovementioned transitions between the individual screw profiles in each figure, transitions from one figure to another are also possible. Thus, the screw profiles of FIGS. 33a, 34a, 35a, 36a or FIGS. 33b, 34b, 35b, 36b can, for example, merge gradually into each other.

FIG. 37: FIGS. 37a to 37d depict additional preferred 6-circle screw profiles. FIGS. 37a to 37d depict a preferred transition based on FIG. 26a. In FIGS. 37a to 37d the outer screw radius RA is 0.58. In FIGS. 37a to 37d arc 1 has radius R_1=RA. In FIGS. 37a to 37d radius R_2 of arc 2 is gradually increased. In FIGS. 37a to 37d arc 3 has a radius R_3=A=1. In FIGS. 37a to 37d angle α_1 of arc 1 is gradually decreased.

FIG. 38: FIGS. 38a to 38d depict additional preferred 6-circle screw profiles. FIGS. 38a to 38d depict a preferred transition based on FIG. 26a. In FIGS. 38a to 38d the outer screw radius RA is 0.58. In FIGS. 38a to 38d arc 1 has a radius R_1=RA. In FIGS. 38a to 38d radius R_2 of arc 2 is gradually increased. In FIGS. 38a to 38d arc 3 has a radius R_3=0.75. In FIGS. 38a to 38d angle α_1 of arc 1 is gradually decreased.

FIG. 39: FIGS. 39a to 39d depict additional preferred 6-circle screw profiles. FIGS. 39a to 39d depict a preferred transition based on FIG. 26a. In FIGS. 39a to 39d the outer screw radius RA is 0.58. In FIGS. 39a to 39d arc 1 has a radius R_1=RA. In FIGS. 39a to 39d radius R_2 of arc 2 is gradually increased. In FIGS. 39a to 39d arc 3 has a radius R_3=0.5. In FIGS. 39a to 39d angle α_1 of arc 1 is gradually decreased.

FIG. 40: FIGS. 40a to 40d depict additional preferred 6-circle screw profiles. FIGS. 40a to 40d depict a preferred transition between FIG. 26a and FIG. 25a. In FIGS. 40a to 40d the outer screw radius RA is 0.58. In FIGS. 40a to 40d arc 1 has a radius R_1=RA. In FIGS. 40a to 40d the radius R_2 of arc 2 is gradually increased. In FIGS. 40a to 40d arc 3 has a radius R_3=0.3069. In FIGS. 40a to 40d angle α_1 of arc 1 is gradually decreased.

In addition to the abovementioned transitions between the individual screw profiles in each figure, transitions from one figure to another are also possible. The screw profiles of FIGS. 37a, 38a, 39a and 40a or of FIGS. 37b, 38b, 39b and 40b can, for example, merge gradually into each other.

In the above figures for two-flight screw profiles, the screw profile always begins at point x=RA and y=0. FIGS. 41 and 42 depict a selection of 8-circle screw profiles which begin at point x<RA and y=0 and in which only arc 3 is located on the outer screw radius.

Figures 41A, 41B, 41C, 41D:
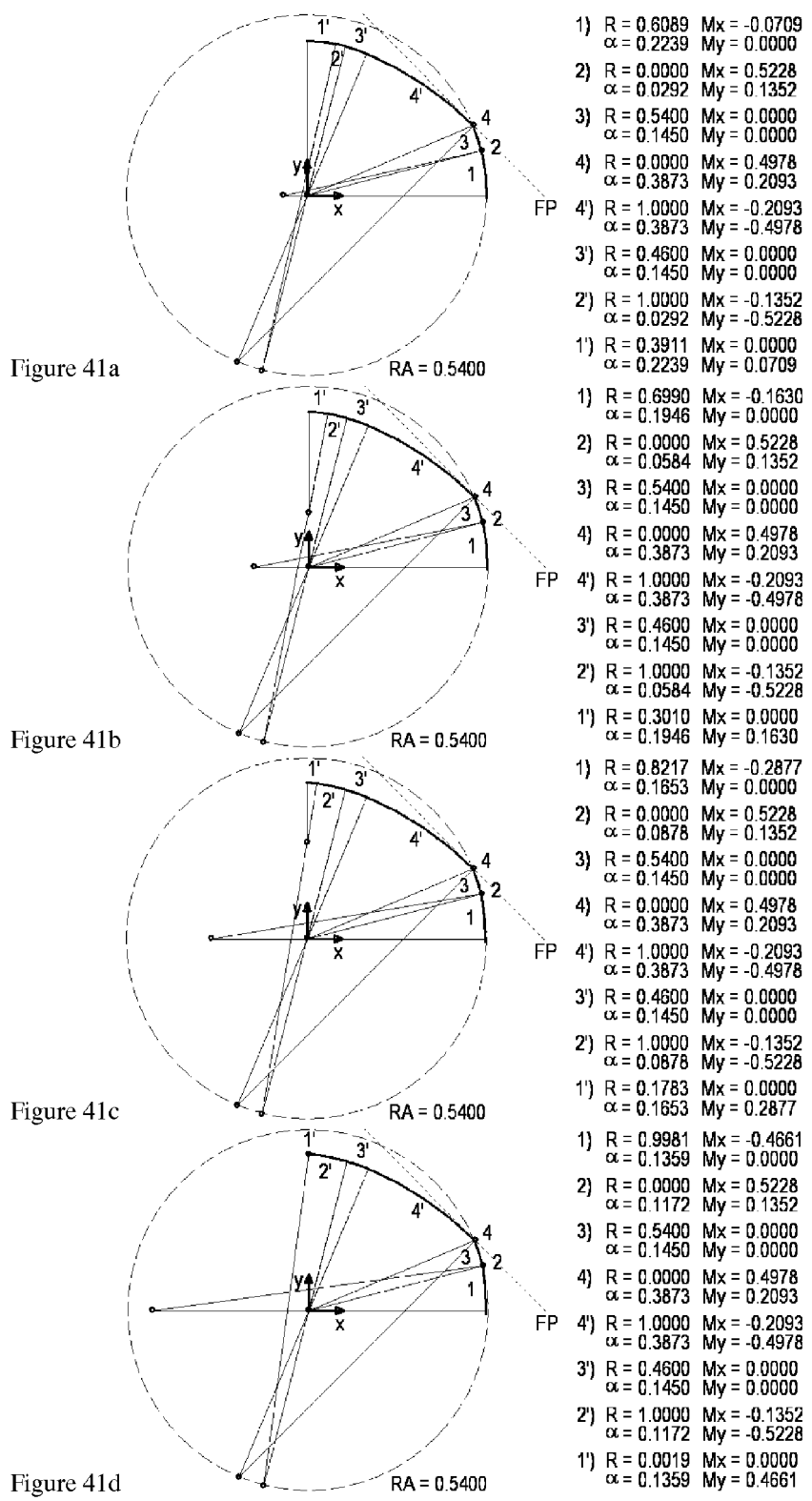
FIGS. 41a-41d depict preferred 8-circle screw profiles
Figure 43A:
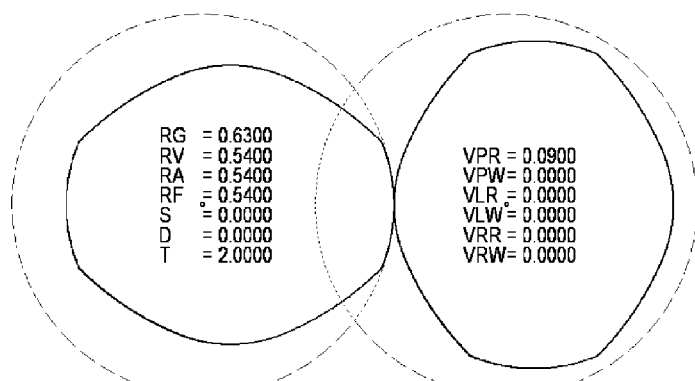
FIGS. 43a-43d depict preferred variants of eccentrically positioned two-flight screw profiles
Figure 43B:
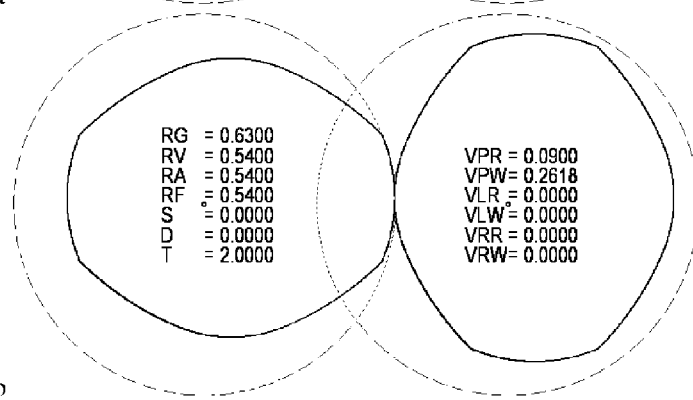
Figure 43C:
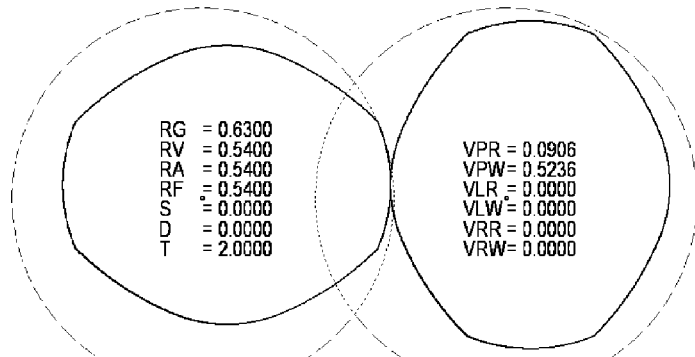
Figure 43D:
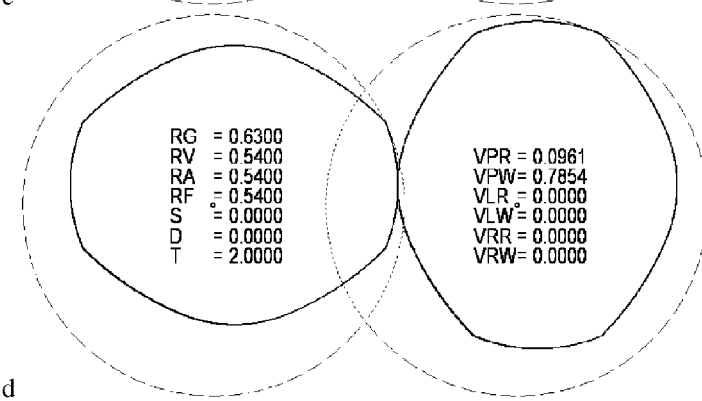
Figure 44A:
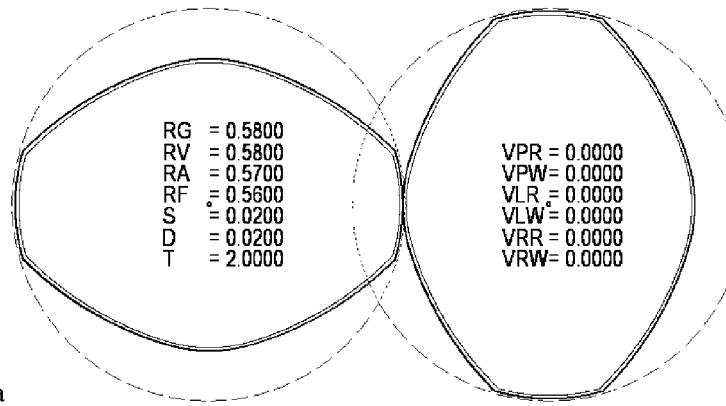
FIGS. 44a-44d depict various clearance strategies.
Figure 44B:
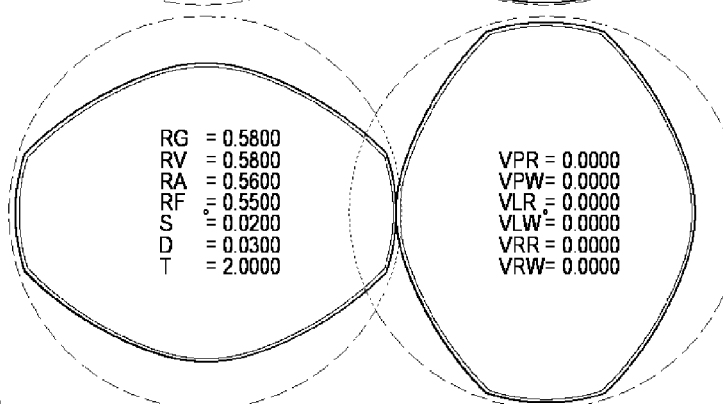
Figure 44C:
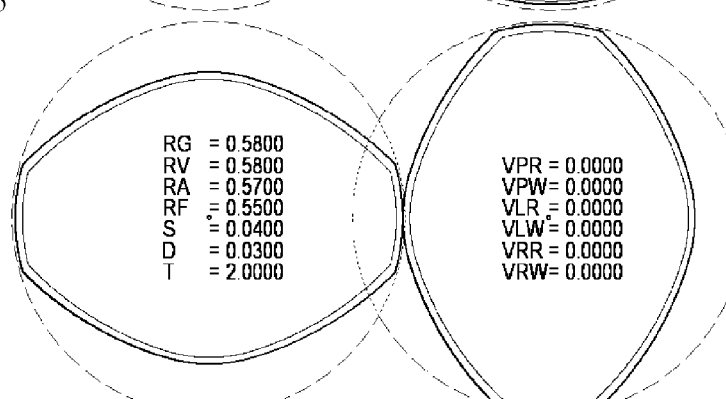
Figure 44D:
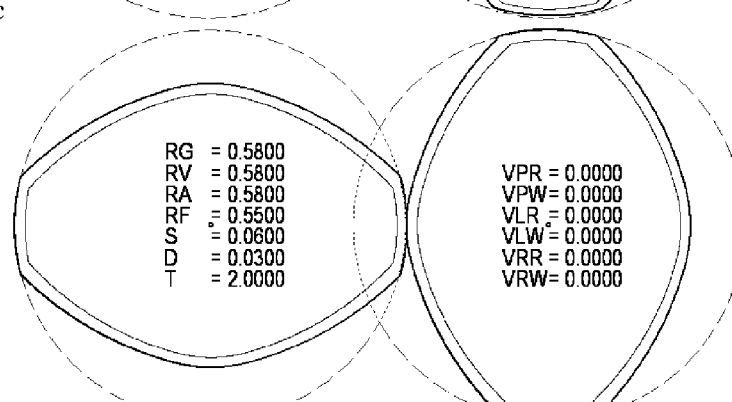
Figure 45A:
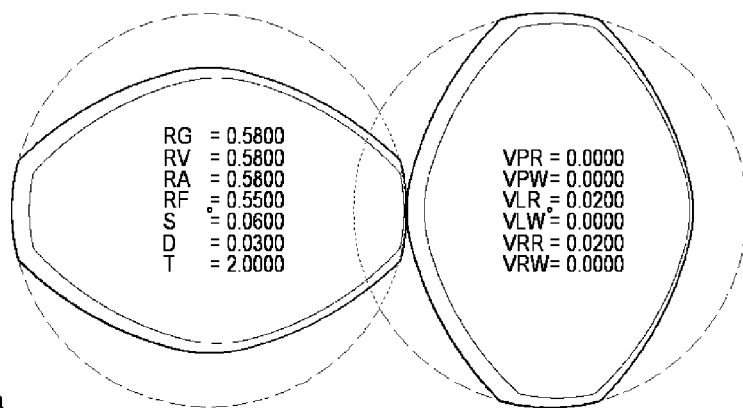
FIGS. 45a-45d depict a selection of possible shifts.
Figure 45B:
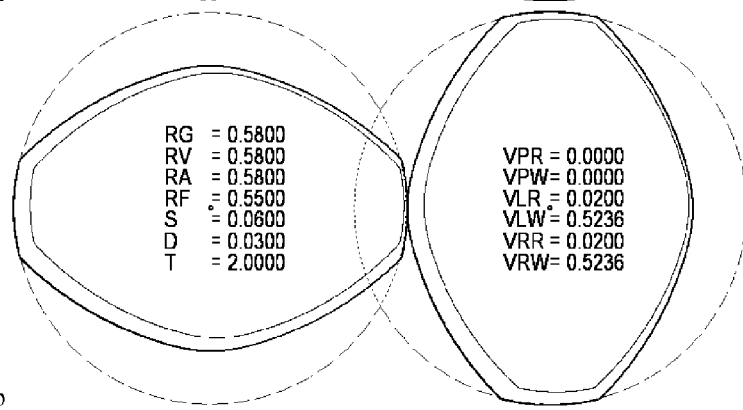
Figure 45C:
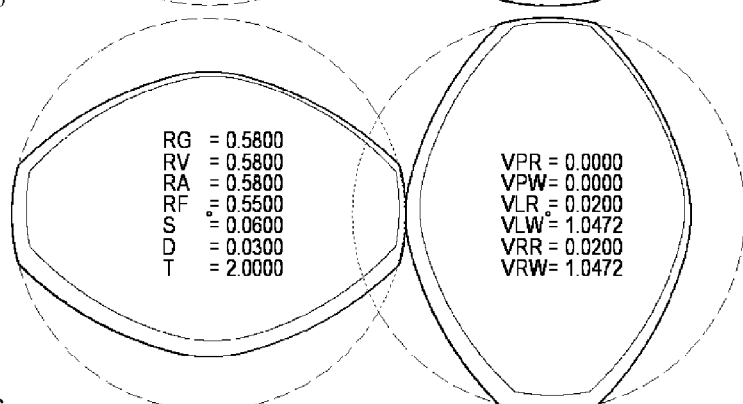
Figure 45D:
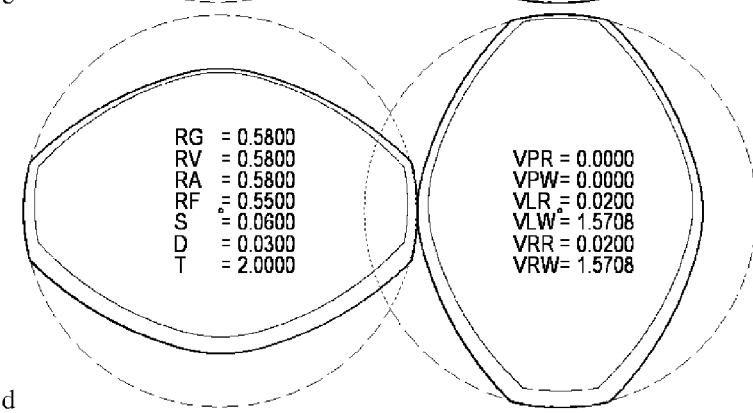

FIG. 41: FIGS. 41a to 41d depict preferred 8-circle screw profiles. FIGS. 41a to 41d depict a preferred transition based on an Erdmenger screw profile with an outer screw radius RA=0.54. In FIGS. 41a to 41d the outer screw radius RA is 0.54. In FIGS. 41a to 41d the radius R_1 of arc 1 is gradually increased. In FIGS. 41a to 41d arc 2 has a radius R_2=0. In FIGS. 41a to 41d arc 3 has a radius R_3=RA and is located on the outer screw radius. In FIGS. 41a to 41d arc 4 has a radius R_4=0. In FIGS. 41a to 41d angle α_1 of arc 1 is gradually decreased and angle α_2 of arc 2 is gradually increased. In FIGS. 41a to 41d arc 3 has an angle α_3=0.145. In FIGS. 41a to 41d arc 4 has an angle α_4=0.3873.

FIG. 42: FIGS. 42a to 42d depict additional preferred 8-circle screw profiles. FIGS. 42a to 42d depict an additional preferred transition based on an Erdmenger screw profile with an outer screw radius RA=0.54. In FIGS. 42a to 42d the outer screw radius RA is 0.54. In FIGS. 42a to 42d radius R_1 of arc 1 is gradually increased. In FIGS. 42a to 42d arc 2 has a radius R_2=0. In FIGS. 42a to 42d arc 3 has a radius R_3=RA and is located on the outer screw radius. In FIGS. 42a to 42d arc 4 has a radius R_4=0. In FIGS. 42a to 42d angle α_1 of arc 1 is gradually decreased and angle α_2 of arc 2 is gradually increased. In FIGS. 42a to 42d arc 3 has an angle α_3=0.0419. In FIGS. 42a to 42d arc 4 has an angle α_4=0.3873.

In addition to the abovementioned transitions between the individual screw profiles in each figure, transitions from one figure to another are also possible. The screw profiles of FIGS. 41a and 42a or FIGS. 41b and 42b can, for example, merge gradually into each other.

FIGS. 43 to 45 depict the generating and the generated screw profile inside a figure 8-shaped screw barrel. All of these figures have an analogous design to that of FIGS. 21 to 23, which has already been described in detail in relation to these figures. The numerical values inside the screw profiles have also already been described in connection with FIGS. 21 to 23.

FIG. 43: FIGS. 43a to 43d depict preferred variants of eccentrically positioned two-flight screw profiles. The depicted tightly intermeshing self-cleaning screw profiles are based on FIG. 26, although the outer screw radius RA is 0.54 in FIGS. 43a to 43d. The virtual barrel radius RV is 0.54 and is smaller than the barrel radius RG (RG=0.63). The remaining geometrical parameters can be found in the individual figures. Eccentrically positioned, two-flight, tightly intermeshing, self-cleaning screw profiles are characterized in that the distance between the screw profiles and the barrel varies. The screw profiles in FIGS. 43a to 43c have in each case been shifted to such an extent that precisely one point of the left-hand screw profile touches the barrel. The degree of the shift necessary for this contact depends on the direction of the shift. FIG. 43d shows a special case in which the screw profiles are shifted to such a degree and in such a direction that both screw profiles touch the barrel at precisely one point. This shift takes place at an angle of π/4. It is also possible for the screw profiles to be in eccentric positions in which no point of the screw profiles touches the barrel.

FIG. 44: As is well-known to those skilled in the art, all screw profiles require a certain degree of clearance in practice, both in relation to each other and to the barrel. FIGS. 44a to 44d depict various clearance strategies. The depicted tightly intermeshing, self-cleaning screw profiles are based on FIG. 26a. The remaining geometrical parameters can be found in the individual figures. FIG. 44a depicts a clearance strategy in which the clearance between the screw profiles to be fabricated and between the screw profiles to be fabricated and the barrel is identical. FIG. 44b depicts a clearance strategy in which the clearance between the screw profiles to be fabricated is smaller than the clearance between the screw profiles to be fabricated and the barrel. FIG. 44c depicts a clearance strategy in which the clearance between the screw profiles to be fabricated is larger than the clearance between the screw profiles to be fabricated and the barrel. FIG. 44d depicts an additional embodiment according to FIG. 44c with particularly large clearances. Typical clearances used in practice for the clearance between the screw profiles to be fabricated are in the range from 0.002 to 0.1. Typical clearances used in practice for the clearance between the screw profiles to be fabricated and the barrel are in the range from 0.002 to 0.1. Typical clearances used in practice are constant around the periphery of the screw profile. It is however possible to vary around the periphery of the screw profiles not only the clearance between the screw profiles to be fabricated but also the clearance between the screw profiles to be fabricated and the barrel.

FIG. 45: It is also possible to shift the screw profiles to be fabricated within the clearances. FIGS. 45a to 45d depict a selection of possible shifts. The depicted tightly intermeshing, self-cleaning screw profiles are based on FIG. 26a. The depicted screw profiles to be fabricated are based on FIG. 44d. The remaining geometrical parameters can be found in the individual figures. In FIGS. 45a to 45d the degree of the shift for each of the two screw profiles to be fabricated is VLR=VRR=0.02. In FIGS. 45a to 45d the direction of the shift for each of the two screw profiles to be fabricated is varied gradually between VLW=VRW=0 and VLW=VRW=π/2. It is possible to shift the two screw profiles to be fabricated independently of each other in various directions and to different degrees.

Two-flight screw profiles generated by the method of generating tightly intermeshing, self-cleaning, co-rotating screw profiles according to the invention can be used for fabricating screw elements. In particular, such screw profiles can be used for fabricating conveying elements, mixing elements, kneading elements and transition elements.

Figure 46A:
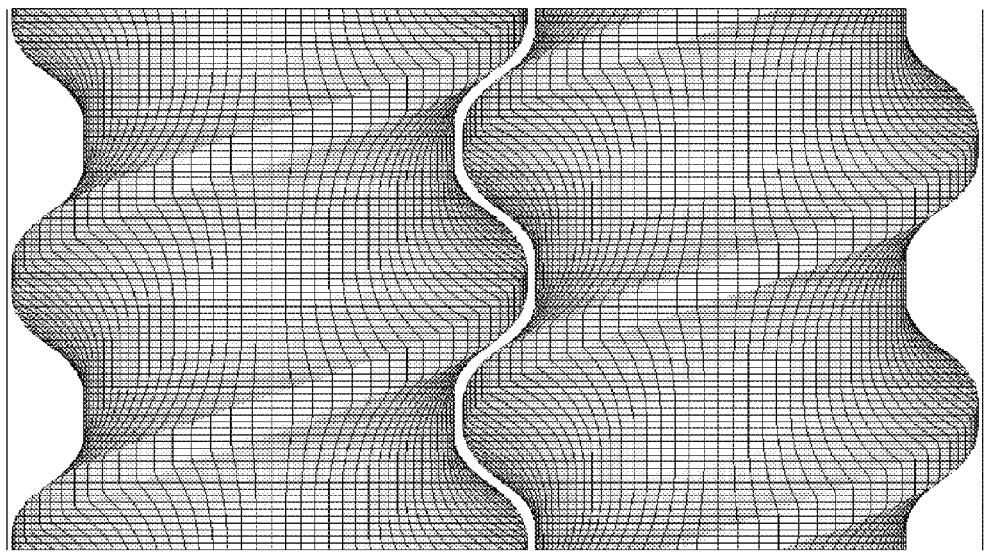

FIG. 46a depicts a pair of two-flight conveying elements based on the screw profile of FIG. 26a. The barrel radius RG is 0.58. The clearance S between the two conveying elements is 0.02. The clearance D between the two conveying elements and the barrel is 0.01. The pitch T of the conveying elements is 1.2. The length of the conveying elements is 1.2, which corresponds to rotation of the screw profiles by an angle $2\pi$. The barrel is depicted by thin unbroken lines on the left and the right of the two conveying elements. A possible computational grid is also depicted on the surfaces of the two conveying elements. This grid can be used for computing the flow in twin and multiple screw extruders.

Figure 46B:
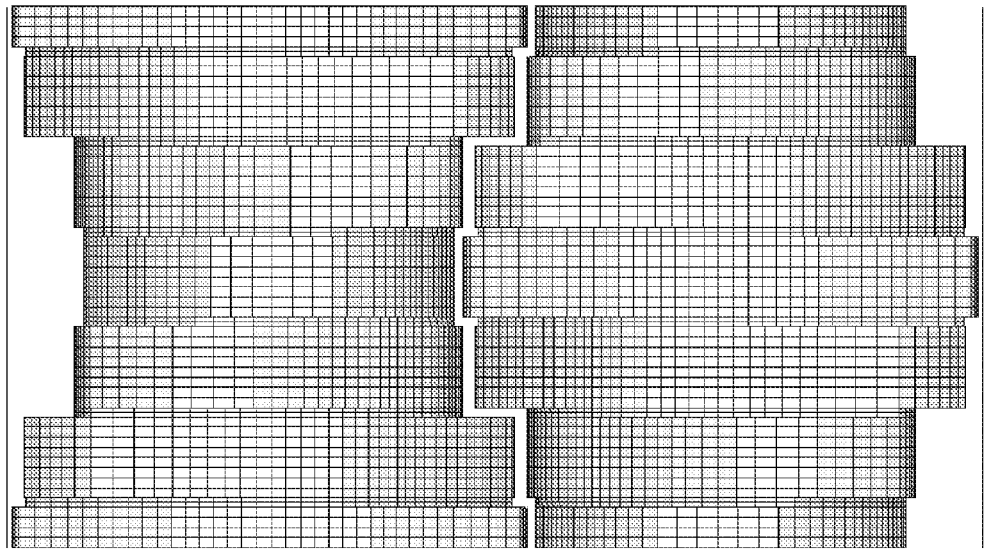

FIG. 46b depicts a pair of two-flight kneading elements based on the screw profile of FIG. 26a. The barrel radius RG is 0.58. The clearance S between the kneading discs of the two kneading elements is 0.02. The clearance D between the kneading discs of the two kneading elements and the barrel is 0.01. The kneading element consists of 7 kneading discs which are each staggered in a clockwise direction in relation to each other by an angle π/6. The first and the last kneading disc each have a length of 0.09. The kneading discs in the middle each have a length of 0.18. The groove between the kneading discs has a length of 0.02. The barrel is depicted by thin, unbroken lines on the left and right of the two kneading elements. In addition, a possible computational grid is depicted on the surfaces of the two kneading elements. This grid can be used for computing the flow in twin and multiple screw extruders.

FIGS. 47 to 53 depict screw profiles with 3 flights which are generated by the method of generating tightly intermeshing, self-cleaning, co-rotating screw profiles according to the invention. FIGS. 47 to 49 each show a sixth of a screw profile with 3 flights. All of these figures have an analogous design to that of FIGS. 1 to 20, which has already been described in detail for these figures.

FIGS. 47 to 53 depict screw profiles and screw elements in which the dimensionless outer screw radius RA has the values 0.5233, 0.53, 0.5333, 0.5433 and 0.5567. The method according to the invention for generating planar, tightly intermeshing, self-cleaning, co-rotating screw profiles with z flights is not limited to these discrete values for the dimensionless outer screw radius. Using the method according to the invention it is possible to generate three-flight screw profiles with a dimensionless outer screw radius between RA greater than 0.5 and RA smaller than or equal to 0.577, and preferably in the range from RA=0.51 to RA=0.57.

Figure 47A:
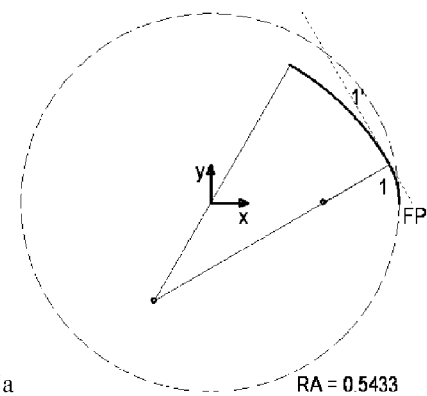
FIGS. 47a and 47b depict preferred 2-circle screw profiles.
Figure 47B:
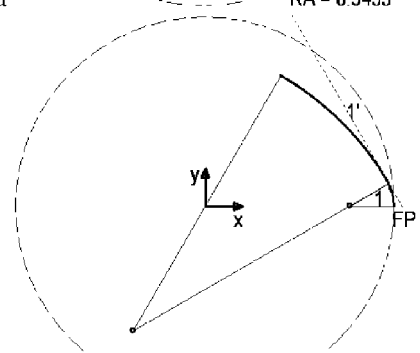

FIG. 47: FIGS. 47a and 47b depict preferred 2-circle screw profiles. FIGS. 47a and 47b differ in their outer screw radius RA. In FIG. 47a the outer screw radius is RA=0.5433. In FIG. 47b the outer screw radius RA is 0.5567. In FIGS. 47a and 47b the radius R_1 of arc 1 is dependent on the outer screw radius RA. In FIGS. 47a and 47b arc 1 has an angle $\alpha\_1=\pi/6$.

Figure 48A:
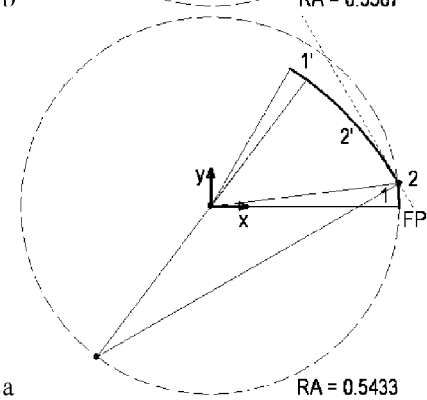
FIGS. 48a and 48b depict preferred 4-circle screw profiles
Figure 48B:
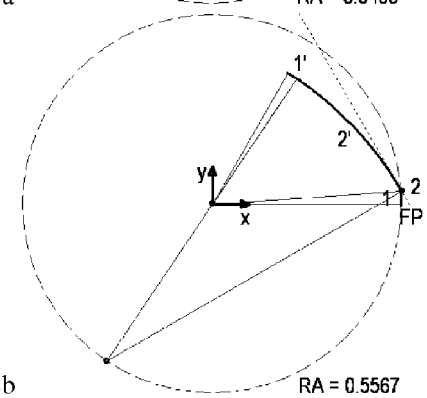
Figure 50A:
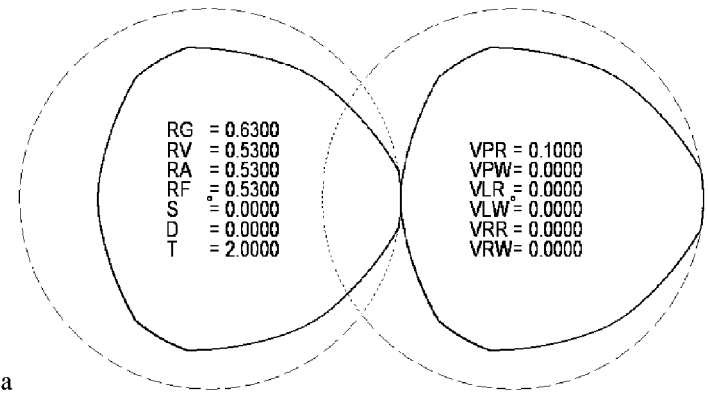
FIGS. 50a-50d depict preferred variants of eccentrically positioned three-flight screw profiles.
Figure 50B:
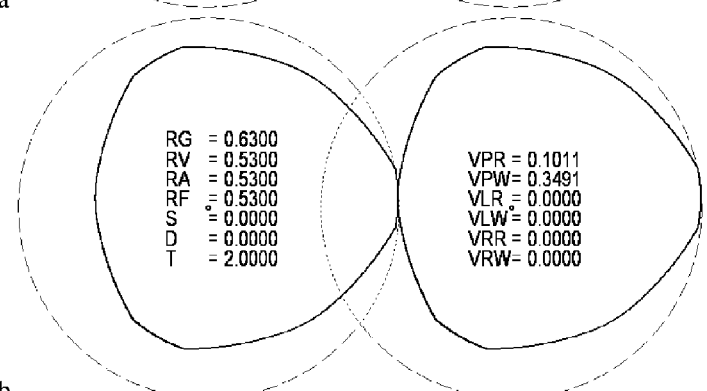
Figure 50C:
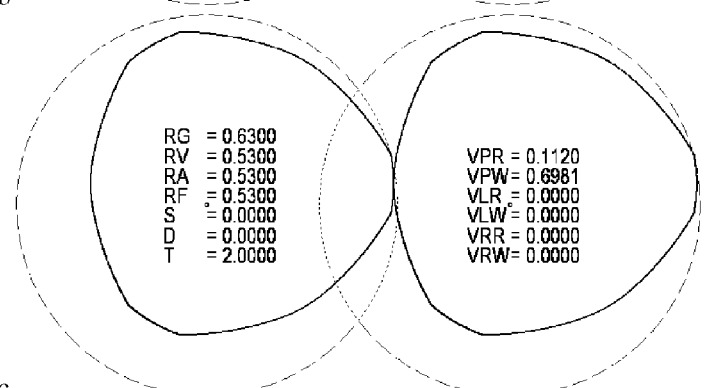
Figure 50D:
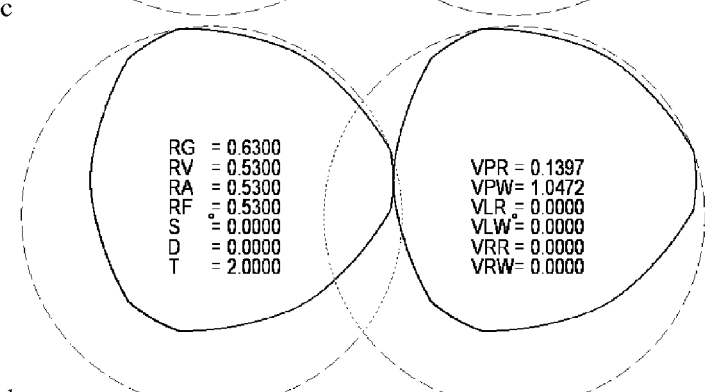
Figure 51A:
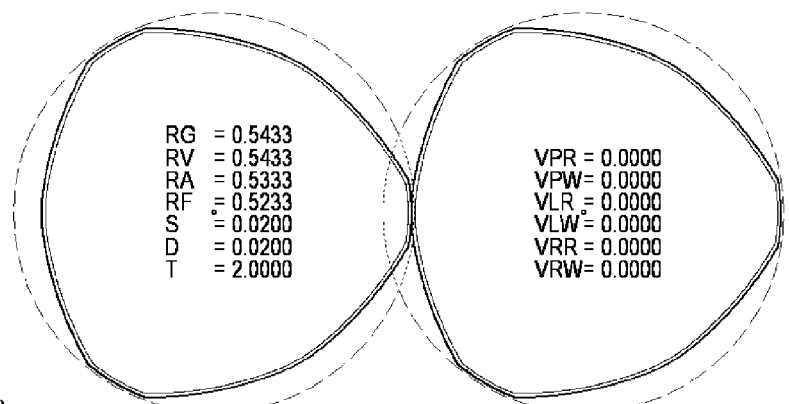
FIGS. 51a-51d depict various clearance strategies.
Figure 51B:
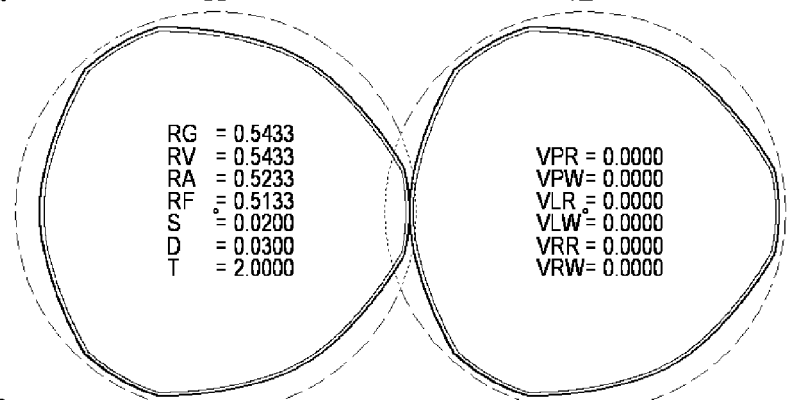
Figure 51C:
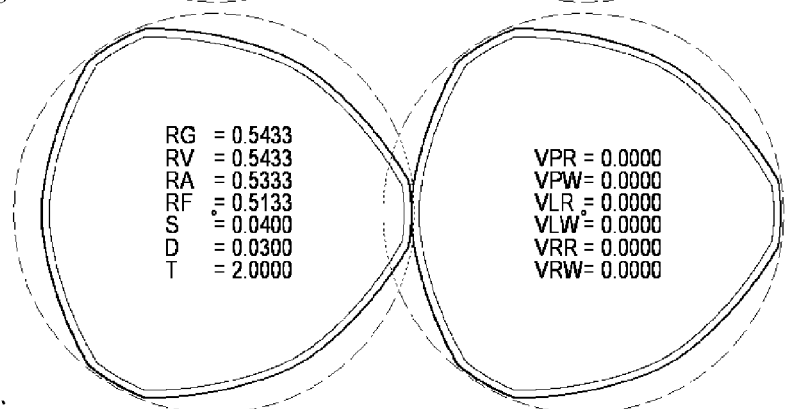
Figure 51D:
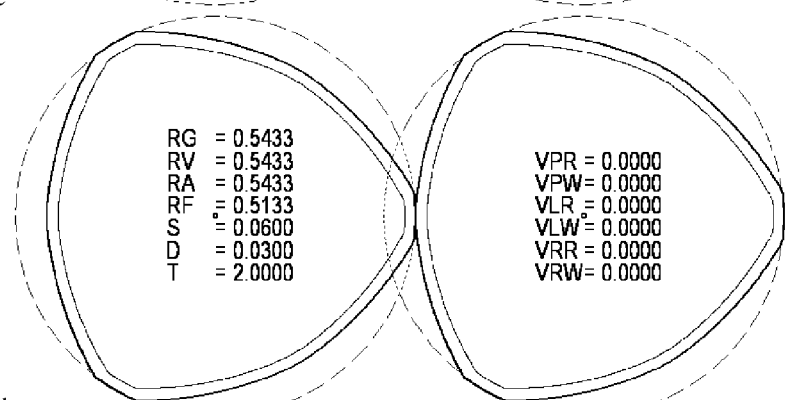
Figure 52A:
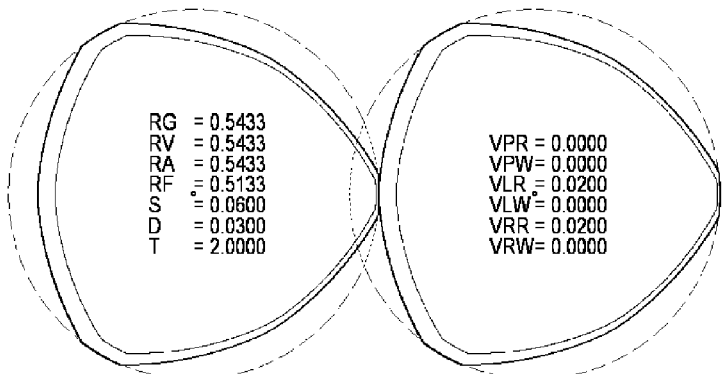
FIGS. 52a-52d depict a selection of possible shifts
Figure 52B:
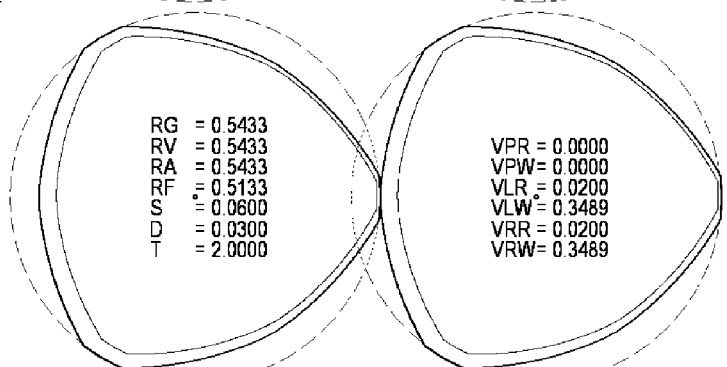
Figure 52C:
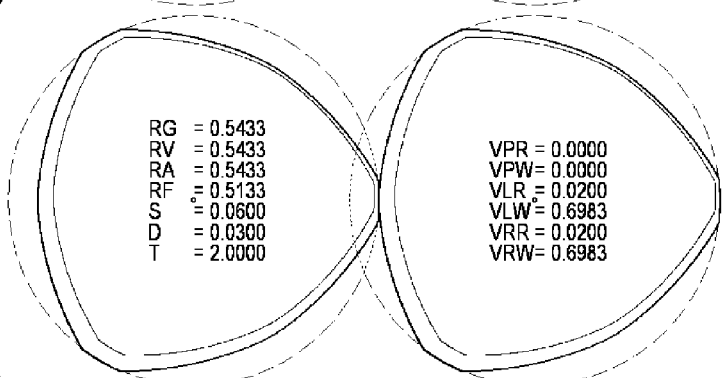
Figure 52D:
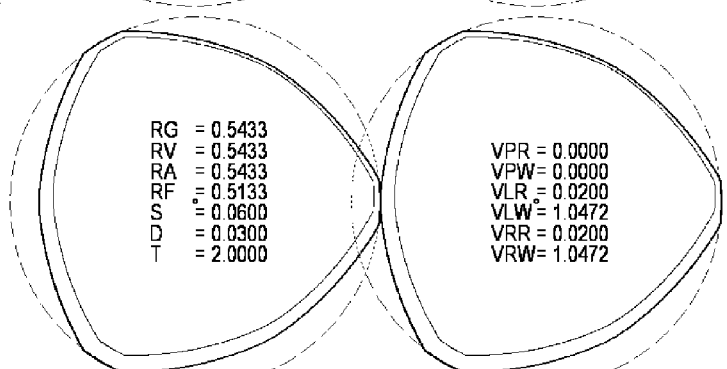

FIG. 48: FIGS. 48a and 48b depict preferred 4-circle screw profiles. FIGS. 48a and 48b differ in the outer screw radius RA. In FIG. 48a the outer screw radius RA is 0.5433. In FIG. 48b the outer screw radius RA is 0.5567. In each of FIGS. 48a and 48b arc 1 has a radius R_1=RA. In each of FIGS. 48a and 48b arc 2 has a radius R_2=0. In FIGS. 48a and 48b angle α_1 of arc 1 is dependent on the outer screw radius RA. In FIGS. 48a and 48b the angle α_2 of arc 2 is dependent on the outer screw radius RA.

FIG. 49: FIGS. 49a and 49b depict additional preferred 4-circle screw profiles. FIGS. 49a and 49b differ in the outer screw radius RA. In FIG. 49a the outer screw radius RA is 0.5433. In FIG. 49b the outer screw radius RA is 0.5567. In FIGS. 49a and 49b arc 1 has a radius R_1=0. In FIGS. 49a and 49b arc 2 has a radius R_2=A=1. In FIGS. 49a and 49b angle α_1 of arc 1 is dependent on the outer screw radius RA. In FIGS. 49a and 49b angle α_2 of arc 2 is dependent on the outer screw radius RA.

FIGS. 47 to 49 depict screw profiles which are designed similarly to FIGS. 1 to 3 for one-flight screw profiles. FIGS. 47 to 49 depict screw profiles which are designed analogously to FIGS. 25 to 27 for two-flight screw profiles. The single- and two-flight screw profiles depicted in FIGS. 4 to 19 and in FIGS. 28 to 42 can be applied analogously to three-flight screw profiles. It is thus possible to adjust the size of the tip region in many ways, even in three-flight screw profiles. Depending on the type of transition used between the flank and tip regions of the screw profile the ratios between the elongating and shear forces acting on the viscous fluid can be adjusted in the same way as in one-flight and two-flight screw profiles.

FIGS. 50 to 52 depict the generating and the generated screw profile inside a figure 8-shaped screw barrel. All of these figures have a design analogous to that of FIGS. 21 to 23, which has already been described in detail in relation to these figures. The numerical values inside the screw profiles have also already been explained in connection with FIGS. 21 to 23.

FIG. 50: FIGS. 50a to 50d depict preferred variants of eccentrically positioned three-flight screw profiles. The depicted tightly intermeshing, self-cleaning screw profiles are based on FIG. 48, although the outer screw radius RA is 0.53 in FIGS. 50a to 50d. The virtual barrel radius RV is 0.53 and is smaller than the barrel radius RG (RG=0.63). The remaining geometrical parameters can be found in the individual figures. Eccentrically positioned, three-flight, tightly intermeshing, self-cleaning screw profiles are characterized in that the distance between the screw profiles and the barrel is always identical for both screw profiles, independently of the direction of shift. In each of FIGS. 50a to 50d the screw profiles have been shifted to such an extent that precisely one point in the screw profiles touches the barrel. The degree of the shift required for this purpose depends on the direction of the shift. It is also possible for the screw profiles to be in eccentric positions in which no point of the screw profiles touches the barrel.

FIG. 51: As is well-known to those skilled in the art, all screw elements require a certain degree of clearance in practice, not only between each other but also in relation to the barrel. As is well-known to those skilled in the art and as can be read on pages 28 to 30 and pages 99 to 105 of book Kohlgrüber, clearances can be obtained, inter alia, by the methods of increasing the centre distance, by longitudinal equidistant clearance or three-dimensional equidistant clearance. Usually the clearance around the periphery of the screw profiles is constant. It is however also possible for the clearance to be varied around the periphery of the screw profile. FIGS. 51a to 51d depict various clearance strategies. The depicted tightly intermeshing self-cleaning screw profiles are based on FIG. 48a. The remaining geometrical parameters can be found in the individual figures. FIG. 51a depicts a clearance strategy in which the clearance is identical between the screw profiles to be fabricated and between the screw profiles to be fabricated and the barrel. FIG. 51*b* depicts a clearance strategy in which the clearance between the screw profiles to be fabricated is smaller than the clearance between the screw profiles to be fabricated and the barrel. FIG. 51*c* depicts a clearance strategy in which the clearance between the screw profiles to be fabricated is larger than the clearance between the screw profiles to be fabricated and the barrel. FIG. 51*d* depicts an additional variant according to FIG. 51*c* with particularly large clearances. Typical clearances occurring in practice for the clearance between the screw profiles to be fabricated are in the range from 0.002 to 0.1. Typical clearances occurring in practice for the clearance between the screw profiles to be fabricated and the barrel are in the range from 0.002 to 0.1. Typical clearances occurring in practice are constant around the periphery of the screw profile. It is however possible to vary around the periphery of the screw profiles not only the clearance between the screw profiles to be fabricated but also the clearance between the screw profiles to be fabricated and the barrel.

FIG. 52: It is also possible to shift the screw profiles to be fabricated within the clearances. FIGS. 52*a* to 52*d* depict a selection of possible shifts. The depicted, tightly intermeshing, self-cleaning screw profiles are based on FIG. 48*a*. The depicted screw profiles to be fabricated are based on FIG. 51*d*. The remaining geometrical parameters can be found in the individual figures. In FIGS. 52*a* to 52*d* the degree of the shift for both screw profiles to be fabricated is VLR=VRR=0.02. In FIGS. 52*a* to 52*d* the direction of the shift for both screw profiles to be fabricated is gradually varied between VLW=VRW=0 and VLW=VRW=π/3. It is possible to shift the two screw profiles to be fabricated independently of each other in various directions and to different degrees.

Three-flight screw profiles generated by the method of generating tightly intermeshing, self-cleaning, co-rotating screw profiles according to the invention can be used for fabricating screw elements. In particular, such screw profiles can be used for fabricating conveying elements, mixing elements, kneading elements and transition elements.

Figure 53A:
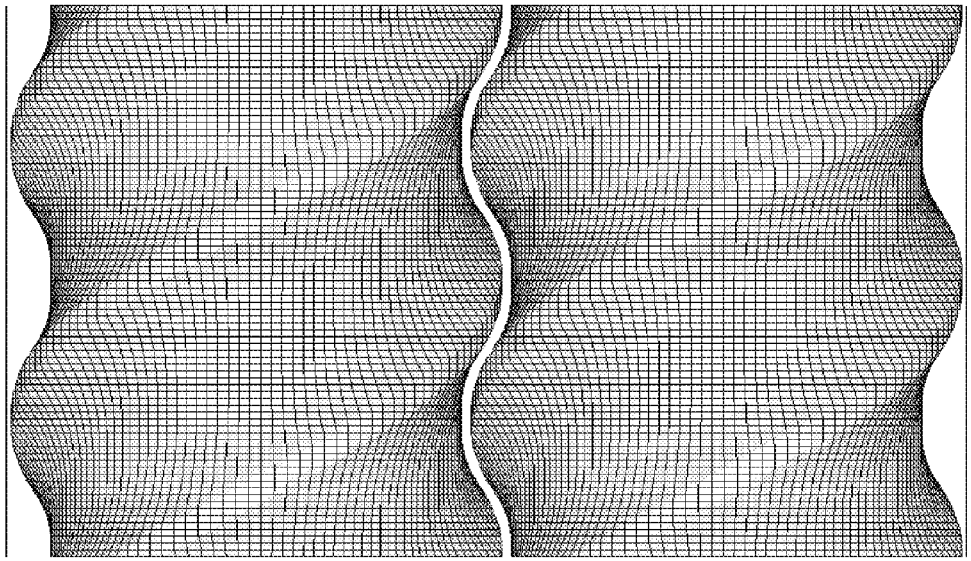

FIG. 53*a* depicts a pair of three-flight conveying elements based on the screw profile of FIG. 48*a*. The barrel radius RG is 0.5433. The clearance S between the two conveying elements is 0.02. The clearance D between the two conveying elements and the barrel is 0.01. The pitch T of the conveying elements is 1.8. The length of the conveying elements is 1.2, which corresponds to rotation of the screw profiles by an angle of 1.3333π. The barrel is depicted by thin, unbroken lines on the left and the right of the two conveying elements. A possible computational grid is also depicted on the surfaces of the two conveying elements, which can be used for computing the flow in twin and multiple screw extruders.

Figure 53B:
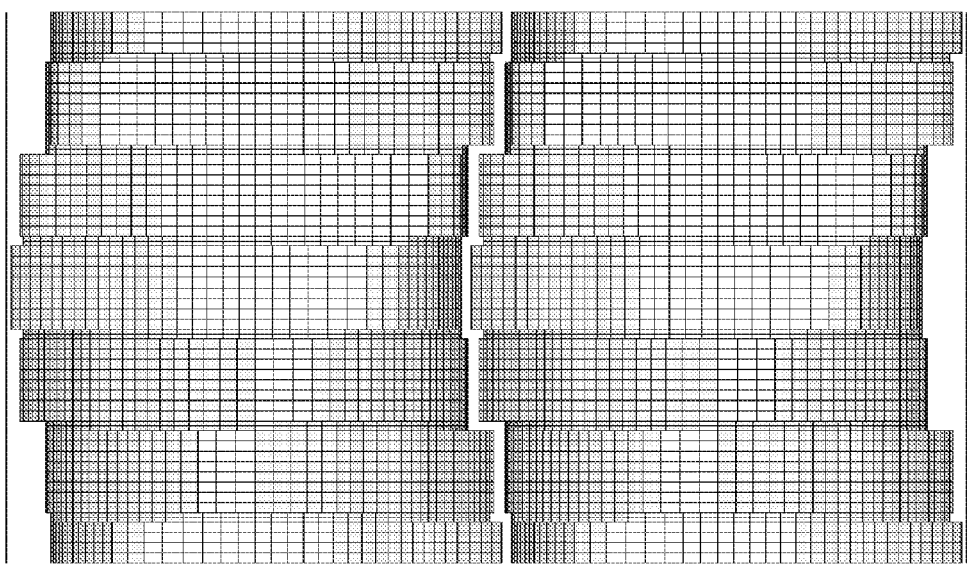

FIG. 53*b* depicts a pair of three-flight kneading elements based on the screw profile of FIG. 48*a*. The barrel radius RG is 0.5433. The clearance S between the kneading discs of the two kneading elements is 0.02. The clearance D between the kneading discs of the two kneading elements and the barrel is 0.01. The kneading element consists of 7 kneading discs each staggered in a clockwise direction in relation to each other by an angle of π/9. The first and the last kneading discs have a length of 0.09. The kneading discs in the middle have a length of 0.18. The groove between the kneading discs has a length of 0.02. The barrel is depicted by thin, unbroken lines on the left and the right of the two kneading elements. In addition, a possible computational grid is depicted on the surfaces of the two kneading elements. This grid can be used for computing the flow in twin and multiple screw extruders.

FIGS. 54 to 60 describe screw profiles with 4 flights which are generated by the method of generating tightly intermeshing, self-cleaning, co-rotating screw profiles according to the invention. FIGS. 54 to 56 each depict an eighth of a screw profile with 4 flights. All of these figures have an analogous design to that of FIGS. 1 to 20, which has already been described in detail for these figures.

FIGS. 54 to 60 depict screw profiles and screw elements in which the dimensionless outer screw radius RA has the values 0.5083, 0.515, 0.5183, 0.5217 and 0.5283. The method according to the invention for generating planar, tightly intermeshing, self-cleaning, co-rotating screw profiles with z flights is not limited to these discrete values for the dimensionless outer screw radius. Using the method according to the invention, four-flight screw profiles can be generated with a dimensionless outer screw radius between RA greater than 0.5 and RA smaller than or equal to 0.541, and preferably in the range from RA=0.505 to RA=0.536.

Figure 54A:
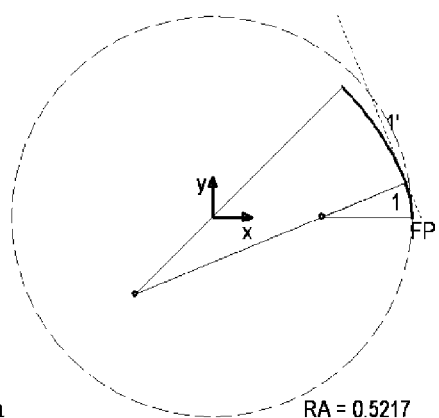
FIGS. 54a and 54b display preferred 2-circle screw profiles.
Figure 54B:
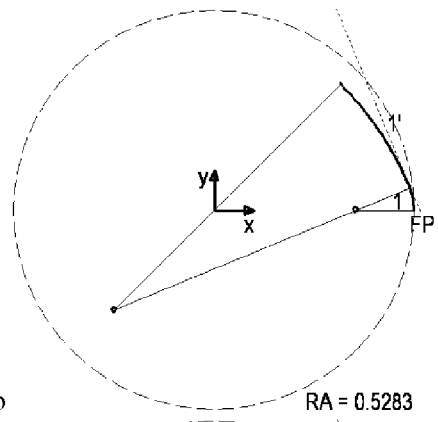

FIG. 54: FIGS. 54*a* and 54*b* display preferred 2-circle screw profiles. FIGS. 54*a* and 54*b* differ in their outer screw radius RA. In FIG. 54*a* the outer screw radius RA is 0.5217. In FIG. 54*b* the outer screw radius RA is 0.5283. In FIGS. 54*a* and 54*b* radius R_1 of arc 1 is dependent on the outer screw radius RA. In each of FIGS. 54*a* and 54*b* arc 1 has an angle α_1=π/8.

Figure 55A:
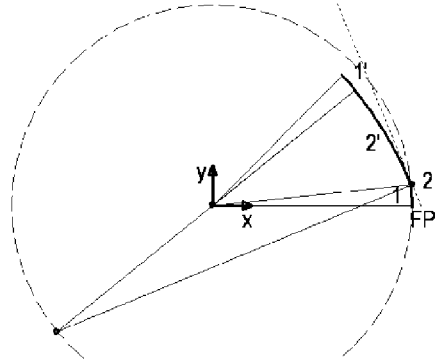
FIGS. 55a and 55b depict preferred 4-circle screw profiles.
Figure 55B:
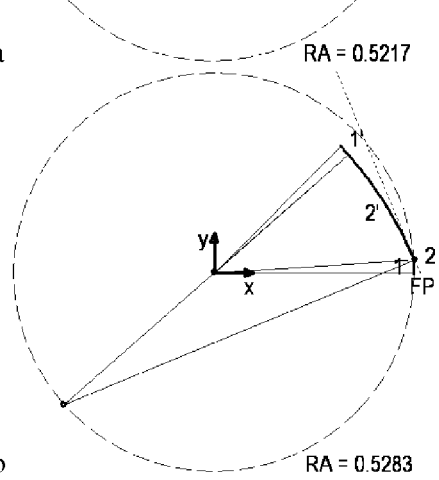
Figure 57A:
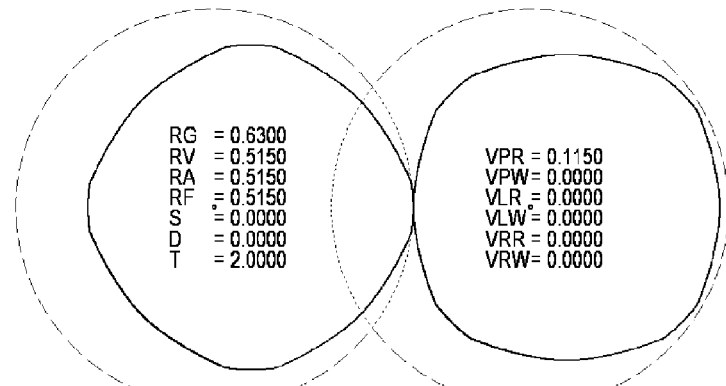
FIGS. 57a-57d show preferred variants of eccentrically positioned four-flight screw profiles.
Figure 57B:
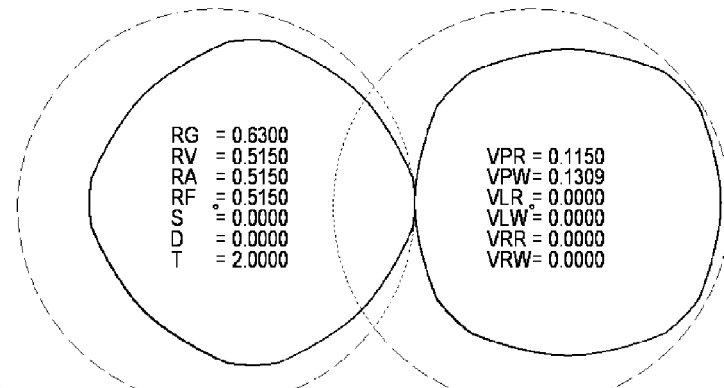
Figure 57C:
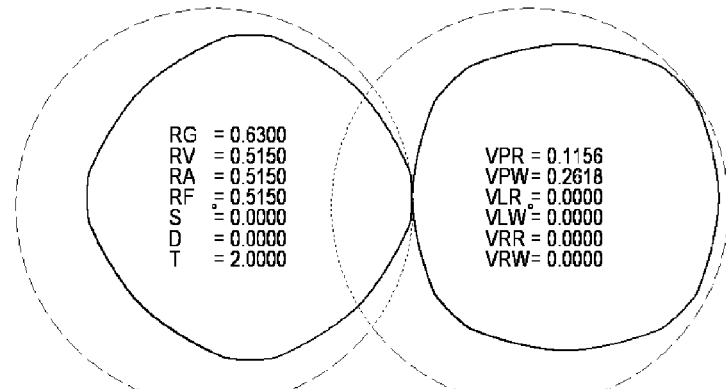
Figure 57D:
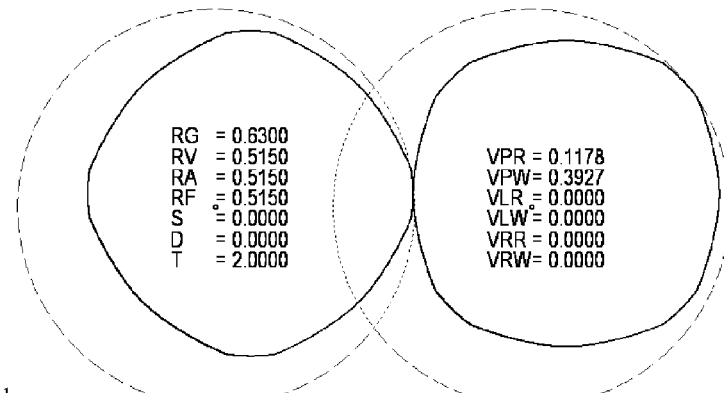
Figure 58A:
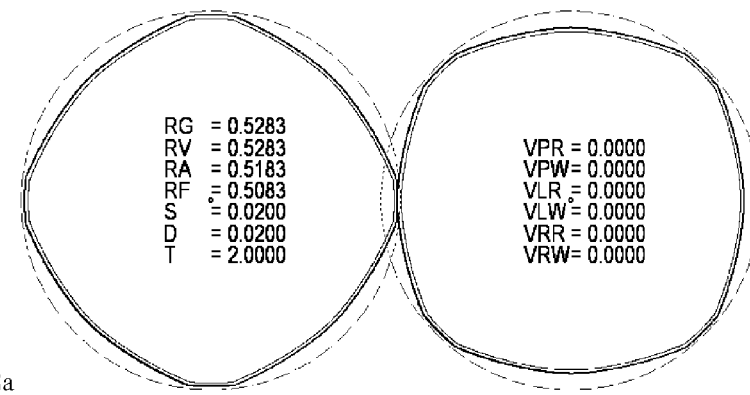
FIGS. 58a-58d show different clearance strategies.
Figure 58B:
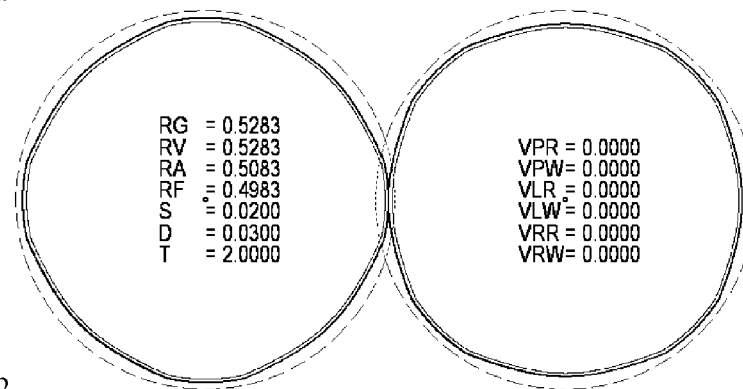
Figure 58C:
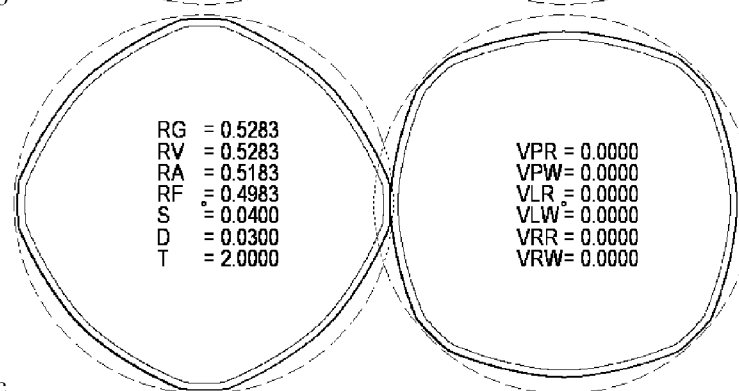
Figure 58D:
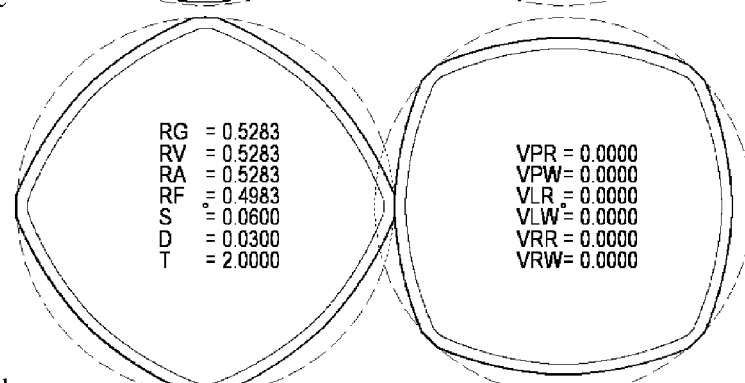
Figure 59A:
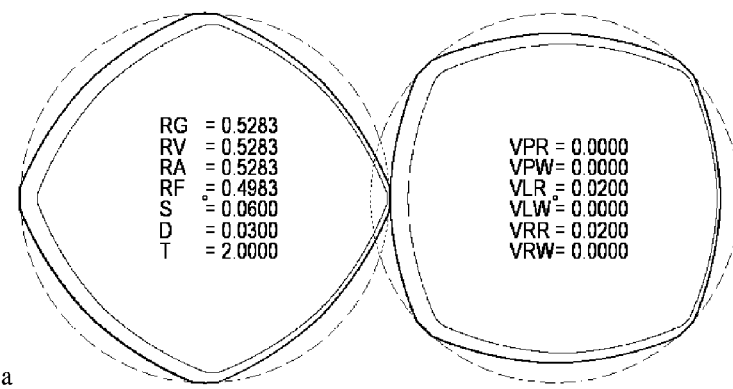
FIGS. 59a-59d: show a selection of possible shifts.
Figure 59B:
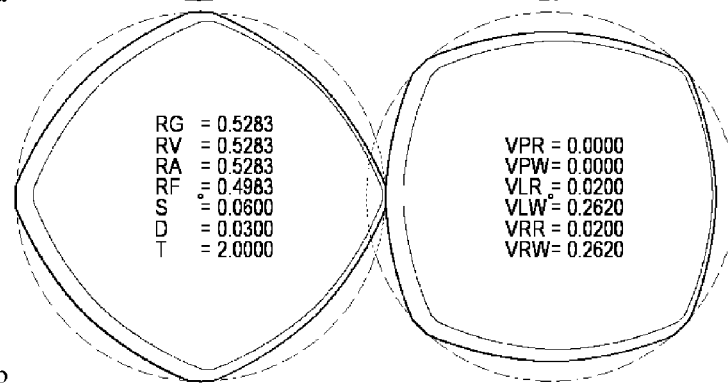
Figure 59C:
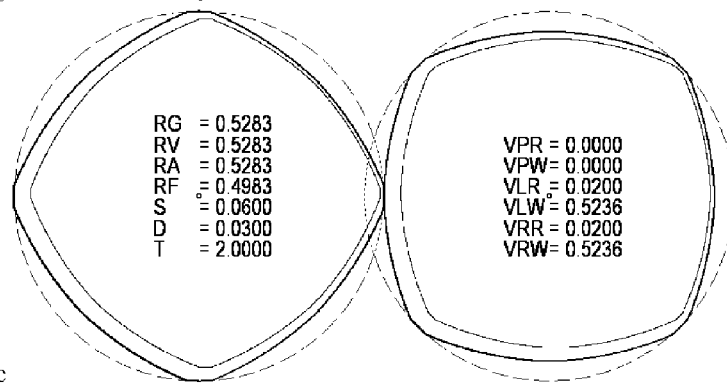
Figure 59D:
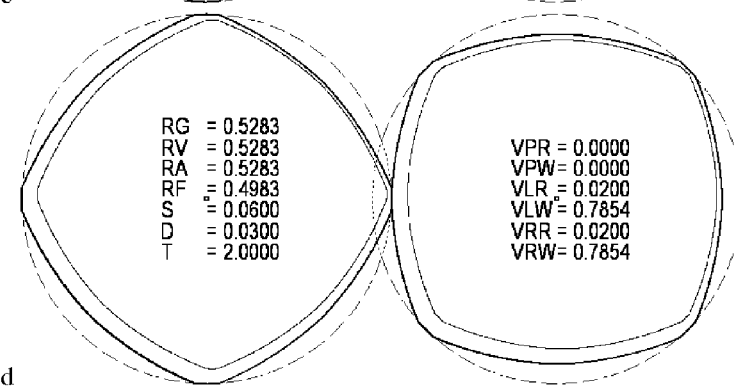

FIG. 55: FIGS. 55*a* and 55*b* depict preferred 4-circle screw profiles. FIGS. 55*a* and 55*b* differ in the outer screw radius RA. In FIG. 55*a* the outer screw radius RA is 0.5217. In FIG. 55*b* the outer screw radius RA is 0.5283. In each of FIGS. 55*a* and 55*b* arc 1 has a radius R_1=RA. In each of FIGS. 55*a* and 55*b* arc 2 has a radius R_2=0. In FIGS. 55*a* and 55*b* angle α_1 of arc 1 is dependent on the outer screw radius RA. In FIGS. 55*a* and 55*b* the angle α_2 of arc 2 is dependent on the outer screw radius RA.

FIG. 56: FIGS. 56*a* and 56*b* depict additional preferred 4-circle screw profiles. FIGS. 56*a* and 56*b* differ in their outer screw radius RA. In FIG. 56*a* the outer screw radius RA is 0.5217. In FIG. 56*b* the outer screw radius RA is 0.5283. In FIGS. 56*a* and 56*b* arc 1 has a radius R_1=0. In FIGS. 56*a* and 56*b* arc 2 has a radius R_2=A=1. In FIGS. 56*a* and 56*b* angle α_1 of arc 1 is dependent on the outer screw radius RA. In FIGS. 56*a* and 56*b* the angle α_2 of arc 2 is dependent on the outer screw radius RA.

FIGS. 54 to 56 show screw profiles which are designed analogously to FIGS. 1 to 3 for one-flight screw profiles. FIGS. 54 to 56 show screw profiles which are designed analogously to FIGS. 25 to 27 for two-flight screw profiles. FIGS. 54 to 56 show screw profiles which are designed analogously to FIGS. 47 to 49 for three-flight screw profiles. The one- and two-flight screw profiles shown in FIGS. 4 to 19 and in FIGS. 28 to 42 can be applied analogously to four-flight screw profiles. Thus the size of the tip region can also be adjusted in many different ways for four-flight screw profiles. Depending on the type of transition between the flank and tip region of the screw profile, the ratio between the elongating and shear forces acting on the viscous fluid can be adjusted in the same way as in the one-flight, two-flight and three-flight screw profiles.

As is clear from FIGS. 1 to 20, FIGS. 25 to 42, FIGS. 47 to 49 and FIGS. 54 to 56 the centre points of the arcs of the second part of a z-flight section of a screw profile can be obtained in a particularly simple manner by shifting the straight line FP to the origin of the coordinates and by mirroring the centre points of the arcs of the first part of this screw profile section on the opposite side of the shifted straight line FP. In said figures the slope of the straight line FP is 0 for a number of flights z=1 and −1/tan(π/(2z)) for a number of flights z>1, wherein π is pi.

FIGS. 57 to 59 show the generating and the generated screw profile inside a figure 8-shaped screw barrel. All of these figures have an analogous design to that of FIGS. 21 to 23, which has already been described in detail for these figures. The numerical values inside the screw profiles have also already been described in connection with FIGS. 21 to 23.

FIG. 57: FIGS. 57a to 57d show preferred variants of eccentrically positioned four-flight screw profiles. The tightly intermeshing self-cleaning screw profiles depicted are based on FIG. 55, although the outer screw radius RA is 0.515 in FIGS. 57a to 57d. The virtual barrel radius RV is 0.515 and is smaller than the barrel radius RG (RG=0.63). The remaining geometrical parameters can be found in the individual figures. Eccentrically positioned, four-flight, tightly intermeshing, self-cleaning screw profiles are characterized in that the distance between the screw profiles and the barrel varies in size depending on the direction of the shift. In FIGS. 57a to 57c the screw profiles have in each case been shifted to such an extent that precisely one point in the lefthand screw profile touches the barrel. The degree of the shift necessary for this purpose depends on the direction of the shift. FIG. 57d shows a special case in which the screw profiles are shifted in such a manner in degree and direction that both screw profiles touch the barrel at precisely one point. This shift takes place at an angle of π/8. It is also possible for the screw profiles to be in eccentric positions in which no point of the screw profiles touches the barrel.

FIG. 58: As is well-known to a person skilled in the art, all screw elements require a certain degree of clearance in practice, not only between each other but also in relation to the barrel. FIGS. 58a to 58d show different clearance strategies. The tightly intermeshing self-cleaning screw profiles depicted are based on FIG. 55b. The remaining geometrical parameters can be found in the individual figures. FIG. 58a shows a clearance strategy in which the clearance between the screw profiles to be fabricated is the same as the clearance between the screw profiles to be fabricated and the barrel. FIG. 58b shows a clearance strategy in which the clearance between the screw profiles to be fabricated is smaller than the clearance between the screw profiles to be fabricated and the barrel. FIG. 58c shows a clearance strategy in which the clearance between the screw profiles to be fabricated is greater than the clearance between the screw profiles to be fabricated and the barrel. FIG. 58d shows another variant according to FIG. 58c with particularly large clearances. Typical clearances used in practice are in the range from 0.002 to 0.1 for the clearance between the screw profiles to be fabricated. Typical clearances used in practice for the clearances between the screw profiles to be fabricated and the barrel are in the range from 0.002 to 0.1. Typical clearances used in practice are constant around the periphery of the screw profile. It is however possible to vary around the periphery of the screw profiles both the clearance between the screw profiles to be fabricated and the clearance between the screw profiles to be fabricated and the barrel.

FIG. 59: It is also possible to shift the screw profiles to be fabricated within the clearances. FIGS. 59a to 59d show a selection of possible shifts. The tightly intermeshing, self-cleaning screw profiles depicted are based on FIG. 55b. The depicted screw profiles to be fabricated are based on FIG. 58d. The remaining geometrical parameters can be found in the individual figures. In each of FIGS. 59a to 59d the degree of shift of the two screw profiles to be fabricated is VLR=VRR=0.02. In each of FIGS. 59a to 59d the direction of shift of the two screw profiles to be fabricated is varied gradually between VLW=VRW=0 and VLW=VRW=π/4. It is possible to shift the two screw profiles to be fabricated independently of each other in various directions and to different degrees.

Four-flight screw profiles generated by the method of generating tightly intermeshing, self-cleaning, co-rotating screw profiles according to the invention can be used for fabricating screw elements. In particular, such screw profiles can be used for fabricating conveying elements, mixing elements, kneading elements and transition elements.

Figure 60A:
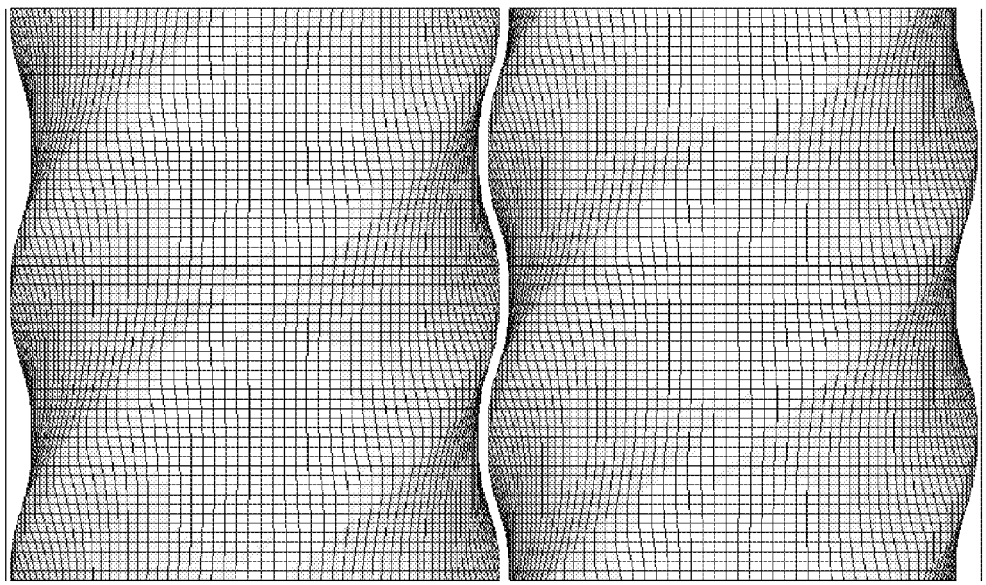

FIG. 60a depicts a pair of four-flight conveying elements based on the screw profile according to FIG. 55a. The barrel radius RG is 0.5217. The clearance S between the two conveying elements is 0.02. The clearance D between the two conveying elements and the barrel is 0.01. The pitch T of the conveying elements is 2.4. The length of the conveying elements is 1.2, which corresponds to a rotation of the screw profiles by an angle π. The barrel is depicted by thin unbroken lines on the right and left of the two conveying elements. A possible computational grid is also depicted on the surfaces of the two conveying elements which can be used for computing the flow in twin and multiple screw extruders.

Figure 60B:
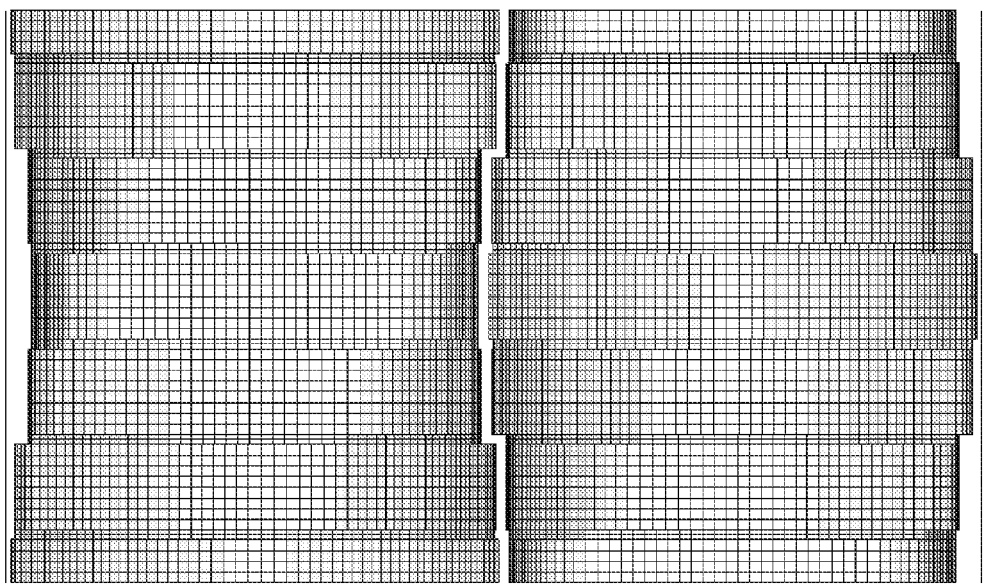
Figure 61A:
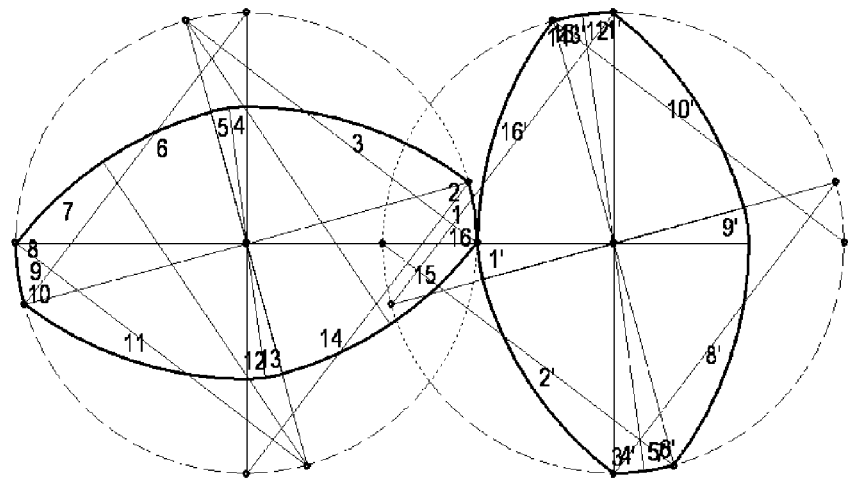
FIGS. 61a-61f show the transition from a pair of two-flight screw profiles to a pair of one-flight screw profiles.
Figure 61B:
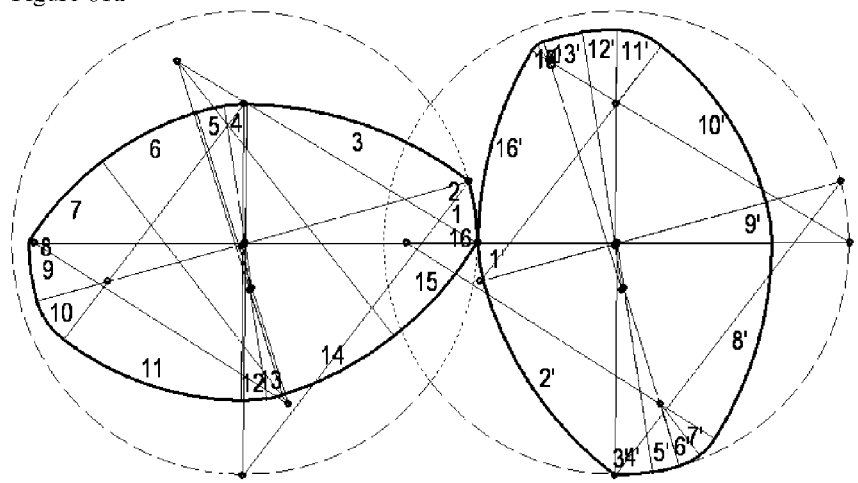
Figure 61C:
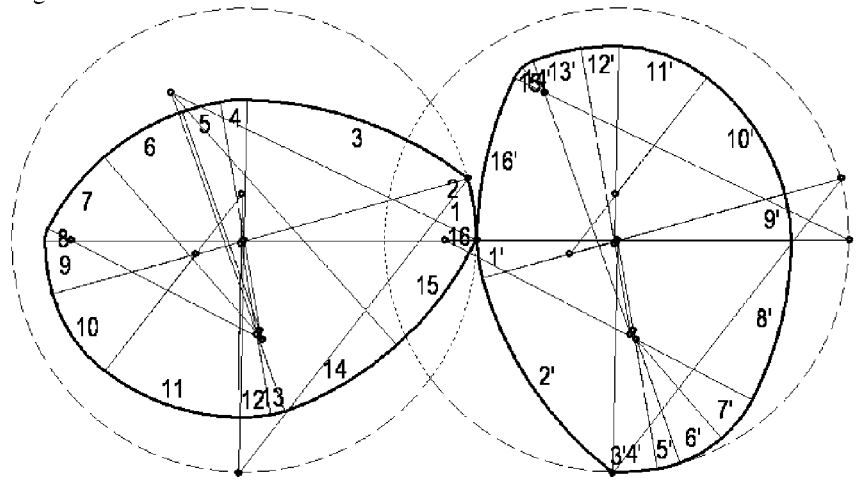
Figure 61D:
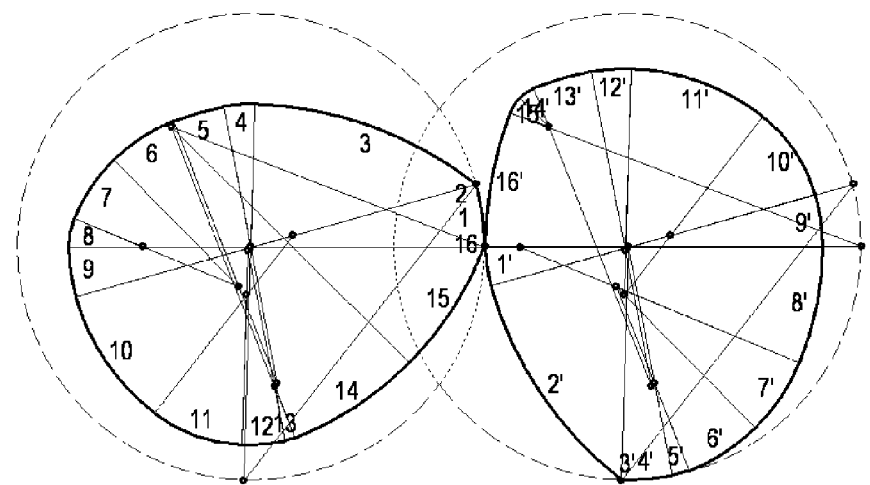
Figure 61E:
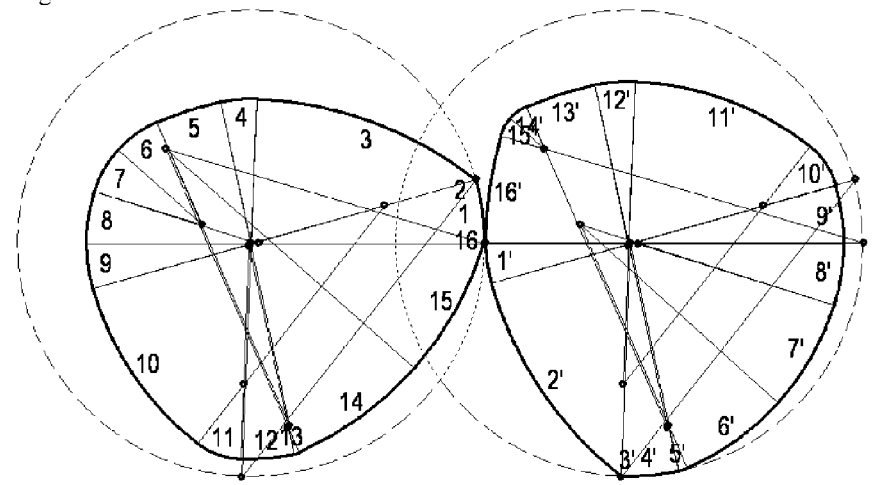
Figure 61F:
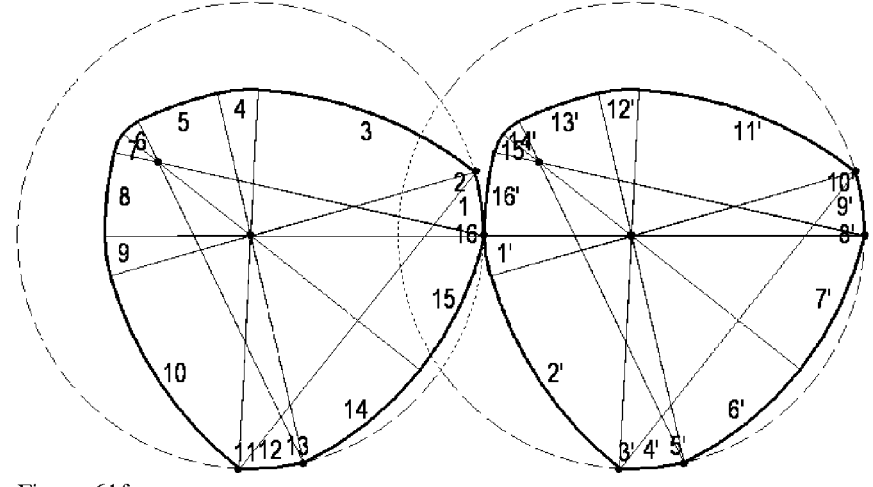

FIG. 60b depicts a pair of four-flight kneading elements based on the screw profile according to FIG. 55a. The radius of the barrel RG is 0.5217. The clearance S between the kneading discs of the two kneading elements is 0.02. The clearance D between the kneading discs of the two kneading elements and the barrel is 0.01. The kneading element consists of 7 kneading discs each staggered in a clockwise direction in relation to each other at an angle of π/12. The first and the last kneading disc have a length of 0.09. The kneading discs in the middle have a length of 0.18. The groove between the kneading discs has a length of 0.02. The barrel is depicted by thin unbroken lines on the left and right of the two kneading elements. A possible computational grid is also depicted on the surfaces of the two kneading elements which can be used for computing the flow in twin and multiple screw extruders.

Figure 62A:
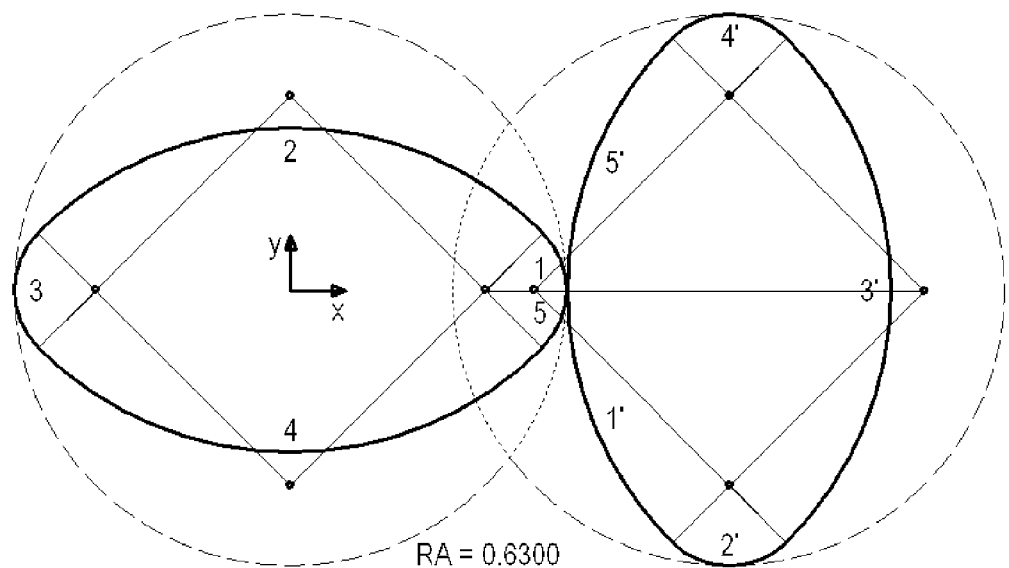
FIGS. 62a-62b illustrate a special feature of the concrete embodiment VK1 of the method according to the invention.
Figure 62B:
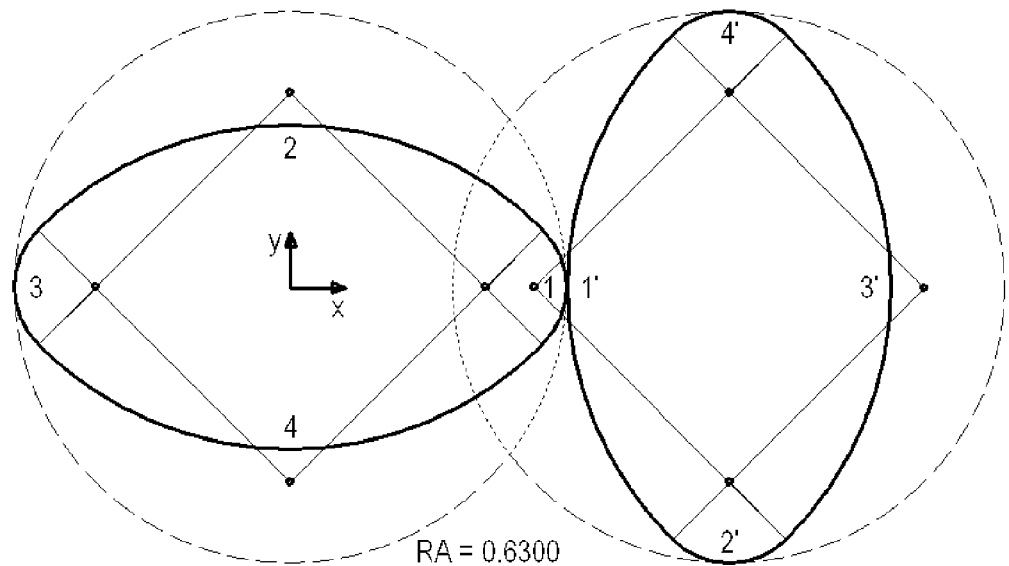

FIGS. 62a and 62b illustrate a special feature of the concrete embodiment VK1 of the method according to the invention.

FIG. 62a shows schematically the cross-sectional profiles of a pair of screw elements generated by the concrete embodiment VK1 of the method according to the invention. In this figure, the generating screw profile consists of the 5 arcs 1, 2, 3, 4 and 5, which are arranged counterclockwise around the centre of rotation (the origin of the x,y-coordinate system). The outer radius RA is selected to be RA=0.63. The starting and centre points of the first arc 1 are positioned on the x-axis according to the concrete embodiment VK1 of the method according to the invention. The remaining arcs of the generating and the generated screw profiles are constructed on the basis of this first arc 1. Arc 5 closes the generating profile and, according to the invention, merges tangentially into arc 1. Arc 1 and arc 5 have the same centre point and the same radius. The corresponding arcs 1' and 5' of the generated screw profile which, according to the invention, can be constructed from arcs 1 and 5 of the generating screw profile, also have the same centre point and the same radius. Thus arcs 1 and 5 with angles α_1 and α_5 can be united to form an arc with an angle α_1+α_5. The corresponding arcs 1' and 5' of the generated screw profile with angles α_1' and α_5' can also be united to form an arc with an angle α_1'+α_5'. The special feature that by using the embodiment VK1 screw profiles can be generated which can be subsequently "simplified" in the described manner is due to the fact that in VK1 the centre point and the starting point of the first arc is positioned on the x-axis. In the generation of the screw profiles according to the invention one point of contact between the generating and the generated screw profile is positioned on the x-axis. When the finished screw profiles (see FIG. 62b) are rotated in the same direction about their respective centres of rotation the contact between them does however never occur at a point which is simultaneously located on the x-axis and is a starting or end point of a profile-generating arc. This is why, in the concrete embodiment VK1, an alternative solution is employed of dividing one arc into two arcs which, after being constructed, can be reunited to form one arc.

FIG. 62b depicts the "simplified" construction of the cross-sectional profiles of FIG. 62a, in which arcs 1 and 5 and 1' and 5' from FIG. 62a are in each case united to form arcs 1 and 1' in FIG. 62b.

The same applies to the concrete embodiment VK2.

In the figures depicted a maximum of 16 arcs are used for constructing a generating or a generated screw profile. The methods V0, VA1, VA2, VA3, VK1 and VK2 according to the invention are however by no means restricted to a maximum of 16 arcs. On the contrary, as many arcs as required can be used for producing screw profiles. It is thereby possible to design the profile of a screw from the outset in such a manner that it is optimally suitable for a specified task. The screw elements known from the prior art are in most cases not optimally designed for a concrete task. On the contrary, manufacturers supply screw elements (conveying, kneading and mixing elements) from a fixed modular system independently of a concrete task. The present invention makes it possible for the first time to almost completely freely design the profiles of self-cleaning screw elements, thus optimizing the parameters of such profiles for the application concerned down to the most minute variation. In addition it is possible to approximate screw profiles which are not composed of arcs and are therefore not self-cleaning by means of a sufficiently high number of arcs with the required precision. The profile approximated by means of arcs is of course self-cleaning. It is possible to calculate the longitudinal profile of a (generating or generated) screw profile. Preferably each arc of a screw profile is used for calculating that part of the longitudinal cross-section which belongs to this arc by means of an explicit function.

In a first step the intersecting point (Sx, Sy) of a straight line g with an arc kb is determined. The straight line g is located in the plane of the screw profile and it leads through the point of rotation of the screw profile. The orientation of the straight line is given by the angle $\phi$. Arc kb is characterized by its radius r and the position of its centre point (Mx, My). In a second step the distance of the point of intersection (Sx, Sy) from the point of rotation of the screw profile is calculated. The point of intersection of a straight line with an arc can be calculated by an explicit function. The same applies to the calculation of the distance. The distance is therefore $s=s(\phi, r, Mx, My)$. Given a known pitch t of a screw element over $\phi/2\pi*t$, angle $\phi$ can be converted into an axial position z_ax, so that the distance is $s=s(z\_ax, r, Mx, My)=s(\phi/2\pi*t, r, Mx, My)$. The function s(z_ax, r, Mx, My) defines the longitudinal profile of an arc of the screw profile.

The invention claimed is:

1. A method of generating planar, tightly intermeshing, self-cleaning, co-rotating screw profiles with a selectable centre distance of axes a between the rotational axes of a generating and a generated screw profile, wherein the generating screw profile is formed from n circular arcs and the generated screw profile is formed from n' circular arcs, wherein the generating screw profile and the generated screw profile are located in a same plane, wherein an axis of rotation of the generating screw profile and an axis of rotation of the generated screw profile are, in each case, perpendicular on the same plane of the screw profiles, wherein an intersecting point of the rotational axis of the generating screw profile with the same plane is designated as a point of rotation of the generating screw profile and an intersecting point of intersection of a rotational axis of the generated screw profile with the same plane is designated as a point of rotation of the generated screw profile, the method comprising the steps of selecting, in step 1, the number of circular arcs n of the generating screw profile such that n is an integer greater than or equal to 1, selecting, in step 2, an outer radius ra of the generating screw profile such that ra is greater than 0 (ra>0) and less than or equal to the centre distance of axes a (ra≤a), selecting, in step 3, an inner radius ri of the generating screw profile such that ri is greater than or equal to 0 (ri≥0) and less than or equal to ra (ri≤ra), arranging, in step 4, the circular arcs of the generating screw profile according to the following configuration rules, such that:

all of the circular arcs of the generating screw profile merge into one another tangentially such that a closed, convex screw profile is formed, wherein a circular arc, with a radius that is equal to 0, is treated as a circular arc, with a radius that is equal to eps, wherein eps is a very small positive real number tending towards 0 (eps<<1, eps→0), each of the circular arcs of the generating screw profile lies within or on boundaries of an annulus that has an outer radius ra, an inner radius ri and a centre point that is located on the point of rotation of the generating screw profile, at least one of the circular arcs of the generating screw profile touches the outer radius ra of the generating screw profile, and at least one of the circular arcs of the generating screw profile touches the inner radius ri of the generating screw profile, selecting, in step 5, a size of a first circular arc of the generating screw profile, that is fixed by an angle $\alpha\_1$ and selecting a radius r_1, such that angle $\alpha\_1$ is, in terms of radian measurement, greater than or equal to 0 and smaller than or equal to $2\pi$, wherein $\pi$ is pi ($\pi\approx3.14159$), and radius r_1 is greater or equal to 0 and less than or equal to the centre distance of axes a, and a position of the first circular arc of the generating screw profile, that is obtained by positioning two different points of the first circular arc, is fixed corresponding to said configuration rules, wherein a first point of the first circular arc to be positioned is a starting point of the first circular arc and wherein a second point of the first circular arc to be positioned is a centre point of the first circular arc, and selecting, in step 6, sizes of additional n−2 circular arcs of the generating screw profile, that are defined by angles $\alpha\_2, \ldots, \alpha\_(n-1)$ and radii r_2, ..., r_(n−1), such that angles $\alpha\_2, \ldots, \alpha\_(n-1)$ are, in terms of radian measurement, greater than or equal to 0 and less than or equal to $2\pi$, and radii r_2, ..., r_(n−1) are greater than or equal to 0 and less than or equal to the centre distance of axes a, and positions of these additional n−2 circular arcs of the generating screw profile are fixed corresponding to said configuration rules, wherein the size of a last circular arc of the generating screw profile, that is fixed by angle α_n and radius r_n, is provided by a sum of the n angles of the n circular arcs of the generating screw profile in radian measures being equal to 2π, wherein angle α_n is, in terms of radian measurement, greater than or equal to 0 and less than or equal to 2π, wherein the radius r_n closes the generating screw profile, wherein the radius r_n is greater than or equal to 0 and less than or equal to the centre distance of axes a and the position of the last circular arc of the generating screw profile is fixed corresponding to said configuration rules, and wherein the n' circular arcs of the generated screw profile are produced from the n circular arcs of the generating screw profile by the number of circular arcs n' of the generated screw profile being equal to the number of circular arcs n of the generating screw profile, wherein n' is an integer, the outer radius ra' of the generated screw profile being equal to the difference of the centre distance of axes a minus the inner radius ri of the generating screw profile (ra'−a−ri), the inner radius ri' of the generated screw profile being equal to the difference of the centre distance of axes a minus the outer radius ra of the generating screw profile (ri'=a−ra), the angle α_i' of the i'$^{th}$ circular arc of the generated screw profile being equal to the angle α_i of the i$^{th}$ circular arc of the generating screw profile, wherein i and i' are whole numbers that together run through all the values in the range between 1 and up to the number of circular arcs n or n'(α_1'=α_1, ... α_n'=α_n), the sum of the radius r_i' of the i'$^{th}$ circular arc of the generated screw profile and of the radius r_i of the i$^{th}$ circular arc of the generating screw profile being equal to the centre distance of axes a, wherein i and i' are whole numbers that together run through all the values in the range between 1 and up to the number of circular arcs n or n'(r_1'+r_1=a, ..., r_n'+r_n=a), the distance between the centre point of the i'$^{th}$ circular arc of the generated screw profile and a midpoint point of the i$^{th}$ circular arc of the generating screw profile being equal to the centre distance of axes a, and the distance between the centre point of the i'$^{th}$ circular arc of the generated screw profile and the point of rotation of the generated screw profile being equal to the distance between the centre point of the i$^{th}$ circular arc of the generating screw profile and the point of rotation of the generating screw profile, and the connecting line between the centre point of the i'$^{th}$ circular arc of the generated screw profile and the centre point of the i$^{th}$ arc of the generating screw profile being a line parallel to the connecting line between the point of rotation of the generated screw profile and the point of rotation of the generating screw profile, wherein i and i' are whole numbers that together run through all the values in the range of between 1 and the number of circular arcs n or n'(i'=i), and a starting point of the i$^{th}$ circular arc of the generated screw profile, with reference to the centre point of the i'$^{th}$ circular arc of the generated screw profile, lying in a direction that is opposite to the direction of the starting point of the i$^{th}$ circular arc of the generating screw profile, with reference to the centre point of the i$^{th}$ circular arc of the generating screw profile, wherein i and i' are whole numbers that together run through all values in the range of between 1 and the number of circular arcs n or n'(i'=i).

2. The method according to claim 1, wherein the outer screw radius ra of the generating screw profile is equal to the outer screw radius ra' of the generated screw profile and the inner radius ri of the generating screw profile is equal to the inner radius ri' of the generated screw profile.

3. The method according to claim 1, wherein a number of flights z is selected, wherein z is an integer greater than or equal to 1, the number of circular arcs n of the generating screw profile is selected such that it is an integer multiple p of 4z, and the generating screw profile is subdivided into 2z sections, wherein each section is defined by two straight lines that together form an angle, in terms of radian measurement, of π/z and intersect at the point of rotation of the generating screw profile, wherein the two straight lines are designated as section boundaries, wherein π refers to the number circles (π≈3.14159), each of these 2z sections is subdivided into a first part and a second part, the first part of a section is composed of p circular arcs which are numbered in ascending or descending order, the angles α_1, ..., α_p belonging to the p circular arcs are selected such that the sum of the angles is π/(2z), wherein angles α_1, ..., α_p are, in terms of radian measurement, greater than or equal to 0 and less than or equal π/(2*z), the second part of a section is composed of p' circular arcs which are numbered in reverse order to the circular arcs of the first part of a section, wherein p' is an integer which is equal to p, angles α_p', ..., α_1' of the p' circular arcs are determined in that angle α_j' of the j'$^{th}$ circular arc of the second part of a section is equal to the angle α_j of the j$^{th}$ circular arc of the first part of a section, wherein j and j' are whole numbers that together run through all values in the range of between 1 and the number of circular arcs p or p' (α_1'=α_1, ..., α_p'=α_p), the sum of the radius r_j' of the j'$^{th}$ circular arc of the second part of a section and the radius r_j of the j$^{th}$ circular arc of the first part of a section is equal to the centre distance of axes a, wherein j and j' are whole numbers that together run through all values in the range of between 1 and the number of circular arcs p or p'(r_1'+r_1=a, ..., r_p'+r_p=a), a centre point associated with the circular arc with which the screw profile starts in the first part of a section, and a stating point associated therewith are placed onto one of the section boundaries of said section in dependence on the arrangement of the circular arcs in a clockwise or an anticlockwise direction, and an end point associated with the circular arc with which the screw profile ends in the first part of a section is tangent a straight line FP at one point, wherein the straight line FP is perpendicular on the angle bisector of the two section boundaries of this section and is at a distance from the point of rotation of the generating screw profile in the direction of said section which is equal to half the centre distance of axes a, wherein bisector as the section boundaries leads through the point of rotation of the generating screw profile.

4. The method according to claim 3, wherein one screw profile section is preset in one of the 2z sections of the generating screw profile and the remaining screw profile sections are generated by successive mirroring of the predefined screw profile section at the section boundaries.

5. The method according to claim 2, wherein single-flight screw profiles are displaced along a section boundary.

6. The method according to claim 1, wherein the screw profiles are arranged eccentrically.

7. The method according to claim 1 for producing screw elements.

8. The method according to claim wherein the screw elements are designed as mixing elements or conveying elements, and wherein the screw elements are right-handed or left-handed and the lead, that is normalized in relation to the centre distance of axes a, is in the range from 0.1 to 10 and the length of the elements, that is normalized in relation to the centre distance of axes a, is in the range from 0.1 to 10.

9. The method according to claim 7, wherein the screw elements are designed as kneading elements, wherein an arrangement of the kneading elements is right-handed or left-handed or or neutral and a length of the kneading elements, that are normalized in relation to the centre distance of axes a, is in the range from 0.05 to 10.

10. The method according to claim 7, wherein a transition element is generated by the size and/or position of one or more circular arcs of a first generating screw profile or a first generated screw profile transforming in a continuous manner to the size and/or position of one or more circular arcs of a second generating screw profile or a second generated screw profile, wherein the transition element is right-handed or left-handed and the lead, that is normalized in relation to the centre distance of axes a, is in the range from 0.1 to 10 and the length of the element, that is normalized in relation to the centre distance of axes a, is in the range from 0.1 to 10.

11. The method according to one of claim 7, wherein the screw elements have clearances, wherein the clearance between the screws is in the range from 0.002 to 0.1 times the centre distance of axes a and the clearance between the screw and the hosing is in the range from 0.002 to 0.1 times the centre distance of axes a.

12. The method according to claim 11, wherein the screw elements are displaced eccentrically within the clearances.

13. A computer program product with program codes which are stored in a computer-readable data carrier for executing the method according to claim 1 via a computer.

14. A computer program product according to claim 13, wherein the screw profiles are used for generating at least one computational grid on which the flow in twin and multiple screw extruders is computed, and wherein the at least one computational grid depicts a conveying element, a mixing element, a kneading element or a transition element.

15. Screw elements that have been generated by a method according to claim 1.

* * * * *